(12) United States Patent
Elberbaum

(10) Patent No.: US 8,824,475 B2
(45) Date of Patent: Sep. 2, 2014

(54) METHOD AND STRUCTURE FOR SIMPLIFIED CODING OF DISPLAY PAGES FOR OPERATING A CLOSED CIRCUIT E-COMMERCE

(71) Applicant: Elbex Video Ltd, Tokyo (JP)

(72) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 13/909,137

(22) Filed: Jun. 4, 2013

(65) Prior Publication Data
US 2014/0067610 A1 Mar. 6, 2014

Related U.S. Application Data

(62) Division of application No. 13/599,275, filed on Aug. 30, 2012, now Pat. No. 8,489,469.

(51) Int. Cl.
| | |
|---|---|
| H04L 12/28 | (2006.01) |
| G06Q 30/00 | (2012.01) |
| G06Q 30/06 | (2012.01) |
| H04N 7/14 | (2006.01) |
| G06F 13/00 | (2006.01) |

(52) U.S. Cl.
CPC ............ *G06Q 30/0643* (2013.01); *G06Q 30/00* (2013.01); *G06F 13/00* (2013.01); *H04N 7/14* (2013.01)
USPC ............. 370/392; 370/466; 725/60; 705/26.1

(58) Field of Classification Search
None
See application file for complete search history.

(56) References Cited

U.S. PATENT DOCUMENTS

| | | |
|---|---|---|
| 4,905,094 A | 2/1990 | Pocock et al. |
| 5,430,799 A | 7/1995 | Katznelson |
| 5,754,637 A | 5/1998 | Choi |
| 5,923,363 A | 7/1999 | Elberbaum |
| 6,072,861 A | 6/2000 | Yu |
| 6,295,513 B1 | 9/2001 | Thackston |
| 6,543,052 B1 | 4/2003 | Ogasawara |
| 6,603,842 B2 | 8/2003 | Elberbaum |

(Continued)

FOREIGN PATENT DOCUMENTS

KR 2002-0008948 2/2002

OTHER PUBLICATIONS

International Search Report dated Feb. 27, 2006, from corresponding International Application No. PCT/US05/19564.

(Continued)

*Primary Examiner* — Duc C Ho
(74) *Attorney, Agent, or Firm* — Katten Muchin Rosenman LLP

(57) ABSTRACT

Method and structure for a simplified coding of templated display pages for use in close circuit e-shopping for product and services via shopping terminals comprising video interphone monitors, dedicated terminals, television, cable television, shopping box, set top box and other well known boxes, each include a CPU, a memory and a display monitor operated via touch screen, remote control or hand movement, the templated screen uses assigned blocks and icons codes to select display pages, covering products and services. The shopping terminal connected via internal communication lines and interface propagates the simplified code, enabling loading and updating of products and services communicated via a building server for updating at all time data stored in the memory as per the dweller choice, enabling a dweller to shop from his private shop inside his residence, and be provided with programmed services, delivery and payments, supervised by the close circuit shopping entity center.

9 Claims, 35 Drawing Sheets

(56) References Cited

U.S. PATENT DOCUMENTS

| | | | |
|---|---|---|---|
| 6,647,305 B1 | 11/2003 | Bigelow | |
| 6,940,957 B2 | 9/2005 | Elberbaum | |
| 7,062,454 B1 | 6/2006 | Giannini et al. | |
| 7,194,754 B2 | 3/2007 | Tomsen et al. | |
| 7,237,252 B2 | 6/2007 | Billmaier | |
| 7,367,042 B1 | 4/2008 | Dakss et al. | |
| 7,461,012 B2 | 12/2008 | Elberbaum | |
| 7,649,727 B2 | 1/2010 | Elberbaum | |
| 7,788,136 B2 | 8/2010 | Diaz Perez | |
| 7,792,962 B2 | 9/2010 | Mager et al. | |
| 8,117,076 B2 | 2/2012 | Elberbaum | |
| 8,131,386 B2 | 3/2012 | Elberbaum | |
| 8,374,921 B2 | 2/2013 | Diaz Perez | |
| 8,666,838 B2* | 3/2014 | Bamborough et al. | 705/26.1 |
| 2001/0032310 A1 | 10/2001 | Corella | |
| 2002/0073027 A1 | 6/2002 | Hui et al. | |
| 2003/0033388 A1 | 2/2003 | Hom et al. | |
| 2003/0234819 A1 | 12/2003 | Daly et al. | |
| 2004/0031058 A1 | 2/2004 | Reisman | |
| 2004/0131247 A1 | 7/2004 | Hiwada | |
| 2005/0144642 A1 | 6/2005 | Ratterman | |
| 2005/0172330 A1 | 8/2005 | Rathus et al. | |
| 2007/0156806 A1 | 7/2007 | Becker et al. | |
| 2008/0065502 A1 | 3/2008 | Diaz Perez | |
| 2008/0243657 A1 | 10/2008 | Voysey | |
| 2009/0022131 A1 | 1/2009 | Rusanen et al. | |
| 2011/0093901 A1 | 4/2011 | Diaz Perez | |
| 2011/0313874 A1* | 12/2011 | Hardie et al. | 705/26.1 |

OTHER PUBLICATIONS

Written Opinion of the International Searching Authority dated Feb. 27, 2006, from corresponding International Application No. PCT/US05/19564.

Microsoft Press Computer Dictionary, Third Edition, Microsoft Press, Redmond, 1997, p. 66.

Anon., "Busy Travellers Can Shop from Their Hotel Rooms" The Straits Times, Jun. 6, 1997, p. 51.

Anon., "The Network Connection Appoints Two Executives to Newly Formed Hotel and Hospitality Division" Business Wire, Dec. 7, 1999, p. 0261.

Anon., "CDNet to Launch Cash Dispensing Network for E-Commerce Business" Business Wire, Jan. 24, 2000.

Anon., "Pidemco Plans 'Wireless Buildings'", The Straits Times, Mar. 9, 2000, p. 62.

Anon., "Insignia Financial Group Announces Internet Strategy" PR Newswire, Feb. 23, 2000.

Anon., "Mylackey.Com Debuts Urbanvalet Program at Harbor Steps Apartments" PR Newswire, Aug. 17, 2000.

Anon., "Rogers introduces 'One Connection'", Canada NewsWire, Oct. 20, 2000.

Anon., "Online Service Takes Parts from Design to Manufacture" Modern Plastics, vol. 81, No. 4, Apr. 2004, p. 65.

United States Office Action dated Apr. 5, 2013, from corresponding U.S. Appl. No. 13/599,275.

United States Office Action dated May 15, 2013, from corresponding U.S. Appl. No. 13/599,275.

* cited by examiner

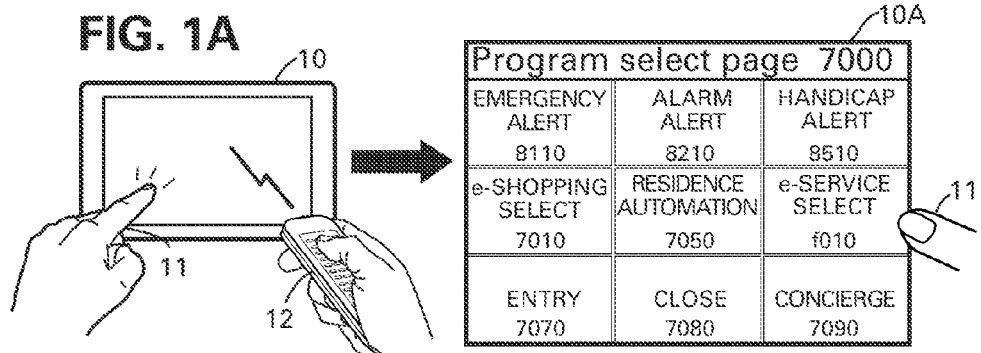

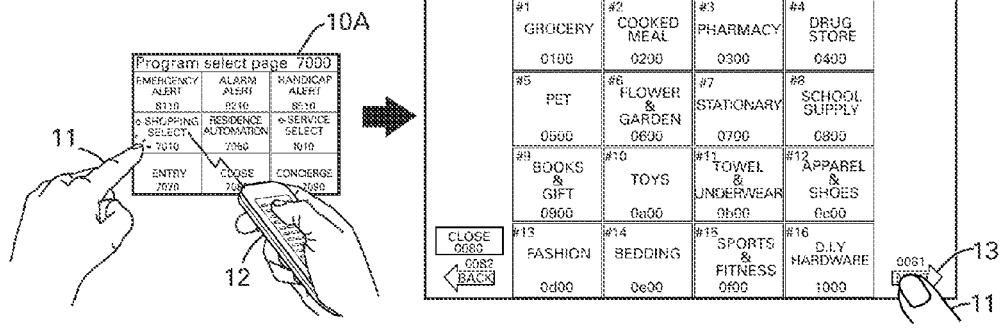
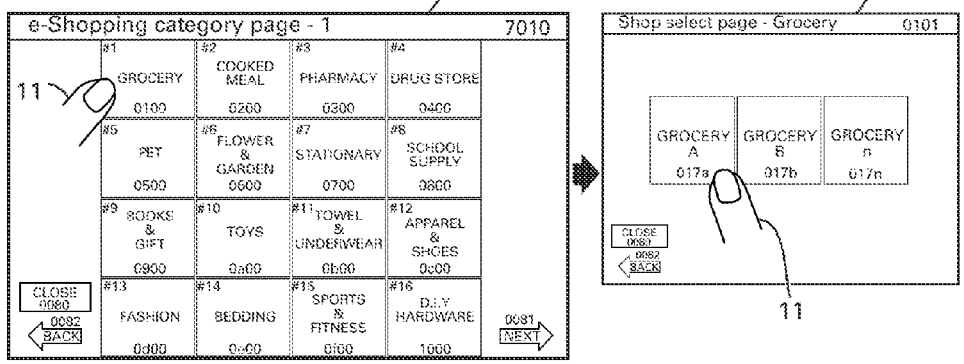

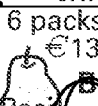

FIG. 6A BASIC PRODUCT PAGE (0110~016f - TABLE 104) ⟋10P2

| CATEGORY SELECT 0x0a | #1 0x00 | #2 0x10 | #3 0x20 | #4 0x30 | CART REVIEW SINGLE SHOP 0x8a |
| GROUP SELECT 0x1a | | | | | CART REVIEW MULTI SHOPS 0x9a |
| EXTENTION PAGE SELECT 0x2a | #5 0x40 | #6 0x50 | #7 0x60 | #8 0x70 | DELIVERY SELECT 0xaa |
| SWITCH SHOP 0x3a | | | | | PAYMENT SELECT 0xba |
| LOCKER SELECT 0x4a | #9 0x80 | #10 0x90 | #11 0xa0 | #12 0xb0 | DECLINE 0xca |
| RESPOND TO VISITOR 0x5a | | | | | CONFIRMATION REQUEST 0xda |
| CLOSE 0x6a | #13 0xc0 | #14 0xd0 | #15 0xe0 | #16 0xf0 | SEND ORDER 0xea |
| ⬅ 0x7a BACK | | | | | 0xfa NEXT ➡ |

FIG. 6B

| 0x01 | 0x02 |
| 0x03 | 0x7a/0xfa |

FIG. 6C

| 0x03 | 0x04 | 0x05 |
| 0x02 | 0x01 | 0x7a/0xfa |

FIG. 6D

| 0x01 | |
| 0x02 | 0x7a/0xfa |

FIG. 6E

| | 0x02 |
| 0x01 | 0x7a/0xfa |

FIG. 6F

| 0x01 | |
| | 0x7a/0xfa |

FIG. 6G
EXTENSION PRODUCT PAGE (0190~01ef - TABLE 104) ⟋10P3

| CATEGORY SELECT 0x0a | #17 0x00 | #18 0x10 | #19 0x20 | #20 0x30 | CART REVIEW SINGLE SHOP 0x8a |
| GROUP SELECT 0x1a | | | | | CART REVIEW MULTI SHOPS 0x9a |
| BASIC PAGE SELECT 0x2b | #21 0x40 | #22 0x50 | #23 0x60 | #24 0x70 | DELIVERY SELECT 0xaa |
| SWITCH SHOP 0x3a | | | | | PAYMENT SELECT 0xba |
| LOCKER SELECT 0x4a | #25 0x80 | #26 0x90 | #27 0xa0 | #28 0xb0 | DECLINE 0xca |
| RESPOND TO VISITOR 0x5a | | | | | CONFIRMATION REQUEST 0xda |
| CLOSE 0x6a | #29 0xc0 | #30 0xd0 | #31 0xe0 | #32 0xf0 | SEND ORDER 0xea |
| ⬅ 0x7a BACK | | | | | 0xfa NEXT ➡ |

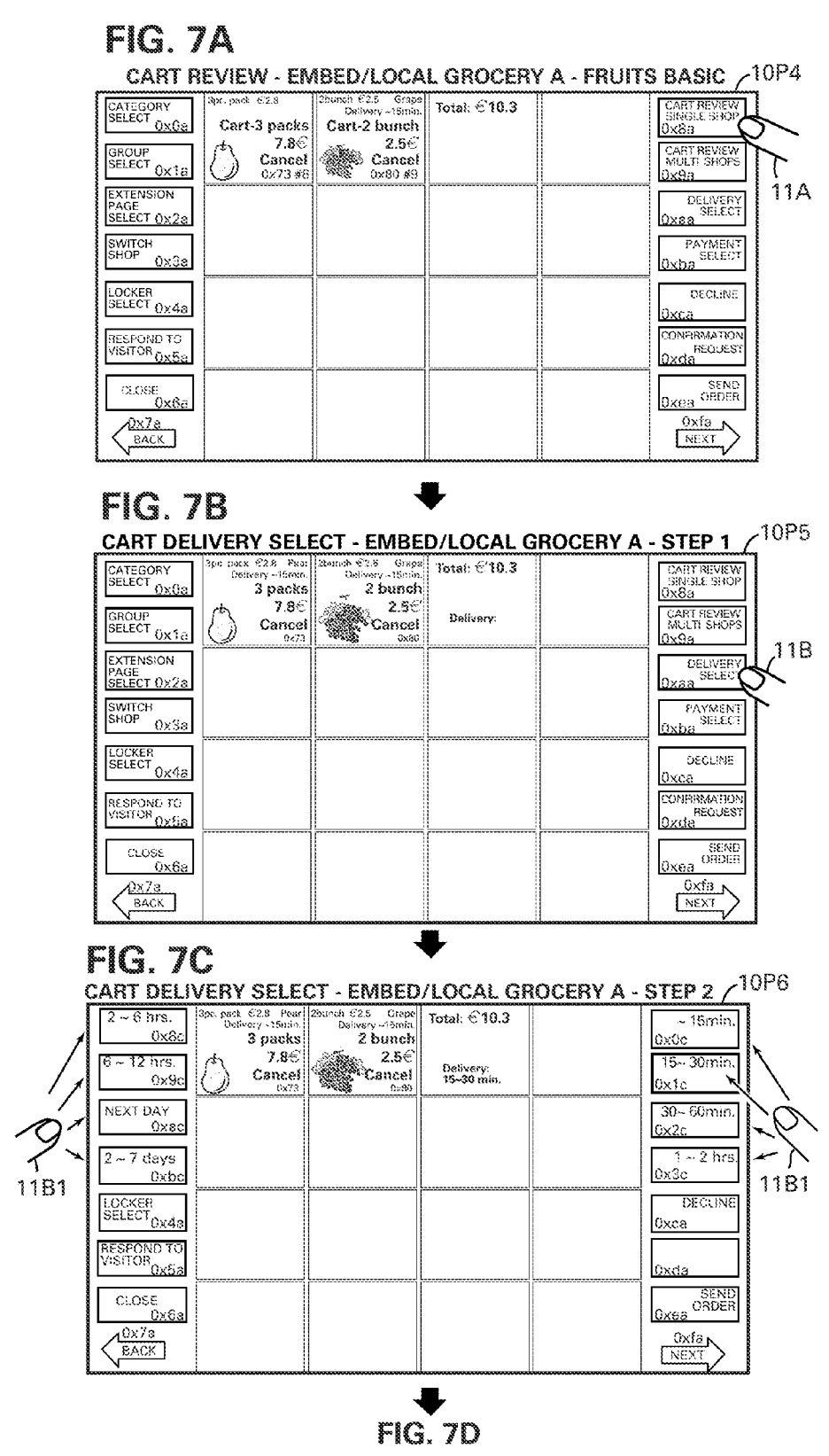

FIG. 7A
CART REVIEW - EMBED/LOCAL GROCERY A - FRUITS BASIC — 10P4

FIG. 7B
CART DELIVERY SELECT - EMBED/LOCAL GROCERY A - STEP 1 — 10P5

FIG. 7C
CART DELIVERY SELECT - EMBED/LOCAL GROCERY A - STEP 2 — 10P6

FIG. 7D

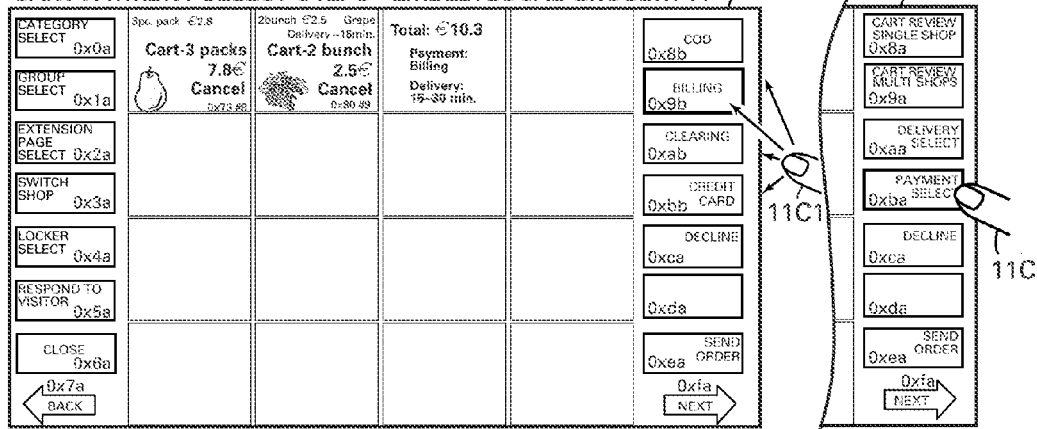
FIG. 7D
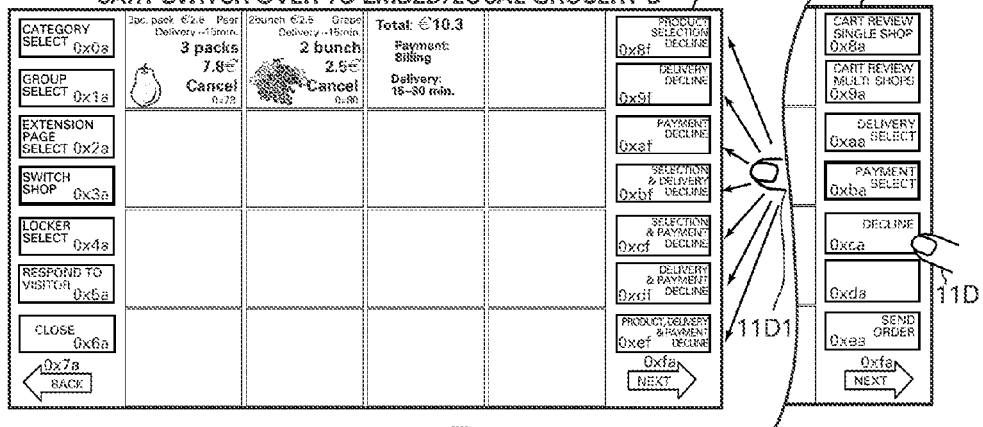
FIG. 7E
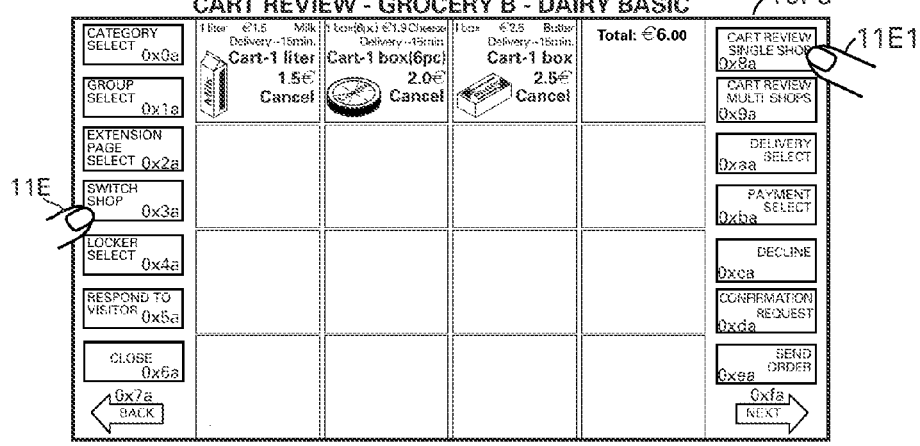
FIG. 8A
FIG. 8B

FIG. 10A
Electrical structure failure report 10S-5 / 8911

| | #1 ALL ELECTRICAL DOWN 0x00 | #2 POWER TO AIR-CON DOWN 0x10 | #3 POWER TO HEATER DOWN 0x20 | #4 NO HOT WATER 0x30 | |
|---|---|---|---|---|---|
| V E N D O R  L O G O | #5 SOME LIGHTS DOWN 0x40 | #6 NO POWER IN SOCKETS 0x50 | #7 CURTAIN DO NOT FUNCTION 0x60 | #8 SHUTTER DO NOT FUNCTION 0x70 | E L E C T R I C A L  A |
| | #9 ALL LIGHTS DOWN 0x80 | #10 BREAKER DOWN 0x90 | #11 NEED STRUCTURAL CHANGE 0xa0 | #12 STRUCTURAL CHANGE CONSULT 0xb0 | |
| CLOSE 0x6a / 0x7a BACK | #13 0xc0 | #14 0xd0 | #15 0xe0 | #16 0xf0 | 0xfa NEXT |

11S4

FIG. 10B
Electrical lights repair - day/time set 10S-6 / 8914

| | #1 URGENT WITHIN TODAY WEEK DAY $90.- 0x00 | #2 URGENT WITHIN 1 HOUR WEEK DAY $120.- 0x10 | #3 URGENT WITHIN TODAY SATURDAY $120.- 0x20 | #4 URGENT WITHIN 1 HOUR SATURDAY $150.- 0x30 | COD |
|---|---|---|---|---|---|
| CATEGORY SELECT | | | | | BILLING |
| CLASS SELECT | | | | | |
| OPTION SELECT | #5 URGENT WITHIN TODAY SUNDAY $180.- 0x40 | #6 URGENT WITHIN 1 HOUR SUNDAY $210.- 0x50 | #7 URGENT WITHIN TODAY HOLIDAY $180.- 0x60 | #8 URGENT WITHIN 1 HOUR HOLIDAY $210.- 0x70 | CLEARING |
| SWITCH SHOP | | | | | CREDIT CARD |
| NO CANCELLATION | #9 FOUR WEEKS SCHEDULE - MONDAY $60.- 0x80 | #10 FOUR WEEKS SCHEDULE - TUESDAY $60.- 0x90 | #11 FOUR WEEKS SCHEDULE - WEDNESDAY $60.- 0xa0 | #12 FOUR WEEKS SCHEDULE - THURSDAY $60.- 0xb0 | DECLINE 0xcf |
| RESPOND TO VISITOR 0x5f | | | | | CONFIRMATION REQUEST 0xdf |
| CLOSE 0x6f | #13 FOUR WEEKS SCHEDULE - FRIDAY $60.- 0xc0 | #14 FOUR WEEKS SCHEDULE SATURDAY $90.- 0xd0 | #15 FOUR WEEKS SCHEDULE - SUNDAY $120.- 0xe0 | #16 FOUR WEEKS SCHEDULE - HOLIDAY $120.- 0xf0 | SEND ORDER 0xef |
| 0x7f BACK | | | | | 0xff NEXT |

| URGENT WITHIN TODAY WEEK DAY (n DAY) URGENT WORK TARIFF 8:00~17:00 $90.- OVER TIME TOUCH SELECT | |
|---|---|
| CANCEL 0x0b | NEXT 1 ~ 3 0x08 |

FIG. 10D  0x08

| WEEK DAY 6:00~8:00 $120.- SELECT 0x01 | WEEK DAY 8:00~12:00 $90.- SELECT 0x02 |
|---|---|
| WEEK DAY 13:00~17:00 $90.- SELECT 0x03 | NEXT 4 ~ 6 0x09 |

FIG. 10E  0x09

| WEEK DAY 17:00~19:00 $120.- SELECT 0x04 | WEEK DAY 19:00~21:00 $150.- SELECT 0x05 |
|---|---|
| WEEK DAY 21:00~23:00 $180.- SELECT 0x06 | BACK 0x0a |

FIG. 10F  0x00

| MONDAY W 1<br>6:00~8:00<br>$90.-<br>SELECT<br>0x01  1 | 2  MONDAY W 1<br>8:00~12:00<br>$60.-<br>SELECT<br>0x02 |
|---|---|
| SELECT 3<br>MONDAY W 1<br>13:00~17:00<br>$60.-<br>0x03 | EXTEND<br>WEEK 1<br>0x08 |

FIG. 10G  0x08

| MONDAY W 1<br>17:00~19:00<br>$90.-<br>SELECT<br>0x04  4 | 5  MONDAY W 1<br>19:00~21:00<br>$120.-<br>SELECT<br>0x05 |
|---|---|
| SELECT 6<br>MONDAY W 1<br>21:00~23:00<br>$150.-<br>0x06 | NEXT<br>WEEK 2<br>0x09 |

FIG. 10H  0x09

| MONDAY W 2<br>6:00~8:00<br>$90.-<br>SELECT<br>0x81  1 | 2  MONDAY W 2<br>8:00~12:00<br>$60.-<br>SELECT<br>0x82 |
|---|---|
| MONDAY W 2  3<br>13:00~17:00<br>$60.-<br>SELECT<br>0x83 | EXTEND<br>WEEK 2<br>0x88 |

FIG. 10J  0x88

| MONDAY W 2<br>17:00~19:00<br>$90.-<br>SELECT<br>0x84  4 | 5  MONDAY W 2<br>19:00~21:00<br>$120.-<br>SELECT<br>0x85 |
|---|---|
| SELECT 6<br>MONDAY W 2<br>21:00~23:00<br>$150.-<br>0x86 | NEXT<br>WEEK 3<br>0x89 |

FIG. 10K  0x89

| MONDAY W 3<br>17:00~19:00<br>$120.-<br>SELECT<br>0x04  1 | 2  MONDAY W 3<br>19:00~21:00<br>$120.-<br>SELECT<br>0x05 |
|---|---|
| SELECT 3<br>MONDAY W 3<br>21:00~23:00<br>$150.-<br>0x06 | NEXT<br>WEEK 4<br>0x09 |

FIG. 10L  0x09

| MONDAY W 4<br>17:00~19:00<br>$120.-<br>SELECT<br>0x84  1 | 2  MONDAY W 4<br>19:00~21:00<br>$120.-<br>SELECT<br>0x85 |
|---|---|
| SELECT 3<br>MONDAY W 4<br>21:00~23:00<br>$150.-<br>0x86 | BACK TO<br>WEEK 1<br>0x89 |

FIG. 10M

Laundry services - day/time set        10S-7        8e11

| | #1 URGENT MACHINE WASH/DRY $9.5.-  0x00 | #2 URGENT DRY CLEANING $12~25  0x10 | #3 REGULAR MACHINE WASH/DRY $6.5  0x20 | #4 REGULAR DRY CLEANING $9~20  0x30 | |
|---|---|---|---|---|---|
| CATEGORY SELECT | | | | | COD |
| CLASS SELECT | #5 URGENT IRONING CLOTHS $4~18  0x40 | #6 URGENT ROLLER IRONING $3~12  0x50 | #7 REGULAR IRONING CLOTHS $2.5~9  0x60 | #8 REGULAR ROLLER IRONING $2~8  0x70 | BILLING |
| OPTION SELECT | | | | | CLEARING |
| SWITCH SHOP | #9 URGENT WASH/DRY IRON $3~16  0x80 | #10 SAME DAY WASH/DRY IRON $4~18  0x90 | #11 NEXT DAY WASH/DRY IRON $3~12  0xa0 | #12 REGULAR WASH/DRY IRON $2~9  0xb0 | CREDIT CARD |
| LOCKER SELECT | | | | | DECLINE 0xcf |
| RESPOND TO VISITOR 0x5f | #13 WASH/DRY SELF DELIVER & PICK UP $4.-  0xc0 | #14 DRY CLEANING SELF DELIVER & PICK UP $9~18  0xd0 | #15 IRONING SELF DELIVER & PICK UP $2~7  0xe0 | #16 SPECIAL SERVICES $1~35  0xf0 | CONFIRMATION REQUEST 0xdf |
| CLOSE 0x6f | | | | | SEND ORDER 0xef |
| ← 0x7f BACK | | | | | 0xff NEXT → |

FIG. 10N  0x01

| URGENT WASH/DRY<br>3.0kg IN BAG<br>PICK UP BY 9:00<br>RETURN NEXT DAY<br>BY 17:00 ; $9.5.-<br>SELECT<br>0x01  1 | 2  URGENT WASH/DRY<br>3.0kg FOLDED IN BOX<br>PICK UP BY 9:00<br>RETURN NEXT DAY<br>BY 17:00 ; $13.5.-<br>SELECT<br>0x02 |
|---|---|
| SELECT 3<br>URGENT WASH/DRY<br>3.0kg ON HANGERS<br>PICK UP BY 9:00<br>RETURN NEXT DAY<br>BY 17:00 ; $13.5.-<br>0x03 | NEXT<br>4~6<br>0x0b |

FIG. 10P  0x0b

| URGENT WASH/DRY<br>4.5kg IN BAG<br>PICK UP BY 9:00<br>RETURN NEXT DAY<br>BY 17:00 ; $13.5.-<br>SELECT<br>0x04  4 | 5  URGENT WASH/DRY<br>4.5kg FOLDED IN BOX<br>PICK UP BY 9:00<br>RETURN NEXT DAY<br>BY 17:00 ; $18.0.-<br>SELECT<br>0x05 |
|---|---|
| SELECT 6<br>URGENT WASH/DRY<br>4.5kg ON HANGERS<br>PICK UP BY 9:00<br>RETURN NEXT DAY<br>BY 17:00 ; $22.5.-<br>0x06 | NEXT<br>7~9<br>0x0c |

FIG. 10Q  0x0c

| URGENT WASH/DRY<br>6.0kg IN BAG<br>PICK UP BY 9:00<br>RETURN NEXT DAY<br>BY 17:00 ; $16.5.-<br>SELECT<br>0x07  7 | 8  URGENT WASH/DRY<br>6.0kg FOLDED IN BOX<br>PICK UP BY 9:00<br>RETURN NEXT DAY<br>BY 17:00 ; $21.0.-<br>SELECT<br>0x08 |
|---|---|
| SELECT 9<br>URGENT WASH/DRY<br>6.0kg ON HANGERS<br>PICK UP BY 9:00<br>RETURN NEXT DAY<br>BY 17:00 ; $25.5.-<br>0x09 | BACK<br>TO<br>1~3<br>0x0d |

FIG. 17
e-SHOPPING LINK CODE TO - CATEGORY & SHOP (16 bit) ~104

| | CATEGORY | CODE | CATEGORY | CODE | CATEGORY | CODE | CATEGORY | CODE |
|---|---|---|---|---|---|---|---|---|
| | Grocery | 0100 | Cooked meal | 0200 | Pharmacy | 0300 | Drug store | 0400 |
| Basic | Shop select page | 0101 | Shop select page | 0201 | Shop select page | 0301 | Shop select page | 0401 |
| Basic | Grocery A | 0110 | Cooked meal A | 0210 | Pharmacy A | 0310 | Drug store A | 0410 |
| Basic | Grocery B | 0120 | Cooked meal B | 0220 | Pharmacy B | 0320 | Drug store B | 0420 |
| Basic | Grocery n | 0130 | Cooked meal n | 0230 | Pharmacy n | 0330 | Drug store n | 0430 |
| Basic | Spare 0140 ~ | 0170 | Spare 0240 ~ | 0270 | Spare 0340 ~ | 0370 | Spare 0440 ~ | 0470 |
| Basic | Icon code | 0180 | Icon code | 0280 | Icon code | 0380 | Icon code | 0480 |
| Extension | Grocery A | 0190 | Cooked meal A | 0290 | Pharmacy A | 0390 | Drug store A | 0490 |
| Extension | Grocery B | 01a0 | Cooked meal B | 02a0 | Pharmacy B | 03a0 | Drug store B | 04a0 |
| Extension | Grocery n | 01b0 | Cooked meal n | 02b0 | Pharmacy n | 03b0 | Drug store n | 04b0 |
| Extension | Spare 01c0 ~ | 01f0 | Spare 01c0 ~ | 02f0 | Spare 01c0 ~ | 03f0 | Spare 01c0 ~ | 04f0 |
| | Pet | 0500 | Flower & garden | 0600 | Stationary | 0700 | School supply | 0800 |
| Basic | Shop select page | 0501 | Shop select page | 0601 | Shop select page | 0701 | Shop select page | 0801 |
| Basic | Pet A | 0510 | Flower & garden A | 0610 | Stationary A | 0710 | School supply A | 0810 |
| Basic | Pet B | 0520 | Flower & garden B | 0620 | Stationary B | 0720 | School supply B | 0820 |
| Basic | Pet n | 0530 | Flower & garden n | 0630 | Stationary n | 0730 | School supply n | 0830 |
| Basic | Spare 0540 ~ | 0570 | Spare 0640 ~ | 0670 | Spare 0740 ~ | 0770 | Spare 0840 ~ | 0870 |
| Basic | Icon code | 0580 | Icon code | 0680 | Icon code | 0780 | Icon code | 0880 |
| Extension | Pet A | 0590 | Flower & garden A | 0690 | Stationary A | 0790 | School supply A | 0890 |
| Extension | Pet B | 05a0 | Flower & garden B | 06a0 | Stationary B | 07a0 | School supply B | 08a0 |
| Extension | Pet n | 05b0 | Flower & garden n | 06b0 | Stationary n | 07b0 | School supply n | 08b0 |
| Extension | Spare 05c0 ~ | 05f0 | Spare 06c0 ~ | 06f0 | Spare 07c0 ~ | 07f0 | Spare 08c0 ~ | 08f0 |
| | Books & gifts | 0900 | Toys | 0a00 | Towel & underwear | 0b00 | Apparel & shoes | 0c00 |
| Basic | Shop select page | 0901 | Shop select page | 0a01 | Shop select page | 0b01 | Shop select page | 0c01 |
| Basic | Books & gifts A | 0910 | Toys A | 0a10 | Towel & underwear A | 0b10 | Apparel & shoes A | 0c10 |
| Basic | Books & gifts B | 0920 | Toys B | 0a20 | Towel & underwear B | 0b20 | Apparel & shoes B | 0c20 |
| Basic | Books & gifts n | 0930 | Toys n | 0a30 | Towel & underwear n | 0b30 | Apparel & shoes n | 0c30 |
| Basic | Spare 0940 ~ | 0970 | Spare 0a40 ~ | 0a70 | Spare 0b40 ~ | 0b70 | Spare 0c40 ~ | 0c70 |
| Basic | Icon code | 0980 | Icon code | 0a80 | Icon code | 0b80 | Icon code | 0c80 |
| Extension | Books & gifts A | 0990 | Toys A | 0a90 | Towel & underwear A | 0b90 | Apparel & shoes A | 0c90 |
| Extension | Books & gifts B | 09a0 | Toys B | 0aa0 | Towel & underwear B | 0ba0 | Apparel & shoes B | 0ca0 |
| Extension | Books & gifts n | 09b0 | Toys n | 0ab0 | Towel & underwear n | 0bb0 | Apparel & shoes n | 0cb0 |
| Extension | Spare 09c0 ~ | 09f0 | Spare 0ac0 ~ | 0af0 | Spare 0bc0 ~ | 0bf0 | Spare 0cc0 ~ | 0cf0 |
| | Fashion | 0d00 | Bedding | 0e00 | Sport & fitness | 0f00 | D.I.Y Hardware | 1000 |
| Basic | Shop select page | 0d01 | Shop select page | 0e01 | Shop select page | 0f01 | Shop select page | 1001 |
| Basic | Fashion A | 0d10 | Bedding A | 0e10 | Sport & fitness A | 0f10 | Hardware A | 1010 |
| Basic | Fashion B | 0d20 | Bedding B | 0e20 | Sport & fitness B | 0f20 | Hardware B | 1020 |
| Basic | Fashion n | 0d30 | Bedding n | 0e30 | Sport & fitness n | 0f30 | Hardware n | 1030 |
| Basic | Spare 0d40 ~ | 0d70 | Spare 0e40 ~ | 0e70 | Spare 0f40 ~ | 0f70 | Spare 1040 ~ | 1070 |
| Basic | Icon code | 0d80 | Icon code | 0e80 | Icon code | 0f80 | Icon code | 1080 |
| Extension | Fashion A | 0d90 | Bedding A | 0e90 | Sport & fitness A | 0f90 | Hardware A | 1090 |
| Extension | Fashion B | 0da0 | Bedding B | 0ea0 | Sport & fitness B | 0fa0 | Hardware B | 10a0 |
| Extension | Fashion n | 0db0 | Bedding n | 0eb0 | Sport & fitness n | 0fb0 | Hardware n | 10b0 |
| Extension | Spare 0dc0 ~ | 0df0 | Spare 0ec0 ~ | 0ef0 | Spare 0fc0 ~ | 0ff0 | Spare 10c0 ~ | 10f0 |
| | Furniture | 1100 | Appliances | 1200 | A/V, PC & photo | 1300 | Spare | 1400 |
| Basic | Shop select page | 1101 | Shop select page | 1201 | Shop select page | 1301 | Spare | 1401 |
| Basic | Furniture A | 1110 | Appliances A | 1210 | A/V, PC & photo A | 1310 | Spare | 1410 |
| Basic | Furniture B | 1120 | Appliances B | 1220 | A/V, PC & photo B | 1320 | Spare | 1420 |
| Basic | Furniture n | 1130 | Appliances n | 1230 | A/V, PC & photo n | 1330 | Spare | 1430 |
| Basic | Spare 1140 ~ | 1170 | Spare 1240 ~ | 1270 | Spare 1340 ~ | 1370 | Spare 1440 ~ | 1470 |
| Basic | Icon code | 1180 | Icon code | 1280 | Icon code | 1380 | Icon code | 1480 |
| Extension | Furniture A | 1190 | Appliances A | 1290 | A/V, PC & photo A | 1390 | Spare | 1490 |
| Extension | Furniture B | 11a0 | Appliances B | 12a0 | A/V, PC & photo B | 13a0 | Spare | 14a0 |
| Extension | Furniture n | 11b0 | Appliances n | 12b0 | A/V, PC & photo n | 13b0 | Spare | 14b0 |
| Extension | Spare 11c0 ~ | 11f0 | Spare 12c0 ~ | 12f0 | Spare 13c0 ~ | 13f0 | Spare 14c0 ~ | 6ff0 |

FIG. 18A    e-SERVICE LINK CODE TO CATEGORY & CLASS (16 bit)   /104S

| CATEGORY | CODE | CATEGORY | CODE | CATEGORY | CODE |
|---|---|---|---|---|---|
| Emergency | 8100 | Security & alarm | 8200 | Handicap & elderly | 8300 |
| Link pages | 8101~f | Link pages | 8201~f | Link pages | 8301~f |
| Alert | 8110 | Alert | 8210 | Alert | 8310 |
| Ambulance | 8120 | Police | 8220 | Handicap center | 8320 |
| Weekend hospital | 8130 | Alarm monitoring | 8230 | Wheel chair | 8330 |
| Weekend dentist | 8140 | Spare | 8240 | Nursing | 8340 |
| ∫ | ∫ | ∫ | ∫ | ∫ | ∫ |
| Spare | 81f0 | Spare | 82f0 | Spare | 83f0 |
| Fire, gas & water | 8400 | Dental | 8500 | Medical | 8600 |
| Link pages | 8401~f | Link pages | 8501~f | Link pages | 8601~f |
| Alert | 8410 | Alert | 8510 | Alert | 8610 |
| Fire station | 8420 | Clinic | 8520 | Hospital | 8620 |
| Gas station | 8430 | Doctors | 8530 | Doctors | 8630 |
| Water supply | 8440 | Nursing | 8540 | Nursing | 8640 |
| ∫ | ∫ | ∫ | ∫ | ∫ | ∫ |
| Spare | 84f0 | Spare | 85f0 | Spare | 86f0 |
| Handicap support devices maintenance | 8700 | Water & gas maintenance | 8800 | Electrical maintenance | 8900 |
| Link pages | 8701~f | Link pages | 8801~f | Link pages | 8901~f |
| Hearing aids repair | 8710 | Water plumbing | 8810 | Electrical structure | 8910 |
| Artificial limb repair | 8720 | Bath/toilet | 8820 | Electrical appliances | 8920 |
| Cane repair | 8730 | Gas plumbing | 8830 | Kitchen appliances | 8930 |
| Stretches repair | 8740 | Gas appliances | 8840 | Bath/washing appliances | 8940 |
| ∫ | ∫ | ∫ | ∫ | ∫ | ∫ |
| Spare | 87f0 | Spare | 88f0 | Spare | 89f0 |
| HAVC maintenance | 8a00 | A/V maintenance | 8b00 | PC, tel & network maintenance | 8c00 |
| Link pages | 8a01~f | Link pages | 8b01~f | Link pages | 8c01~f |
| Airconditioner | 8a10 | A/V appliances | 8b10 | Home network | 8c10 |
| Heating system | 8a20 | PC & printers | 8b20 | TV antenna | 8c20 |
| Fan | 8a30 | PC wire network | 8b30 | TV cable | 8c30 |
| Exhaust | 8a40 | Wireless network | 8b40 | Tel line | 8c40 |
| ∫ | ∫ | ∫ | ∫ | ∫ | ∫ |
| Spare | 8af0 | Spare | 8bf0 | Spare | 8cf0 |
| Laundry | 8d00 | Residence cleaning | 8e00 | Floor & walls maintenance | 8f00 |
| Link pages | 8d01~f | Link pages | 8e01~f | Link pages | 8f01~f |
| Washing service | 8d10 | Carpets | 8e10 | Wood/floor tiles | 8f10 |
| Self wash rooms | 8d20 | Curtains | 8e20 | Carpets | 8f20 |
| Wash & iron | 8d30 | Overall cleaning | 8e30 | Wall paper | 8f30 |
| Dry cleaning | 8d40 | Bugs extermination | 8e40 | Wall painting | 8f40 |
| ∫ | ∫ | ∫ | ∫ | ∫ | ∫ |
| Spare | 8df0 | Spare | 8ef0 | Spare | 8ff0 |

FIG. 18B
e-SERVICE LINK CODE TO CATEGORY & CLASS (16 bit) /104S

| CATEGORY | CODE | CATEGORY | CODE | CATEGORY | CODE |
|---|---|---|---|---|---|
| Windows & doors maintenance | 9000 | Hair & beauty | 9100 | Maid services | 9200 |
| Link pages | 9001~f | Link pages | 9101~f | Link pages | 9201~f |
| Glass | 9010 | Hair saloon | 9110 | Random maid | 9210 |
| Keys & locks | 9020 | Beauty parlor | 9120 | Maids for hire | 9220 |
| Door | 9030 | Men's barber | 9130 | Monthly maids | 9230 |
| Windows | 9040 | Body massage | 9140 | All year maids | 9240 |
| ≀ | ≀ | ≀ | ≀ | ≀ | ≀ |
| Spare | 90f0 | Spare | 91f0 | Spare | 92f0 |
| Travel & tour | 9300 | Travel-local | 9400 | Financial | 9500 |
| Link pages | 9301~f | Link pages | 9401~f | Link pages | 9501~f |
| Air tickets | 9310 | Taxi | 9410 | Banks | 9510 |
| Hotel booking | 9320 | Limousine | 9420 | Insurance | 9520 |
| Train tickets | 9330 | Moving & truck | 9430 | Credit cards | 9530 |
| Group & bus tours | 9340 | School bus & bus | 9440 | Clearing center | 9540 |
| ≀ | ≀ | ≀ | ≀ | ≀ | ≀ |
| Spare | 93f0 | Spare | 94f0 | Spare | 95f0 |
| Downloads | 9600 | Downloads | 9700 | Entertainment | 9800 |
| Link pages | 9601~f | Link pages | 9701~f | Link pages | 9801~f |
| Movies | 9610 | Newspaper | 9710 | Shows box office | 9810 |
| Music | 9620 | Books | 9720 | Concerts box office | 9820 |
| Games | 9630 | Magazines | 9730 | Exhibits box office | 9830 |
| Software | 9640 | Periodicals | 9740 | Cinema box office | 9840 |
| ≀ | ≀ | ≀ | ≀ | ≀ | ≀ |
| Spare | 96f0 | Spare | 97f0 | Spare | 98f0 |
| Prep-school | 9900 | Baby/pre-school care | 9a00 | Tailoring, fit & repair | 9b00 |
| Link pages | 9901~f | Link pages | 9a01~f | Link pages | 9b01~f |
| Prep-school center | 9910 | Baby care center | 9a10 | Tailor | 9b10 |
| Private teaching | 9920 | Half day pre-school | 9a20 | Fitting/adjusting | ≀ |
| Kindergarten | 9930 | Whole day pre-school | 9a30 | Shoe repair | ≀ |
| Spare | 9940 | Baby sitting | 9a40 | Apparel repair | ≀ |
| ≀ | ≀ | ≀ | ≀ | ≀ | ≀ |
| Spare | 99f0 | Spare | 9af0 | Spare | 9bf0 |
| Office services | 9c00 | Spare | 9d00 | Spare | ff00 |
| Link pages | 9c01~f | Link pages | 9d01~f | Link pages | ef01~f |
| Photo copy center | 9c10 | Spare | 9d10 | Spare | ef10 |
| Printing center | 9c20 | ≀ | 9d20 | ≀ | ≀ |
| Video conferencing | 9c30 | ≀ | 9d30 | ≀ | ≀ |
| Events center | 9c40 | ≀ | 9d40 | ≀ | ≀ |
| ≀ | ≀ | ≀ | ≀ | ≀ | ≀ |
| Spare | 9cf0 | Spare | 9df0 | Last e-Service provider | efff |

FIG. 18C
ADMINISTRATION PAGES e-SHOPPING CODE (16 bit) /104-1

| ADMINISTRATION PAGE e-SHOPPING |||||
|---|---|---|---|
| PARTICULARS | CODE | PARTICULARS | CODE |
| PAGE A | 7000~7100 | PAGE I | 7801~7900 |
| PAGE B | 7101~7200 | PAGE J | 7901~7a00 |
| PAGE C | 7201~7300 | PAGE K | 7a01~7b00 |
| PAGE D | 7301~7400 | PAGE L | 7b01~7c00 |
| PAGE E | 7401~7500 | PAGE M | 7c01~7d00 |
| PAGE F | 7501~7600 | PAGE O | 7d01~7e00 |
| PAGE G | 7601~7700 | PAGE P | 7e01~7f00 |
| PAGE H | 7701~7800 | PAGE n | 7f01~7fff |

FIG. 18D
ADMINISTRATION PAGES e-SERVICE CODE (16 bit) /104S-1

| ADMINISTRATION PAGE e-SERVICE |||||
|---|---|---|---|
| PARTICULARS | CODE | PARTICULARS | CODE |
| PAGE A | f000~f100 | PAGE I | f801~f900 |
| PAGE B | f101~f200 | PAGE J | f901~fa00 |
| PAGE C | f201~f300 | PAGE K | fa01~fb00 |
| PAGE D | f301~f400 | PAGE L | fb01~fc00 |
| PAGE E | f401~f500 | PAGE M | fc01~fd00 |
| PAGE F | f501~f600 | PAGE O | fd01~fe00 |
| PAGE G | f601~f700 | PAGE P | fe01~ff00 |
| PAGE H | f701~f800 | PAGE n | ff01~ffff |

FIG. 18E
e-SERVICE LINK CODE TO ELECTRICAL MAINTENANCE, CLASS & SHOP (16 bit) /104S-E

| Electrical maintenance class page 8900 ||||
|---|---|---|---|
| Link pages 8901~890f ||||
| Maintenance shop page - structure | 8910 | Maintenance shop page - appliance | 8920 |
| Electric. general repair shops A ~ n and failure report pages | 8911~8913 | Elect. appliance repair shops A ~ n and failure report pages | 8921~8923 |
| Electrical repair - schedule page | 8914~8916 | Elect. appliance - schedule page | 8924~8926 |
| Link pages | 8917~8918 | Link pages | 8927~8928 |
| Electric. general repair shops D ~ n and failure report pages | 8919~891b | Elect. appliance repair shops D ~ n and failure report pages | 8929~892b |
| Electrical repair - schedule page | 891c~891e | Elect. appliance - schedule page | 892c~892e |
| Spare | 891f | Spare | 892f |
| Repair shop page - kitchen appl. | 8930 | Repair shop page - bath/wash appl. | 8940 |
| Kitchen appl. repair shops A ~ n and failure report pages | 8931~8933 | Bath/wash appl. repair shops A ~ n and failure report pages | 8941~8943 |
| Kitchen appl. repair - schedule page | 8934~8936 | Bath/wash appl. - schedule page | 8944~8946 |
| Link pages | 8937~8938 | Link pages | 8947~8948 |
| Kitchen appl. repair shops D ~ n and failure report pages | 8939~893b | Bath/wash appl. repair shops D ~ n and failure report pages | 8929~892b |
| Kitchen appl. - schedule page | 893c~893e | Bath/wash appl. - schedule page | 894c~894e |
| Spare | 893f | Spare | 894f |

FIG. 19    e-SHOPPING GROUP LINK CODE - GROCERY (16 bit)    ~104

| Group codes for grocery shops (basic) | Bread & Rolls | Oil, butter & Margarine | Dairy product (basic) | Breakfast & Cereal | Fruits | Vegetables | Pickles | Condiments | Fish & Sea food | Meat & Meat product | Coffee & Tea | Baby food | Frozen food | Sauces & Spices | Canned food & Soups | Juice/non-gas Beverages |
|---|---|---|---|---|---|---|---|---|---|---|---|---|---|---|---|---|
| Grocery shop names | | | | | | | | | | | | | | | | |
| Grocery A | 0110 | 0111 | 0112 | 0113 | 0114 | 0115 | 0116 | 0117 | 0118 | 0119 | 011a | 011b | 011c | 011d | 011e | 011f |
| Grocery B | 0120 | 0121 | 0122 | 0123 | 0124 | 0125 | 0126 | 0127 | 0128 | 0129 | 012a | 012b | 012c | 012d | 012e | 012f |
| Grocery n | 0130 | 0131 | 0132 | 0133 | 0134 | 0135 | 0136 | 0137 | 0138 | 0139 | 013a | 013b | 013c | 013d | 013e | 013f |
| Spare | 0140 | 0141 | 0142 | 0143 | 0144 | 0145 | 0146 | 0147 | 0148 | 0149 | 014a | 014b | 014c | 014d | 014e | 014f |
| Spare | 0150 | 0151 | 0152 | 0153 | 0154 | 0155 | 0156 | 0157 | 0158 | 0159 | 015a | 015b | 015c | 015d | 015e | 015f |
| Spare | 0160 | 0161 | 0162 | 0163 | 0164 | 0165 | 0166 | 0167 | 0168 | 0169 | 016a | 016b | 016c | 016d | 016e | 016f |
| Recall shop | Spare | Spare | Spare | Spare | Spare | Spare | Spare | Spare | Spare | Spare | Shop A | Shop B | Shop C | Shop D | Shop E | Shop n |
| Recall shop codes | 0170 | 0171 | 0172 | 0173 | 0174 | 0175 | 0176 | 0177 | 0178 | 0179 | 017a | 017b | 017c | 017d | 017e | 017f |
| Key function & logo | Close | Extend | Back | Choice page | Spare | Spare | Spare | Spare | Spare | Spare | LogoA | LogoB | LogoC | LogoD | LogoE | Logo n |
| Key & logo codes | 0180 | 0181 | 0182 | 0183 | 0184 | 0185 | 0186 | 0187 | 0188 | 0189 | 018a | 018b | 018c | 018d | 018e | 018f |

| Group codes for grocery shops (extension) | Cookies & Candies | Chocolates | Cakes | Nuts & Seeds | Food gifts | Baking materials | Snacks | Pasta | Detergents & Soap | Tissues & Napkins | Paper towels & Toilet | Diet food | Beer | Wine | Liquor | Sodas |
|---|---|---|---|---|---|---|---|---|---|---|---|---|---|---|---|---|
| Grocery shop names | | | | | | | | | | | | | | | | |
| Grocery A | 0190 | 0191 | 0192 | 0193 | 0194 | 0195 | 0196 | 0197 | 0198 | 0199 | 019a | 019b | 019c | 019d | 019e | 019f |
| Grocery B | 01a0 | 01a1 | 01a2 | 01a3 | 01a4 | 01a5 | 0ab6 | 01a7 | 01a8 | 01a9 | 01aa | 01ab | 01ac | 01ad | 01ae | 01af |
| Grocery n | 01b0 | 01b1 | 01b2 | 01b3 | 01b4 | 01b5 | 01b6 | 01b7 | 01b8 | 01b9 | 01ba | 01bb | 01bc | 01bd | 01be | 01bf |
| Spare | 01c0 | 01c1 | 01c2 | 01c3 | 01c4 | 01c5 | 01c6 | 01c7 | 01c8 | 01c9 | 01ca | 01cb | 01cc | 01cd | 01ce | 01cf |
| Spare | 01d0 | 01d1 | 01d2 | 01d3 | 01d4 | 01d5 | 01d6 | 01d7 | 01d8 | 01d9 | 01da | 01db | 01dc | 01dd | 01de | 01df |
| Spare | 01e0 | 01e1 | 01e2 | 01e3 | 01e4 | 01e5 | 01e6 | 01e7 | 01e8 | 01e9 | 01ea | 01eb | 01ec | 01ed | 01ee | 01ef |
| Recall shop select page | Close | Spare | Back | Choice page | Spare | Spare | Spare | Spare | Spare | Spare | Shop A | Shop B | Shop C | Shop D | Shop E | Shop n |
| Key & spare | 01f0 | 01f1 | 01f2 | 01f3 | 01f4 | 01f5 | 01f6 | 01f7 | 01f8 | 0ef9 | 01fa | 01fb | 01fc | 01fd | 01fe | 01ff |
| Key & recall shop codes | | | | | | | | | | | | | | | | |

FIG. 20A  BASIC PRODUCT QUANTITY/VARIATION CODES (8 bit)

105A

| | Item #1 | | Item #2 | | Item #3 | | Item #4 | | Item #5 | | Item #6 | | Item #7 | | Item #8 | | Item #9 | | Item #10 | | Item #11 | | Item #12 | | Item #13 | | Item #14 | | Item #15 | | Item #16 | |
|---|---|---|---|---|---|---|---|---|---|---|---|---|---|---|---|---|---|---|---|---|---|---|---|---|---|---|---|---|---|---|---|---|
| Select basic products | | | | | | | | | | | | | | | | | | | | | | | | | | | | | | | | |
| 1: buy base package | 0x00 | | 0x10 | | 0x20 | | 0x30 | | 0x40 | | 0x50 | | 0x60 | | 0x70 | | 0x80 | | 0x90 | | 0xa0 | | 0xb0 | | 0xc0 | | 0xd0 | | 0xe0 | | 0xf0 | |
| 2: buy amend 2nd package | 0x01 | | 0x11 | | 0x21 | | 0x31 | | 0x41 | | 0x51 | | 0x61 | | 0x71 | | 0x81 | | 0x91 | | 0xa1 | | 0xb1 | | 0xc1 | | 0xd1 | | 0xe1 | | 0xf1 | |
| 3: buy amend 3rd package | 0x02 | | 0x12 | | 0x22 | | 0x32 | | 0x42 | | 0x52 | | 0x62 | | 0x72 | | 0x82 | | 0x92 | | 0xa2 | | 0xb2 | | 0xc2 | | 0xd2 | | 0xe2 | | 0xf2 | |
| 4: buy amend 4th package | 0x03 | | 0x13 | | 0x23 | | 0x33 | | 0x43 | | 0x53 | | 0x63 | | 0x73 | | 0x83 | | 0x93 | | 0xa3 | | 0xb3 | | 0xc3 | | 0xd3 | | 0xe3 | | 0xf3 | |
| 5: buy amend 5th package | 0x04 | | 0x14 | | 0x24 | | 0x34 | | 0x44 | | 0x54 | | 0x64 | | 0x74 | | 0x84 | | 0x94 | | 0xa4 | | 0xb4 | | 0xc4 | | 0xd4 | | 0xe4 | | 0xf4 | |
| 6: buy amend 6th package | 0x05 | | 0x15 | | 0x25 | | 0x35 | | 0x45 | | 0x55 | | 0x65 | | 0x75 | | 0x85 | | 0x95 | | 0xa5 | | 0xb5 | | 0xc5 | | 0xd5 | | 0xe5 | | 0xf5 | |
| | 0x06 | | 0x16 | | 0x26 | | 0x36 | | 0x46 | | 0x56 | | 0x66 | | 0x76 | | 0x86 | | 0x96 | | 0xa6 | | 0xb6 | | 0xc6 | | 0xd6 | | 0xe6 | | 0xf6 | |
| Cancel | 0x07 | | 0x17 | | 0x27 | | 0x37 | | 0x47 | | 0x57 | | 0x67 | | 0x77 | | 0x87 | | 0x97 | | 0xa7 | | 0xb7 | | 0xc7 | | 0xd7 | | 0xe7 | | 0xf7 | |
| Next | 0x08 | | 0x18 | | 0x28 | | 0x38 | | 0x48 | | 0x58 | | 0x68 | | 0x78 | | 0x88 | | 0x98 | | 0xa8 | | 0xb8 | | 0xc8 | | 0xd8 | | 0xe8 | | 0xf8 | |
| Back | 0x09 | | 0x19 | | 0x29 | | 0x39 | | 0x49 | | 0x59 | | 0x69 | | 0x79 | | 0x89 | | 0x99 | | 0xa9 | | 0xb9 | | 0xc9 | | 0xd9 | | 0xe9 | | 0xf9 | |

105B

| | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| Operate/select icons | CATEGORY SELECT | GROUP SELECT | SELECT EXTEND PAGE | SWITCH SHOP | LOCKER SELECT | RESPOND TO VISITOR | CLOSE | BACK | CART REVIEW SINGLE SHOP | CART REVIEW MULTI SHOP | DELIVERY SELECT | PAYMENT SELECT | DECLINE | CONFIRM REQUEST | SEND ORDER | NEXT |
| Vertical column icon codes | 0x0a | 0x1a | 0x2a | 0x3a | 0x4a | 0x5a | 0x6a | 0x7a | 0x8a | 0x9a | 0xaa | 0xba | 0xca | 0xda | 0xea | 0xfa |

105C

Payment mode select icon
Payment mode code

| | #9 | #10 | #11 | #12 |
|---|---|---|---|---|
| | COD | Billing | Clearing | Credit C |
| | 0x8b | 0x9b | 0xab | 0xbb |

105D

| Vertical column icons | #1 | #2 | #3 | #4 | #5 | #6 | #7 | #8 | #9 | #10 | #11 | #12 |
|---|---|---|---|---|---|---|---|---|---|---|---|---|
| Embed/local delivery time/day | ~15m. | 15~30m | 30~60m | 1~2h. | | | | | 2~6h. | 6~12h. | Next day | 2~7day |
| Embed/local delivery codes | 0x0c | 0x1c | 0x2c | 0x3c | | | | | 0x8c | 0x9c | 0xac | 0xbc |
| Ward ~ city delivery time/day | 1~2h. | 2~6h. | 6~12h. | Next:10:00 | | | | | Next-20:00 | Next-nxt 2~7day | 1~2week | 2~4week |
| Ward ~ city delivery codes | 0x0d | 0x1d | 0x2d | 0x3d | | | | | 0x8d | 0x9d | 0xad | 0xbd |
| State~global delivery time/day | Next-10 | Next-15 | Next-20 | Next-nxt 10 | | | | | Next-nxt-20 | 2~7day | 1~2week | 2~4week |
| State~global delivery codes | 0x0e | 0x1e | 0x2e | 0x3e | | | | | 0x8e | 0x9e | 0xae | 0xbe |
| Locker delivery time/day | Next-10 | Next-15 | Next-20 | Next-nxt 10 | | | | | Next-nxt-20 | 2~7day | 1~2week | 2~4week |
| Locker delivery codes | 0x0e | 0x1e | 0x2e | 0x3e | | | | | 0x8e | 0x9e | 0xae | 0xbe |

105E

| Locker type/size select icon | Small | Med | Large | Fridge | Freeze |
|---|---|---|---|---|---|
| Locker type/size code | 0x0f | 0x1f | 0x2f | 0x3f | 0x4f |

105F

| | Decline Products | Decline Delivery | Decline Payment | Decline Products & delivery | Decline Products & payment | Decline Payment & delivery | Decline All reasons combined |
|---|---|---|---|---|---|---|---|
| | 0x8f | 0x9f | 0xaf | 0xbf | 0xcf | 0xdf | 0xef |
| | | | | | | | Code |

FIG. 20B      EXTENDED PRODUCT QUANTITY/VARIATION CODES (8 bit)  — 105G

| | Item #17 | Item #18 | Item #19 | Item #20 | Item #21 | Item #22 | Item #23 | Item #24 | Item #25 | Item #26 | Item #27 | Item #28 | Item #29 | Item #30 | Item #31 | Item #32 |
|---|---|---|---|---|---|---|---|---|---|---|---|---|---|---|---|---|
| Select extended products | | | | | | | | | | | | | | | | |
| 1: buy base package | 0x00 | 0x10 | 0x20 | 0x30 | 0x40 | 0x50 | 0x60 | 0x70 | 0x80 | 0x90 | 0xa0 | 0xb0 | 0xc0 | 0xd0 | 0xe0 | 0xf0 |
| 2: buy amend 2nd package | 0x01 | 0x11 | 0x21 | 0x31 | 0x41 | 0x51 | 0x61 | 0x71 | 0x81 | 0x91 | 0xa1 | 0xb1 | 0xc1 | 0xd1 | 0xe1 | 0xf1 |
| 3: buy amend 3rd package | 0x02 | 0x12 | 0x22 | 0x32 | 0x42 | 0x52 | 0x62 | 0x72 | 0x82 | 0x92 | 0xa2 | 0xb2 | 0xc2 | 0xd2 | 0xe2 | 0xf2 |
| 4: buy amend 4th package | 0x03 | 0x13 | 0x23 | 0x33 | 0x43 | 0x53 | 0x63 | 0x73 | 0x83 | 0x93 | 0xa3 | 0xb3 | 0xc3 | 0xd3 | 0xe3 | 0xf3 |
| 5: buy amend 5th package | 0x04 | 0x14 | 0x24 | 0x34 | 0x44 | 0x54 | 0x64 | 0x74 | 0x84 | 0x94 | 0xa4 | 0xb4 | 0xc4 | 0xd4 | 0xe4 | 0xf4 |
| 6: buy amend 6th package | 0x05 | 0x15 | 0x25 | 0x35 | 0x45 | 0x55 | 0x65 | 0x75 | 0x85 | 0x95 | 0xa5 | 0xb5 | 0xc5 | 0xd5 | 0xe5 | 0xf5 |
| | 0x06 | 0x16 | 0x26 | 0x36 | 0x46 | 0x56 | 0x66 | 0x76 | 0x86 | 0x96 | 0xa6 | 0xb6 | 0xc6 | 0xd6 | 0xe6 | 0xf6 |
| Cancel | 0x07 | 0x17 | 0x27 | 0x37 | 0x47 | 0x57 | 0x67 | 0x77 | 0x87 | 0x97 | 0xa7 | 0xb7 | 0xc7 | 0xd7 | 0xe7 | 0xf7 |
| Next | 0x08 | 0x18 | 0x28 | 0x38 | 0x48 | 0x58 | 0x68 | 0x78 | 0x88 | 0x98 | 0xa8 | 0xb8 | 0xc8 | 0xd8 | 0xe8 | 0xf8 |
| Back | 0x09 | 0x19 | 0x29 | 0x39 | 0x49 | 0x59 | 0x69 | 0x79 | 0x89 | 0x99 | 0xa9 | 0xb9 | 0xc9 | 0xd9 | 0xe9 | 0xf9 |

| | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| Operate/select icons | CATE-GORY SELECT | GROUP SELECT | SELECT BASIC PAGE | SWITCH SHOP | LOCKER SELECT | RESP-OND TO VISITOR | CLOSE | BACK | CART REVIEW SINGLE SHOP | CART REVIEW MULTI SHOP | DELIVERY SELECT | PAYMENT SELECT | DECLINE | CON-FIRM REQUEST | SEND ORDER | NEXT |
| Vertical column icon codes | 0x0a | 0x1a | 0x2a | 0x3a | 0x4a | 0x5a | 0x6a | 0x7a | 0x8a | 0x9a | 0xaa | 0xba | 0xca | 0xda | 0xea | 0xfa |

— 105H

Payment mode select icon — 105J

| Payment mode code | COD 0x8b | Billing 0x9b | Clearing 0xab | Credit C 0xbb |
|---|---|---|---|---|

— 105K

| Vertical column icons | #1 | #2 | #3 | #4 | #5 | #6 | #7 | #8 | #9 | #10 | #11 | #12 |
|---|---|---|---|---|---|---|---|---|---|---|---|---|
| Embed/local delivery time/day | ~15m. | 15–30m | 30–60m | 1–2h. | | | | | 2–6h. | 6–12h. | Next day | 2–7day |
| Embed/local delivery codes | 0x0c | 0x1c | 0x2c | 0x3c | | | | | 0x8c | 0x9c | 0xac | 0xbc |
| Ward ~ city delivery time/day | 1–2h. | 2–6h. | 6–12h | Next 10:00 | | | | | Next 20:00 | Next-nxt 0x9d | 2–7day 0xad | 1–2week 0xbd |
| Ward ~ city delivery codes | 0x0d | 0x1d | 0x2d | 0x3d | | | | | 0x8d | | | |
| State-global delivery time/day | Next-10 | Next-15 | Next-20 | Next-nxt:10 | | | | | Next-nxt:20 | Next-nxt 0x9e | 2–7day 0xae | 1–2week 0xbe |
| State-global delivery codes | 0x0e | 0x1e | 0x2e | 0x3e | | | | | 0x8e | | 2–7day 0xae | 2–4week 0xbe |
| Locker type/size select icon | Small | Med | Large | Fridge | Freeze | | | | | | | |
| Locker type/size code | 0x0f | 0x1f | 0x2f | 0x3f | 0x4f | | | | | | | |

— 105L

— 105M

| Decline Products | Decline Delivery | Decline Payment | Decline Products & delivery | Decline Payment & delivery | Decline Payment Products | Decline All reasons combined |
|---|---|---|---|---|---|---|
| 0x8f | 0x9f | 0xaf | 0xbf | 0xcf | 0xdf | 0xef |
| | | | | | | Code |

FIG. 21A
EMBEDDED DELIVERY/PAYMENT CODE (8 bit) 106-1

| Provider location / Delivery time | COD Embedded #1 | COD Local #2 | Billing Embedded #1 | Billing Local #2 | Clearing Embedded #1 | Clearing Local #2 | Credit card Embedded #1 | Credit card Local #2 |
|---|---|---|---|---|---|---|---|---|
| ~15 minutes | 0x00 | — | 0x10 | — | 0x20 | — | 0x30 | — |
| 15~30 minutes | 0x01 | 0x01 | 0x11 | 0x11 | 0x21 | 0x21 | 0x31 | 0x31 |
| 30~60 minutes | 0x02 | 0x02 | 0x12 | 0x12 | 0x22 | 0x22 | 0x32 | 0x32 |
| 1~2 hours | 0x03 | 0x03 | 0x13 | 0x13 | 0x23 | 0x23 | 0x33 | 0x33 |
| 2~6 hours | 0x04 | 0x04 | 0x14 | 0x14 | 0x24 | 0x24 | 0x34 | 0x34 |
| 6~12 hours | 0x05 | 0x05 | 0x15 | 0x15 | 0x25 | 0x25 | 0x35 | 0x35 |
| Next day | 0x06 | 0x06 | 0x16 | 0x16 | 0x26 | 0x26 | 0x36 | 0x36 |
| 2~7 days | 0x07 | 0x07 | 0x17 | 0x17 | 0x27 | 0x27 | 0x37 | 0x37 |

FIG. 21B
WARD, TOWN & CITY DELIVERY/PAYMENT CODE (8 bit) 106-2

| Payment method / Provider location / Delivery time | COD Ward #3 | COD Town #4 | COD City #5 | Billing Ward #3 | Billing Town #4 | Billing City #5 | Clearing Ward #3 | Clearing Town #4 | Clearing City #5 | Credit card Ward #3 | Credit card Town #4 | Credit card City #5 |
|---|---|---|---|---|---|---|---|---|---|---|---|---|
| 1~2 hours | 0x43 | — | — | 0x53 | — | — | 0x63 | — | — | 0x73 | — | — |
| 2~6 hours | 0x44 | 0x44 | — | 0x54 | 0x54 | — | 0x64 | 0x64 | — | 0x74 | 0x74 | — |
| 6~12 hours | 0x45 | 0x45 | 0x45 | 0x55 | 0x55 | 0x55 | 0x65 | 0x65 | 0x65 | 0x75 | 0x75 | 0x75 |
| Next day by 10:00 | 0x46 | 0x46 | 0x46 | 0x56 | 0x56 | 0x56 | 0x66 | 0x66 | 0x66 | 0x76 | 0x76 | 0x76 |
| Next day by 20:00 | 0x47 | 0x47 | 0x47 | 0x57 | 0x57 | 0x57 | 0x67 | 0x67 | 0x67 | 0x77 | 0x77 | 0x77 |
| Next next day | 0x48 | 0x48 | 0x48 | 0x58 | 0x58 | 0x58 | 0x68 | 0x68 | 0x68 | 0x78 | 0x78 | 0x78 |
| 2~7 days | 0x49 | 0x49 | 0x49 | 0x59 | 0x59 | 0x59 | 0x69 | 0x69 | 0x69 | 0x79 | 0x79 | 0x79 |
| 1~2 weeks | 0x4a | 0x4a | 0x4a | 0x5a | 0x5a | 0x5a | 0x6a | 0x6a | 0x6a | 0x7a | 0x7a | 0x7a |

FIG. 21C

THE DELIVERY/PAYMENT CODE (8 bit) / 106-3

| Payment method | COD | | | Billing | | | Clearing | | | Credit card | | |
|---|---|---|---|---|---|---|---|---|---|---|---|---|
| Provider location / Delivery time | State #6 | Country #7 | Global #8 | State #6 | Country #7 | Global #8 | State #6 | Country #7 | Global #8 | State #6 | Country #7 | Global #8 |
| Next day by 10:00 | 0x86 | — | — | 0x96 | — | — | 0xa6 | — | — | 0xb6 | — | — |
| Next day by 15:00 | 0x87 | 0x87 | — | 0x97 | 0x97 | — | 0xa7 | 0xa7 | — | 0xb7 | 0xb7 | — |
| Next day by 20:00 | 0x88 | 0x88 | 0x88 | 0x98 | 0x98 | 0x98 | 0xa8 | 0xa8 | 0xa8 | 0xb8 | 0xb8 | 0xb8 |
| Next next by 10:00 | 0x89 | 0x89 | 0x89 | 0x99 | 0x99 | 0x99 | 0xa9 | 0xa9 | 0xa9 | 0xb9 | 0xb9 | 0xb9 |
| Next next by 20:00 | 0x8a | 0x8a | 0x8a | 0x9a | 0x9a | 0x9a | 0xaa | 0xaa | 0xaa | 0xba | 0xba | 0xba |
| 2~7 days | 0x8b | 0x8b | 0x8b | 0x9b | 0x9b | 0x9b | 0xab | 0xab | 0xab | 0xbb | 0xbb | 0xbb |
| 1~2 weeks | 0x8c | 0x8c | 0x8c | 0x9c | 0x9c | 0x9c | 0xac | 0xac | 0xac | 0xbc | 0xbc | 0xbc |
| 2~4 weeks | 0x8d | 0x8d | 0x8d | 0x9d | 0x9d | 0x9d | 0xad | 0xad | 0xad | 0xbd | 0xbd | 0xbd |

FIG. 21D

LOCKER DELIVERY/PAYMENT CODE (8 bit)

| Payment method | Billing | Clearing | Credit card | /106-4 |
|---|---|---|---|---|
| Provider location / Delivery time | #1~#8 Embedded ~ Global | #1~#8 Embedded ~ Global | #1~#8 Embedded ~ Global | |
| Next day by 10:00 | 0xc0 | 0xd0 | 0xe0 | |
| Next day by 15:00 | 0xc1 | 0xd1 | 0xe1 | |
| Next day by 20:00 | 0xc2 | 0xd2 | 0xe2 | |
| Next next by 10:00 | 0xc3 | 0xd3 | 0xe3 | |
| Next next by 20:00 | 0xc4 | 0xd4 | 0xe4 | |
| 2~7 days | 0xc5 | 0xd5 | 0xe5 | |
| 1~2 weeks | 0xc6 | 0xd6 | 0xe6 | |
| 2~4 weeks | 0xc7 | 0xd7 | 0xe7 | |

FIG. 22A  URGENT SERVICE WITHIN TODAY  105S

| Time/price select | Day | Monday–friday 06:00–23:00 #1 | Monday–friday within 1 hour #2 | Saturday 06:00–23:00 #3 | Saturday within 1 hour #4 | Sunday 06:00–23:00 #5 | Sunday within 1 hour #6 | Holiday 06:00–23:00 #7 | Holiday within 1 hour #8 |
|---|---|---|---|---|---|---|---|---|---|
| Select | | 0x00 | 0x10 | 0x20 | 0x30 | 0x40 | 0x50 | 0x60 | 0x70 |
| 6:00~8:00 O.T | Code | 0x01 | 0x11 | 0x21 | 0x31 | 0x41 | 0x51 | 0x61 | 0x71 |
|  | Price | $120.- | $150.- | $180.- | $210.- | $210.- | $240.- | $210.- | $240.- |
| 8:00~12:00 | Code | 0x02 | 0x12 | 0x22 | 0x32 | 0x42 | 0x52 | 0x62 | 0x72 |
|  | Price | $90.- | $120.- | $150.- | $180.- | $180.- | $210.- | $180.- | $210.- |
| 13:00~17:00 | Code | 0x03 | 0x13 | 0x23 | 0x33 | 0x43 | 0x53 | 0x63 | 0x73 |
|  | Price | $90.- | $120.- | $150.- | $180.- | $180.- | $210.- | $180.- | $210.- |
| 17:00~19:00 O.T | Code | 0x04 | 0x14 | 0x24 | 0x34 | 0x44 | 0x54 | 0x64 | 0x74 |
|  | Price | $120.- | $150.- | $180.- | $210.- | $210.- | $240.- | $210.- | $240.- |
| 19:00~21:00 O.T | Code | 0x05 | 0x15 | 0x25 | 0x35 | 0x45 | 0x55 | 0x65 | 0x75 |
|  | Price | $150.- | $180.- | $210.- | $240.- | $240.- | $270.- | $240.- | $270.- |
| 21:00~23:00 O.T | Code | 0x06 | 0x16 | 0x26 | 0x36 | 0x46 | 0x56 | 0x66 | 0x76 |
|  | Price | $180.- | $210.- | $240.- | $270.- | $270.- | $300.- | $270.- | $300.- |
| Select | | 0x07 | 0x17 | 0x27 | 0x37 | 0x47 | 0x57 | 0x67 | 0x77 |
| Next 1~3 | | 0x08 | 0x18 | 0x28 | 0x38 | 0x48 | 0x58 | 0x68 | 0x78 |
| Next 4~6 | | 0x09 | 0x19 | 0x29 | 0x39 | 0x49 | 0x59 | 0x69 | 0x79 |
| Back | | 0x0a | 0x1a | 0x2a | 0x3a | 0x4a | 0x5a | 0x6a | 0x7a |
| Cancel | | 0x0b | 0x1b | 0x2b | 0x3b | 0x4b | 0x5b | 0x6b | 0x7b |
| Confirmed | | 0x0c | 0x1c | 0x2c | 0x3c | 0x4c | 0x5c | 0x6c | 0x7c |
| Reselect | | 0x0d | 0x1d | 0x2d | 0x3d | 0x4d | 0x5d | 0x6d | 0x7d |

| Operate/select icons | #1 CATEGORY SELECT | #2 CLASS SELECT | #3 OPTION SELECT | #4 SWITCH SHOP | #5 NO CANCELLATION | #6 RESPOND TO VISITOR | #7 CLOSE | #8 BACK |
|---|---|---|---|---|---|---|---|---|
| Icon codes | 0x0f | 0x1f | 0x2f | 0x3f | 0x4f | 0x5f | 0x6f | 0x7f |

105T1

| Operate/select icons | #9 CCD | #10 BILLING | #11 CLEARING | #12 CREDIT CARD | #13 DECLINE | #14 CONFIRM REQUEST | #15 SEND ORDER | #16 NEXT |
|---|---|---|---|---|---|---|---|---|
| Icon codes | 0x8f | 0x9f | 0xaf | 0xbf | 0xcf | 0xdf | 0xef | 0xff |

105T2

FIG. 22B  SERVICE SCHEDULE WEEK 1  105S1A

| Day<br>Time/price select | | Monday schedule<br>Week 1<br>#1 | Tuesday schedule<br>Week 1<br>#2 | Wednesday schedule<br>Week 1<br>#3 | Thursday schedule<br>Week 1<br>#4 | Friday schedule<br>Week 1<br>#5 | Saturday schedule<br>Week 1<br>#6 | | Schedule Week 1 Sunday<br>#7 | Holiday<br>#8 |
|---|---|---|---|---|---|---|---|---|---|---|
| Select | Price | 0x00 | 0x10 | 0x20 | 0x30 | 0x40 | Price | 0x50 | Price | 0x60 | 0x70 |
| 6:00~8:00 O.T | $90.- | 0x01 | 0x11 | 0x21 | 0x31 | 0x41 | $150.- | 0x51 | $180.- | 0x61 | 0x71 |
| 8:00~12:00 | $60.- | 0x02 | 0x12 | 0x22 | 0x32 | 0x42 | $120.- | 0x52 | $150.- | 0x62 | 0x72 |
| 13:00~17:00 | $60.- | 0x03 | 0x13 | 0x23 | 0x33 | 0x43 | $120.- | 0x53 | $150.- | 0x63 | 0x73 |
| 17:00~19:00 O.T | $90.- | 0x04 | 0x14 | 0x24 | 0x34 | 0x44 | $150.- | 0x54 | $180.- | 0x64 | 0x74 |
| 19:00~21:00 O.T | $120.- | 0x05 | 0x15 | 0x25 | 0x35 | 0x45 | $210.- | 0x55 | $240.- | 0x65 | 0x75 |
| 21:00~23:00 O.T | $150.- | 0x06 | 0x16 | 0x26 | 0x36 | 0x46 | $240.- | 0x56 | $270.- | 0x66 | 0x76 |
| Cancel | | 0x07 | 0x17 | 0x27 | 0x37 | 0x47 | | 0x57 | | 0x67 | 0x77 |
| Extend week 1 | | 0x08 | 0x18 | 0x28 | 0x38 | 0x48 | | 0x58 | | 0x68 | 0x78 |
| Next week 2 | | 0x09 | 0x19 | 0x29 | 0x39 | 0x49 | | 0x59 | | 0x69 | 0x79 |
| Back | | 0x0a | 0x1a | 0x2a | 0x3a | 0x4a | | 0x5a | | 0x6a | 0x7a |
| Confirmed | | 0x0b | 0x1b | 0x2b | 0x3b | 0x4b | | 0x5b | | 0x6b | 0x7b |
| Reselect | | 0x0c | 0x1c | 0x2c | 0x3c | 0x4c | | 0x5c | | 0x6c | 0x7c |

| Operate/select icons | #1 CATEGORY SELECT | #2 CLASS SELECT | #3 OPTION SELECT | #4 SWITCH SHOP | #5 NO CANCELLATION | #6 RESPOND TO VISITOR | #7 CLOSE | #8 BACK |
|---|---|---|---|---|---|---|---|---|
| Icon codes | 0x0f | 0x1f | 0x2f | 0x3f | 0x4f | 0x5f | 0x6f | 0x7f |

105TA

FIG. 22C  SERVICE SCHEDULE WEEK 2  105S1B

| Day<br>Time/price select | | Monday schedule<br>Week 2<br>#9 | Tuesday schedule<br>Week 2<br>#10 | Wednesday schedule<br>Week 2<br>#11 | Thursday schedule<br>Week 2<br>#12 | Friday schedule<br>Week 2<br>#13 | Saturday schedule<br>Week 2<br>#14 | | Schedule Week 2 Sunday<br>#15 | Holiday<br>#16 |
|---|---|---|---|---|---|---|---|---|---|---|
| Select | Price | 0x80 | 0x90 | 0xa0 | 0xb0 | 0xc0 | Price | 0xd0 | Price | 0xe0 | 0xf0 |
| 6:00~8:00 O.T | $90.- | 0x81 | 0x91 | 0xa1 | 0xb1 | 0xc1 | $150.- | 0xd1 | $180.- | 0xe1 | 0xf1 |
| 8:00~12:00 | $60.- | 0x82 | 0x92 | 0xa2 | 0xb2 | 0xc2 | $120.- | 0xd2 | $150.- | 0xe2 | 0xf2 |
| 13:00~17:00 | $60.- | 0x83 | 0x93 | 0xa3 | 0xb3 | 0xc3 | $120.- | 0xd3 | $150.- | 0xe3 | 0xf3 |
| 17:00~19:00 O.T | $90.- | 0x84 | 0x94 | 0xa4 | 0xb4 | 0xc4 | $150.- | 0xd4 | $180.- | 0xe4 | 0xf4 |
| 19:00~21:00 O.T | $120.- | 0x85 | 0x95 | 0xa5 | 0xb5 | 0xc5 | $210.- | 0xd5 | $240.- | 0xe5 | 0xf5 |
| 21:00~23:00 O.T | $150.- | 0x86 | 0x96 | 0xa6 | 0xb6 | 0xc6 | $240.- | 0xd6 | $270.- | 0xe6 | 0xf6 |
| Cancel | | 0x87 | 0x97 | 0xa7 | 0xb7 | 0xc7 | | 0xd7 | | 0xe7 | 0xf7 |
| Extend week 2 | | 0x88 | 0x98 | 0xa8 | 0xb8 | 0xc8 | | 0xd8 | | 0xe8 | 0xf8 |
| Next week 3 | | 0x89 | 0x99 | 0xa9 | 0xb9 | 0xc9 | | 0xd9 | | 0xe9 | 0xf9 |
| Back | | 0x8a | 0x9a | 0xaa | 0xba | 0xca | | 0xda | | 0xea | 0xfa |
| Confirmed | | 0x8b | 0x9b | 0xab | 0xbb | 0xcb | | 0xdb | | 0xeb | 0xfb |
| Reselect | | 0x8c | 0x9c | 0xac | 0xbc | 0xcc | | 0xdc | | 0xec | 0xfc |

| Operate/select icons | #9 COD | #10 BILLING | #11 CLEARING | #12 CREDIT CARD | #13 DECLINE | #14 CONFIRM REQUEST | #15 SEND ORDER | #16 NEXT |
|---|---|---|---|---|---|---|---|---|
| Icon codes | 0x8f | 0x9f | 0xaf | 0xbf | 0xcf | 0xdf | 0xef | 0xff |

105TB

FIG. 22D    SERVICE SCHEDULE WEEK 3    105S2A

| Time/price select | | Monday schedule Week 3 #1 | Tuesday schedule Week 3 #2 | Wednesday schedule Week 3 #3 | Thursday schedule Week 3 #4 | Friday schedule Week 3 #5 | Saturday schedule Week 3 #6 | | Schedule Week 3 Sunday #7 | Holiday #8 |
|---|---|---|---|---|---|---|---|---|---|---|
| Select | Price | 0x00 | 0x10 | 0x20 | 0x30 | 0x40 | Price | 0x50 | Price | 0x60 | 0x70 |
| 6:00~8:00 O.T | $90.- | 0x01 | 0x11 | 0x21 | 0x31 | 0x41 | $150.- | 0x51 | $180.- | 0x61 | 0x71 |
| 8:00~12:00 | $60.- | 0x02 | 0x12 | 0x22 | 0x32 | 0x42 | $120.- | 0x52 | $150.- | 0x62 | 0x72 |
| 13:00~17:00 | $60.- | 0x03 | 0x13 | 0x23 | 0x33 | 0x43 | $120.- | 0x53 | $150.- | 0x63 | 0x73 |
| 17:00~19:00 O.T | $90.- | 0x04 | 0x14 | 0x24 | 0x34 | 0x44 | $150.- | 0x54 | $180.- | 0x64 | 0x74 |
| 19:00~21:00 O.T | $120.- | 0x05 | 0x15 | 0x25 | 0x35 | 0x45 | $210.- | 0x55 | $240.- | 0x65 | 0x75 |
| 21:00~23:00 O.T | $150.- | 0x06 | 0x16 | 0x26 | 0x36 | 0x46 | $240.- | 0x56 | $270.- | 0x66 | 0x76 |
| Cancel | | 0x07 | 0x17 | 0x27 | 0x37 | 0x47 | | 0x57 | | 0x67 | 0x77 |
| Extend week 3 | | 0x08 | 0x18 | 0x28 | 0x38 | 0x48 | | 0x58 | | 0x68 | 0x78 |
| Next week 4 | | 0x09 | 0x19 | 0x29 | 0x39 | 0x49 | | 0x59 | | 0x69 | 0x79 |
| Back | | 0x0a | 0x1a | 0x2a | 0x3a | 0x4a | | 0x5a | | 0x6a | 0x7a |
| Confirmed | | 0x0b | 0x1b | 0x2b | 0x3b | 0x4b | | 0x5b | | 0x6b | 0x7b |
| Reselct | | 0x0c | 0x1c | 0x2c | 0x3c | 0x4c | | 0x5c | | 0x6c | 0x7c |

| Operate/select icons | | #1 CATEGORY SELECT | #2 CLASS SELECT | #3 OPTION SELECT | #4 SWITCH SHOP | #5 NO CANCELLATION | #6 RESPOND TO VISITOR | | #7 CLOSE | | #8 BACK |
|---|---|---|---|---|---|---|---|---|---|---|---|
| Icon codes | | 0x0f | 0x1f | 0x2f | 0x3f | 0x4f | 0x5f | | 0x6f | | 0x7f |

105TA

FIG. 22E    SERVICE SCHEDULE WEEK 4    105S2B

| Time/price select | | Monday schedule Week 4 #9 | Tuesday schedule Week 4 #10 | Wednesday schedule Week 4 #11 | Thursday schedule Week 4 #12 | Friday schedule Week 4 #13 | Saturday schedule Week 4 #14 | | Schedule Week 4 Sunday #15 | Holiday #16 |
|---|---|---|---|---|---|---|---|---|---|---|
| Select | Price | 0x80 | 0x90 | 0xa0 | 0xb0 | 0xc0 | Price | 0xd0 | Price | 0xe0 | 0xf0 |
| 6:00~8:00 O.T | $90.- | 0x81 | 0x91 | 0xa1 | 0xb1 | 0xc1 | $150.- | 0xd1 | $180.- | 0xe1 | 0xf1 |
| 8:00~12:00 | $60.- | 0x82 | 0x92 | 0xa2 | 0xb2 | 0xc2 | $120.- | 0xd2 | $150.- | 0xe2 | 0xf2 |
| 13:00~17:00 | $60.- | 0x83 | 0x93 | 0xa3 | 0xb3 | 0xc3 | $120.- | 0xd3 | $150.- | 0xe3 | 0xf3 |
| 17:00~19:00 O.T | $90.- | 0x84 | 0x94 | 0xa4 | 0xb4 | 0xc4 | $150.- | 0xd4 | $180.- | 0xe4 | 0xf4 |
| 19:00~21:00 O.T | $120.- | 0x85 | 0x95 | 0xa5 | 0xb5 | 0xc5 | $210.- | 0xd5 | $240.- | 0xe5 | 0xf5 |
| 21:00~23:00 O.T | $150.- | 0x86 | 0x96 | 0xa6 | 0xb6 | 0xc6 | $240.- | 0xd6 | $270.- | 0xe6 | 0xf6 |
| Cancel | | 0x87 | 0x97 | 0xa7 | 0xb7 | 0xc7 | | 0xd7 | | 0xe7 | 0xf7 |
| Extend week 4 | | 0x88 | 0x98 | 0xa8 | 0xb8 | 0xc8 | | 0xd8 | | 0xe8 | 0xf8 |
| Back to week 1 | | 0x89 | 0x99 | 0xa9 | 0xb9 | 0xc9 | | 0xd9 | | 0xe9 | 0xf9 |
| Back | | 0x8a | 0x9a | 0xaa | 0xba | 0xca | | 0xda | | 0xea | 0xfa |
| Confirmed | | 0x8b | 0x9b | 0xab | 0xbb | 0xcb | | 0xdb | | 0xeb | 0xfb |
| Reselct | | 0x8c | 0x9c | 0xac | 0xbc | 0xcc | | 0xdc | | 0xec | 0xfc |

| Operate/select icons | | #9 COD | #10 BILLING | #11 CLEARING | #12 CREDIT CARD | #13 DECLINE | #14 CONFIRM REQUEST | | #15 SEND ORDER | | #16 NEXT |
|---|---|---|---|---|---|---|---|---|---|---|---|
| Icon codes | | 0x8f | 0x9f | 0xaf | 0xbf | 0xcf | 0xdf | | 0xef | | 0xff |

105TB

FIG. 23A   VARIATION CODES FOR LAUNDRY PICK UP AND RETURN (8 bit)   105S3

| | #1 URGENT WASH/DRY MACHINE | #2 URGENT DRY CLEANING | #3 REGULAR WASH/DRY MACHINE | #4 REGULAR DRY CLEANING | #5 URGENT CLOTHS IRONING | #6 URGENT ROLLER IRONING | #7 REGULAR CLOTHS IRONING | #8 REGULAR ROLLER IRONING | #9 URGENT WASH/DRY IRON | #10 SAME DAY WASH/DRY IRON | #11 NEXT DAY WASH/DRY IRON | #12 REGULAR WASH/DRY IRON | #13 WASH DRY SELF DELIVER & PICK UP | #14 DRY CLEAN SELF DELIVER & PICK UP | #15 IRON SELF DELIVER & PICK UP | #16 SPECIAL SERVICES |
|---|---|---|---|---|---|---|---|---|---|---|---|---|---|---|---|---|
| Select variation 1 | 0x01 | 0x11 | 0x21 | 0x31 | 0x41 | 0x51 | 0x61 | 0x71 | 0x81 | 0x91 | 0xa1 | 0xb1 | 0xc1 | 0xd1 | 0xe1 | 0xf1 |
| Select variation 2 | 0x02 | 0x12 | 0x22 | 0x32 | 0x42 | 0x52 | 0x62 | 0x72 | 0x82 | 0x92 | 0xa2 | 0xb2 | 0xc2 | 0xd2 | 0xe2 | 0xf2 |
| Select variation 3 | 0x03 | 0x13 | 0x23 | 0x33 | 0x43 | 0x53 | 0x63 | 0x73 | 0x83 | 0x93 | 0xa3 | 0xb3 | 0xc3 | 0xd3 | 0xe3 | 0xf3 |
| Select variation 4 | 0x04 | 0x14 | 0x24 | 0x34 | 0x44 | 0x54 | 0x64 | 0x74 | 0x84 | 0x94 | 0xa4 | 0xb4 | 0xc4 | 0xd4 | 0xe4 | 0xf4 |
| Select variation 5 | 0x05 | 0x15 | 0x25 | 0x35 | 0x45 | 0x55 | 0x65 | 0x75 | 0x85 | 0x95 | 0xa5 | 0xb5 | 0xc5 | 0xd5 | 0xe5 | 0xf5 |
| Select variation 6 | 0x06 | 0x16 | 0x26 | 0x36 | 0x46 | 0x56 | 0x66 | 0x76 | 0x86 | 0x96 | 0xa6 | 0xb6 | 0xc6 | 0xd6 | 0xe6 | 0xf6 |
| Select variation 7 | 0x07 | 0x17 | 0x27 | 0x37 | 0x47 | 0x57 | 0x67 | 0x77 | 0x87 | 0x97 | 0xa7 | 0xb7 | 0xc7 | 0xd7 | 0xe7 | 0xf7 |
| Select variation 8 | 0x08 | 0x18 | 0x28 | 0x38 | 0x48 | 0x58 | 0x68 | 0x78 | 0x88 | 0x98 | 0xa8 | 0xb8 | 0xc8 | 0xd8 | 0xe8 | 0xf8 |
| Select variation 9 | 0x09 | 0x19 | 0x29 | 0x39 | 0x49 | 0x59 | 0x69 | 0x79 | 0x89 | 0x99 | 0xa9 | 0xb9 | 0xc9 | 0xd9 | 0xe9 | 0xf9 |
| Cancel | 0x0a | 0x1a | 0x2a | 0x3a | 0x4a | 0x5a | 0x6a | 0x7a | 0x8a | 0x9a | 0xaa | 0xba | 0xca | 0xda | 0xea | 0xfa |
| Next 4~6 | 0x0b | 0x1b | 0x2b | 0x3b | 0x4b | 0x5b | 0x6b | 0x7b | 0x8b | 0x9b | 0xab | 0xbb | 0xcb | 0xdb | 0xeb | 0xfb |
| Next 7~9 | 0x0c | 0x1c | 0x2c | 0x3c | 0x4c | 0x5c | 0x6c | 0x7c | 0x8c | 0x9c | 0xac | 0xbc | 0xcc | 0xdc | 0xec | 0xfc |
| Back | 0x0d | 0x1d | 0x2d | 0x3d | 0x4d | 0x5d | 0x6d | 0x7d | 0x8d | 0x9d | 0xad | 0xbd | 0xcd | 0xdd | 0xed | 0xfd |

| Operate/select icons | #1 CATEGORY SELECT | #2 CLASS SELECT | #3 SELECT OPTION | #4 SWITCH SHOP | #5 LOCKER SELECT | #6 RESPOND TO VISITOR | #7 CLOSE | #8 BACK | #9 CART REVIEW SINGLE SHOP | #10 CART REVIEW MULTI SHOP | #11 DELIVERY SELECT | #12 PAYMENT SELECT | #13 DECLINE | #14 CONFIRM REQUEST | #15 SEND ORDER | #16 NEXT |
|---|---|---|---|---|---|---|---|---|---|---|---|---|---|---|---|---|
| Vertical column icon codes | 0x0f | 0x1f | 0x2f | 0x3f | 0x4f | 0x5f | 0x6f | 0x7f | 0x8f | 0x9f | 0xaf | 0xbf | 0xcf | 0xdf | 0xef | 0xff |

FIG. 23B   TARIFF & HOURLY CHARGED PAYMENT CODES (8 bit)   105S4

106S

| | Payment method | | | | | | | | | | | | | | | |
|---|---|---|---|---|---|---|---|---|---|---|---|---|---|---|---|---|
| | COD | | | | Billing | | | | Clearing | | | | Credit card | | | |
| | Hourly charge | | | Tariff | Hourly charge | | | Tariff | Hourly charge | | | Tariff | Hourly charge | | | Tariff |
| | Urgent service today | Week 1 | Week 2 | Laundry Medical etc | Urgent service today | Week 1 | Week 2 | Laundry Medical etc | Urgent service today | Week 1 | Week 2 | Laundry Medical etc | Urgent service today | Week 1 | Week 2 | Laundry Medical etc |

| | Week 3 | Week 4 | | Week 3 | Week 4 | | Week 3 | Week 4 | | Week 3 | Week 4 | |
|---|---|---|---|---|---|---|---|---|---|---|---|---|
| Hour/tariff only | 0x01 | 0x21 | 0x31 | 0x41 | 0x61 | 0x71 | 0x81 | 0xa1 | 0xb1 | 0xc1 | 0xe1 | 0xf1 |
| Hour/tariff + material | 0x02 | 0x12 0x22 | 0x32 | 0x42 | 0x52 0x62 | 0x72 | 0x82 | 0x92 0xa2 | 0xb2 | 0xc2 | 0xd2 0xe2 | 0xf2 |

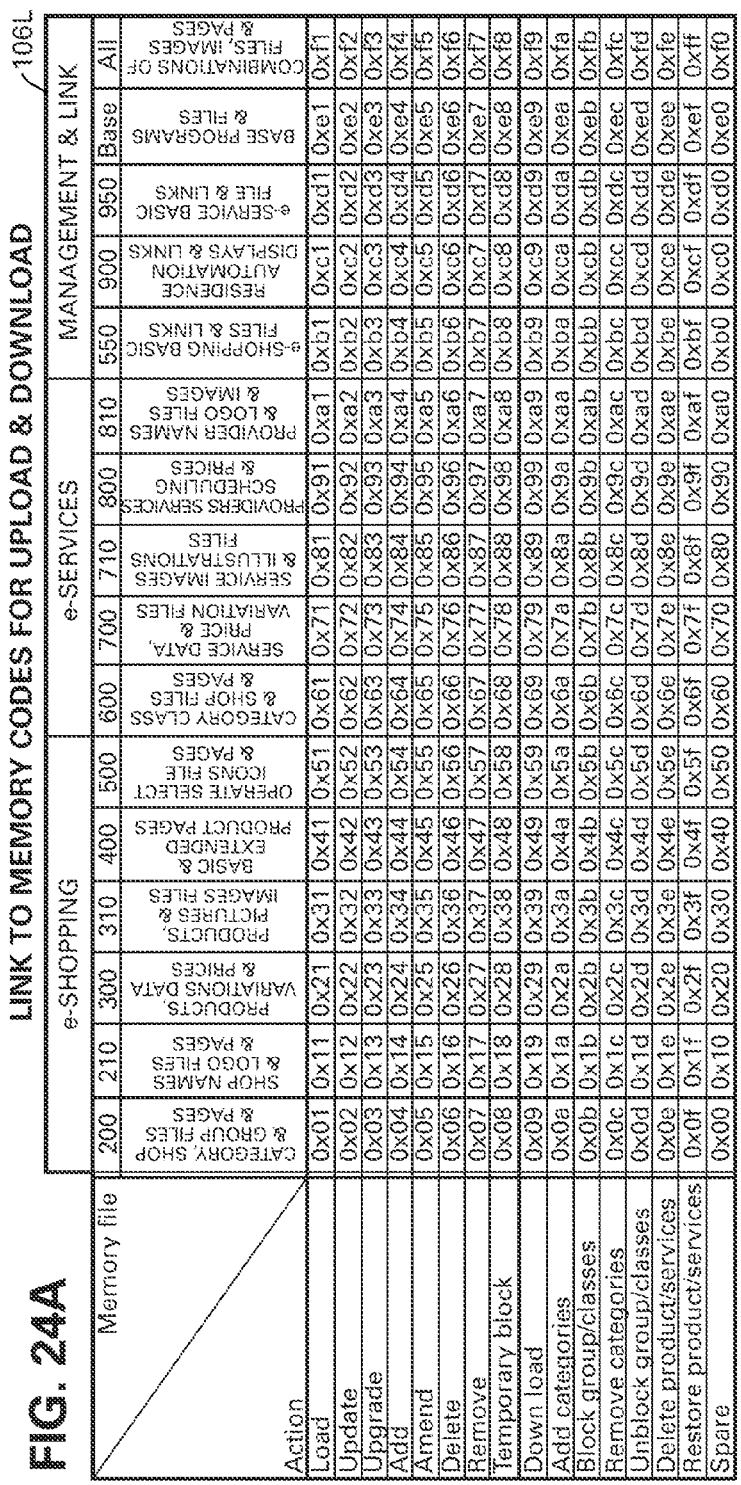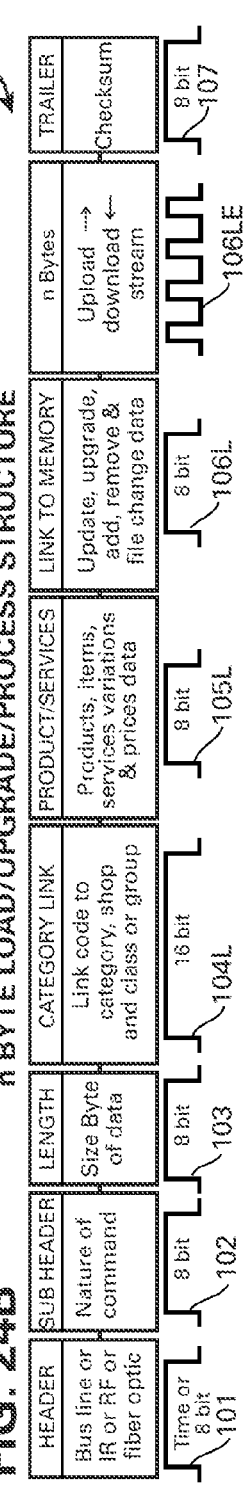

FIG. 25A /102A  NATURE OF COMMAND/SUB HEADER

| /102A | | /102A1 | | /102A2 | |
|---|---|---|---|---|---|
| 0x01 | Single product/single shop order | 0x51 | Order delivered (0x01) | 0xa1 | |
| 0x02 | Multi products/single shop order | 0x52 | Order delivered (0x02) | 0xa2 | |
| 0x03 | Multi products/multi shops order | 0x53 | Order delivered (0x03) | 0xa3 | |
| 0x04 | Single product/single shop - confirm req. & order | 0x54 | Confirm order (0x04) | 0xa4 | Delivered 0x04 |
| 0x05 | Multi products/single shop - confirm req. & order | 0x55 | Confirm order (0x05) | 0xa5 | Delivered 0x05 |
| 0x06 | Multi products/multi shops - confirm req. & order | 0x56 | Confirm order (0x06) | 0xa6 | Delivered 0x06 |
| 0x07 | Declined - cart selection | 0x57 | Decline ACK. (0x07) | 0xa7 | |
| 0x08 | Declined - cart delivery | 0x58 | Decline ACK. (0x08) | 0xa8 | |
| 0x09 | Declined - cart payment | 0x59 | Decline ACK. (0x09) | 0xa9 | |
| 0x0a | Declined - cart selection & delivery | 0x5a | Decline ACK. (0x0a) | 0xaa | |
| 0x0b | Declined - cart selection & payment | 0x5b | Decline ACK. (0x0b) | 0xab | |
| 0x0c | Declined - cart delivery & payment | 0x5c | Decline ACK. (0x0c) | 0xac | |
| 0x0d | Declined - cart selection, delivery & payment | 0x5d | Decline ACK. (0x0d) | 0xad | |
| 0x0e | Cancel order (0x01 or 0x02) | 0x5e | Cancel ACK. (0x01 or 0x02) | 0xae | |
| 0x0f | Cancel order (0x03) | 0x5f | Multi shops cannot cancel (0x03) | 0xaf | Delivered/proceed with return |

FIG. 25B /102B

| /102B | | /102B1 | | /102B2 | |
|---|---|---|---|---|---|
| 0x21 | Urgent repair within 1 hour/within today | 0x71 | Reschedule | 0xc1 | Reschedule (0x71) confirmed |
| 0x22 | Maintenance/repair 1~14 days/1~2 weeks | 0x72 | Schedule confirmed (0x22) | 0xc2 | Spare |
| 0x23 | Maintenance/repair 15~28 days/3~4 weeks | 0x73 | Schedule confirmed (0x23) | 0xc3 | Spare |
| 0x24 | Spare | 0x74 | Spare | 0xc4 | Spare |
| 0x25 | Spare | 0x75 | Spare | 0xc5 | Spare |
| 0x26 | Spare | 0x76 | Spare | 0xc6 | Spare |
| 0x27 | Urgent pick up/return service | 0x77 | Pick up/return confirmed (0x27) | 0xc7 | Picked up & returned (0x27) |
| 0x28 | Fast pick up/return service | 0x78 | Pick up/return confirmed (0x28) | 0xc8 | Picked up & returned (0x28) |
| 0x29 | Regular pick up/return service | 0x79 | Pick up/return confirmed (0x29) | 0xc9 | Picked up & returned (0x29) |
| 0x2a | Spare | 0x7a | Spare | 0xca | Spare |
| 0x2b | Spare | 0x7b | Spare | 0xcb | Spare |
| 0x2c | Spare | 0x7c | Spare | 0xcc | Spare |
| 0x2d | Spare | 0x7d | Spare | 0xcd | Spare |
| 0x2e | Spare | 0x7e | Spare | 0xce | Spare |
| 0x2f | Spare | 0x7f | Spare | 0xcf | Delivered/proceed with return |

FIG. 25C  /102C  NATURE OF COMMAND/SUB HEADER  /102C2

| /102C | | /102C1 | | /102C2 | |
|---|---|---|---|---|---|
| 0x31 | Add, update or change admin program | 0x81 | Program successfully installed (0x3n) | 0xd1 | Program failed to install (0x3n) |
| 0x32 | -ll- shopping program | 0x82 | Program successfully updated (0x3n) | 0xd2 | Update failed to install (0x3n) |
| 0x33 | -ll- service program | 0x83 | Program successfully changed (0x3n) | 0xd3 | Change failed to install (0x3n) |
| 0x34 | Add, remove or change vendor(s) | 0x84 | Addition successfully installed (0x3n) | 0xd4 | Addition failed to install (0x3n) |
| 0x35 | -ll- categorie(s) | 0x85 | Removal successfully complete (0x3n) | 0xd5 | Removal failed (0x3n) |
| 0x36 | -ll- group(s)/classe(s)/page(s) | 0x86 | Downloaded programs complete (0x3n) | 0xd6 | Download programs failed (0x3n) |
| 0x37 | -ll- product(s)/page(s) & data | 0x87 | Downloaded files complete (0x3n) | 0xd7 | Download files failed (0x3n) |
| 0x38 | -ll- service(s)/page(s) & data | 0x88 | Downloaded pages complete (0x3n) | 0xd8 | Download pages failed (0x3n) |
| 0x39 | -ll- product/service price(s) | 0x89 | Spare | 0xd9 | Spare |
| 0x3a | -ll- picture(s) & logo(s) | 0x8a | Spare | 0xda | Spare |
| 0x3b | -ll- variation pages | 0x8b | Spare | 0xdb | Spare |
| 0x3c | -ll- operating icon(s) | 0x8c | Spare | 0xdc | Spare |
| 0x3d | Download programs, files & pages | 0x8d | Spare | 0xdd | Spare |
| 0x3e | Spare | 0x8e | Spare | 0xde | Spare |
| 0x3f | Spare | 0x8f | Spare | 0xdf | Spare |
| 0x41 | Spare | 0x91 | Spare | 0xe1 | Spare |
| ~ | ~ | ~ | ~ | ~ | ~ |
| 0x4f | Spare | 0x9f | Spare | 0xef | Spare |

METHOD AND STRUCTURE FOR SIMPLIFIED CODING OF DISPLAY PAGES FOR OPERATING A CLOSED CIRCUIT E-COMMERCE

FIELD OF INVENTION

The present invention relates to processing an e-commerce and/or e-service order via an appliance such as a dedicated shopping terminal, a video interphone monitor, a TV set, a cable television including a shopping circuit and program.

BACKGROUND OF THE INVENTION

The current e-commerce is known to be operated in a given sequences and processes enabling a potential e-buyer to search for a supplier through the well known search engines provided by the well known web providers including Microsoft, Google, Yahoo and the less known global and local smaller search engines providers. A potential e-buyer searches for an intended service or merchandize and will select a known or an unknown website on the basis of what appears to be a presentation that corresponds to the intended shopping, be it for services or merchandize.

Once a potential e-buyer finds a link to an e-shop that appears to provide the service or the items he is interested in, he has to go through an elaborated process of finding the items he is looking for. Once the items are found the e-buyer has to go into yet another process for identifying himself, his address and his credit card before he can materialize a purchase.

This process is a frustrating process and as a whole requires repeated attempts to succeed. Despite the time spent to find what one is looking for, most people are hesitant at that point to proceed and disclose their personal details and credit card number, particularly to an unknown website and most people will terminate the session without ordering, even though they may have found what they wanted to buy.

For people needing an immediate deliveries the common process described above does not offer a solution, because for example if one needs in a morning to buy a milk for his breakfast, such process is not adequate as it will take too long for the order to be processed, even if the e-shop is a convenient store located nearby the residence of the e-buyer and does provide for local deliveries.

Such nearby shops that provide e-commerce shopping and deliveries will store details of the potential e-buyers in the neighborhood and the potential e-buyer will introduce the shop's URL icon onto their PC's desk top, or for example, in the Favorite Column of their PC for an immediate recall of the shop's website. In turn the shop will provide the buyer with an access password, identifying the user and his credit card as recorded in the shop server. Such setup makes the ordering process faster and simpler. Similar recording and storing customer's data are offered by large shops, supermarkets, and department stores for improving the process of e-shopping to a repeat e-buyer.

In all the above described e-shopping search processes and setups the e-buyer has to surf the shop website by selecting products or services through a page displayed onto his PC, smart phone or iPad screen, fed from the shop website via the Internet or other IP networks, for selecting his choices through the shop's website server.

Each such shop server has its own architecture, colors, styles, operating systems, programming and processing method that the e-buyers have to learn and follow. Thus even though the e-buyer detailed data is stored in the e-shop server, the proprietary programming and the different shopping processes for each individual e-shop extends the time spent to shop via a given e-shop server.

Further when the whole shopping cannot be supplied by a single shop and must be divided into two or more separate e-shops or e-service providers, such e-shopping calls for a very attentive and time consuming e-shopping process. Thus a combined shopping for groceries, such as extending the milk example given above, to a shopping for milk and cereals that need to be shopped from two separate e-shops is a complex operation. Ordering two items from two different convenient stores in the morning for a breakfast will take a long time to order and too long to deliver, while the e-buyer wants the order to be delivered promptly.

Other methods and apparatuses for e-shopping for services and merchandise in a closed circuit shopping systems similar to the known closed circuits B to B (business to business) or B to C (business to consumer) are disclosed in U.S. Pat. Nos. 6,603,842, 6,940,957, 7,461,012, 8,117,076 and in many corresponding patents issued and pending in other countries. The disclosed closed circuit e-shopping is through a video interphone monitor of a video interphone system and via a shopping terminal of a cable TV system, an antenna TV system, a video interphone system and a dedicated e-shopping terminal.

The basic difference between the two e-commerce methods, i.e., the prevailing e-shopping processes and the processes via the closed circuit shopping system disclosed in the above referenced US patents is the installing of a pre-designed shopping programs by a selected and registered e-shops and loading such programs into the shopping terminals or the video interphone monitors for providing instant shopping displays including programs and displays tailored to the need of and/or the desire of given e-shoppers.

The closed circuit shopping apparatuses refer to video interphone monitors, shopping terminals, TV, cable TV and/or TV and cable TV accessories such as set top box or adaptor box and/or a server that serves the whole building or the whole neighborhood via internal network and/or internal communication lines. The shopping terminal system of the closed circuit shopping provides the hardware and pre-defined programs for enabling a focused programmed select, search and order by the tenants with no time waste and provide for prompt deliveries.

The searches for e-services and e-merchandize are carried through the displays generated by the installed program pages, using the video interphone monitor, the dedicated shopping terminal, the TV or the cable TV displays to process the shopping. The introduction of shopping program transforms the shopping terminals into a self-assembled privately owned e-shopping mall inside each residence, office or business or it can be a private shopping mall of a whole building and/or the whole neighborhood.

The pages of the current prevailing shopping process, the selecting icons, the offered items, their prices, the conditions and any other particulars of the shopping process and conditions, including the availabilities of services or products are commonly designed and programmed by website design professionals, knowledgeable in the structuring of websites. Supermarkets, for example, offering fresh produce, such as green vegetable or dairy products will change daily or weekly their pages to accommodate varying prices and availability because of seasons or transportation problem etc. The change is made to the pages of the shop server or to the group servers used by larger supermarkets or chains of shops.

Such professionally prepared pages do not fit the need to add, amend or replace e-shopping pages of a vast spread shopping terminals in large number of residences or businesses in different locations and places. This is because it will be costly to design specific pages for specific residences or other groups. It will take very long and will be very complex to download the new pages to all the residence's shopping terminals, or download vast programs and pages tailored to the many individual or group preferences.

In practical terms, there will never be enough professionals to program so many different pages daily, or weekly or monthly and the cost will be prohibitive. This mandates the introduction of a method and apparatus for a simple to design, add, amend or replace pages or a portion of page, such as a price of a single product included in a page, or the removal of a product from a page when it is sold out. There is a need to do it all, in an easy to learn, operate and install concept and at a low cost.

SUMMARY OF THE INVENTION

The present invention introduces a novel apparatuses and methods, providing simplified processes for e-shopping by tenants or dwellers and simplified loading of shopping pages and programs for the e-shops, e-services and e-merchandize providers.

The terms tenant, dweller, user or shopper hereafter refers to the e-shopper or the e-buyer that search for and/or orders services or merchandize via a shopping terminal and/or defines, selects and restricts the services and merchandize programs to be loaded into his shopping terminal to his conveniences and desire.

The term shopping terminal hereafter and in the claims refers to a video interphone monitor, a dedicated shopping terminal, a cable TV, an interactive TV, a TV set, a set top box, a shopping box, an antenna adaptor box, a satellite adaptor box, a cable TV box and any other similar box and combinations thereof that are connecting a TV programs provider to a television or cable television set. The shopping terminal includes a memory for storing shopping programs and other particulars and a CPU for enabling e-shopping for services or merchandize or both.

One objective of the present invention is to provide a standard pattern and set of touch icons and/or touch areas of the display that fit different display sizes, by providing a standard template for the e-shops to generate their displays and shopping pages.

Each of the e-shops of the preferred embodiment is identified by a short code assigned to an e-shop, the preferred code for the e-shop is one byte long or two bytes at most. Each page of the preferred embodiment is identified by a page code of a one byte long or two bytes at most. It should be clear however that even though one byte or two bytes at most are recited for the preferred embodiment, n number or any number of bits and bytes can be used instead.

Each page code is assigned to a group and the group is indexed and identified to belong to a specific group of services or merchandize, for example, a group of dairy products page or pages within the grocery category and/or identified as fresh group of merchandize. This code is provided to all the grocery-merchandize e-shops participating in the close circuit e-shopping. They all use the assigned, identical page code or pages codes for their dairy products. The differences between the shops are the shop codes.

It is preferable that all pages of a group will also be identified by the background color of the display and/or other designs that are made standard for visually identifying the page group or the family of products.

Each page and all the pages are divided into screen areas, display blocks and icons to be operated by a touch of a finger or to be clicked on by a remote control device that is responsive to up-down-left-right movements, the same way a mouse is operated. Each such screen area, display block or each icon are assigned with a code termed touch code or icon code or screen code. A touch code of the preferred embodiment of the present invention for each single screen area, single display block and a single icon is one byte long or two bytes at most. It should be noted that even though one byte or two bytes at most are recited for the touch codes of the preferred embodiment an n number or any number of bits and bytes can be used instead.

The screen areas, the display blocks and the icons can be stacked one or more on top of the other and the preferred embodiment uses the code generated by the top display or the display embedded in the upper layer of the stack, when two or three icons, screen areas and display blocks are stack in any given order. An example can be a picture of a product covering a display block that is stacked on top of a text displayed over a four screen areas. Touching by a finger the text of the stacked picture will generate the picture's or the screen block touch code and not the text touch code or the screen area touch code.

Another example is a display of a quantity select icons stacked on top of the picture, a touch of a quantity select icon will generate the corresponding touch code of the screen area even though the quantity icon is displayed, or is stacked on top of the product picture.

The top layered icons of a multi layered displays of the preferred embodiment, be it a screen area or a display block will generate the touch code assigned to it, whenever the area is touched or clicked upon by a remote control unit.

This includes what appears as a stack of two or more display blocks that are layered one on top of the other or are displayed side by side in the same block, for example, an ice cream topped with chocolate syrup and with nuts spread on top of the chocolate syrup, wherein the upper layer of the stack comprising the ice cream covered by chocolate and nuts will generate its assigned touch code when touched or clicked upon, even though the display in the lower layer is the ice cream only. Instead of viewing the layered display blocks as a stack, they can be viewed as a revolving display blocks as will be explained in the preferred embodiment detailed description.

This example, can be an ice cream displayed onto a display block covered by four icons, a no topping icon and three displayed toppings, each covering one area within a display block, comprising for example, three toppings displayed on one screen area and representing a single (or dual) topping selection. The no topping screen area can display for example no topping text. The touching of the topping display generates the touch code of the screen area touched, which code as will be explained later is programmed to be a variation product display for ordering a combination of products or joint product for supply as a single combined packaged product, or a given quantity of the same product.

This introduces another objective of the present invention, which is to provide for ordering a mix or a combination of product categories into a single e-order, including the selections of products or services, in a process made simple to select and order. The present invention makes it similarly simple for the e-shop to design and program the pages for the combination selection process.

Yet, other objectives of the present invention is to provide for ordering products and/or services from plurality of e-shops by combining product and services provided by different e-shops into a single order, a single or plurality of payments and a coordinated single or plurality of deliveries, thereby reducing the time to shop, the handling and the delivering costs.

The term completed order hereafter and in the claims refers to an order for products and/or services with all products and items of service are selected via the shopping terminals, including payment method and deliveries and/or the scheduling of services and costs before and/or after communicating the completed order to a single provider or a plurality of providers.

Another objective of the present invention is to provide for updating products and services programs and data, covering a single product and/or product variations including quantities and others, or updating a range or plurality of product in an updating stream of data, covering individual or plurality of products by one, several or all of the e-commerce and e-services providers, to each video interphone monitor and/or shopping terminal connected in the closed circuit e-commerce of the present invention. Such closed circuit systems are disclosed in the referenced U.S. Pat. Nos. 6,603,842, 6,940,957, 7,461,012 and 8,117,076 and are incorporated herein by reference.

Another object of the present invention is to create a communication and command protocols wherein the individual codes allotted to the string of bits and Bytes will provide intelligence within the protocol itself. One example is the nature of command termed hereafter also as sub-header wherein the code represents what the command is about, for example a command for ordering a product, or a command for selecting services, or a command to update a price of a product by a given provider. The other intelligent codes are the link code and the product or itemized service code that contain the entire data identifying the product, the shop, the category and the group including prices and quantity.

Yet another object of the present invention is to organize the memory files of the shopping terminal such that the loading, updating, adding, deleting, changing, canceling and any other exchange of data is logically organized to enable to load portion of data pertaining individual product and services, by a minimal bit or Byte counts considering that any shopping terminal in every locality need to have its data base visited frequently and the shorter the data exchange is the simpler and faster it will be.

BRIEF DESCRIPTION OF THE DRAWINGS

FIG. 1A is an illustration of the initial step to recall a program select page onto a display screen of a shopping terminal or a video interphone of the preferred embodiment of the present invention;

FIG. 1B shows the first e-service category page recalled via the e-service icon of the program select page of FIG. 1A;

FIG. 1C shows the last e-service category page recalled via the next icon of the first e-service category page of FIG. 1B;

FIGS. 2A and 2B show the first e-shopping category page recalled via the e-shop icon of the program select page of FIG. 1A and the next e-shopping category page shown as the last page, recalled via the next icon of the first e-shopping category page;

FIG. 2C shows the recall of the shop select page-grocery via the grocery icon of the first shopping category page of FIG. 2A;

FIGS. 5A and 5B show the product select page and the selection steps of a fruit page including the variations of the selected block;

FIGS. 5C, 5D and 5E are enlarged displays showing details of the variation display block of FIG. 5B and its selection steps;

FIGS. 6A~6G show the product pages of the preferred embodiment showing the 8 bit codes assigned to the blocks covering the basic and the extended product pages shown in FIG. 5A including the codes assigned to the variation blocks;

FIGS. 7A~7E show the review of the in-cart pages and steps for the processing of shop A products including the delivery time and the payment prior to ordering;

FIGS. 8A~8D show the review of the in-cart pages and steps for the processing of shop B products and the in-cart page and step for processing single order combining shop A and shop B products;

FIGS. 10A~10H and 10J~10L show the recall and selection display pages and the steps for identifying failures and for scheduling a service visit including the hourly cost for regular, overtime, weekend and urgent hourly charges;

FIGS. 10M~10N and 10P~10Q show the selection of an urgent laundry block and the variation blocks covering the laundry weight, the pickup and delivery times and the returned laundry package variations;

FIG. 17 is a table showing the link codes as used for e-shopping category and shop selection in FIGS. 2A~2B;

FIGS. 18A~18B are tables showing the link codes as used for e-service category and class in FIGS. 1B~1C and FIGS. 9A~9C;

FIGS. 18C and 18D are tables showing the assigned 16 bit codes to administration files for linking items, pages, displays, data and control to e-service programs and e-shopping programs respectively;

FIG. 18E is a table showing in more details the 16 bit codes allotted to the electrical maintenance, class and shop of FIG. 18A;

FIG. 19 is a table showing the product group codes for the shop's category of FIG. 17, shown as grocery, including the basic and the extension pages of FIGS. 3B and 3C of the preferred embodiment;

FIGS. 20A and 20B are tables showing the codes of the preferred embodiment for the products shown in FIGS. 5A~5E as grocery products, including the variation codes and the operation/selection codes of the vertical columns icons of FIGS. 5A~8G;

FIGS. 21A~21D are tables showing the delivery and payment codes for products shown as grocery in FIGS. 5A~5E, 7A~7C, 8A~8D and 8E~8G;

FIGS. 22A~22E are tables showing examples of codes for the selection of the time and day for a serviceman visit;

FIGS. 23A~23B are tables showing the codes allotted to the selection of the timing for pickup and return, the prices and their variations for itemized laundry services shown in FIGS. 10M~10N and 10P~10Q.

FIG. 24A is a table showing the codes allotted to the memory link of the command protocol of FIG. 24B identifying the content of uploaded or downloaded data stream to and from the memory 43 of FIGS. 13 and 14;

FIG. 24B illustrates the n Byte command protocol blocks for exchanging streams of data with the memory 43 of FIGS. 13 and 14;

FIGS. 25A~25C are tables showing the nature of command codes of the preferred embodiment of the present invention for identifying the nature of the propagated string of codes shown in FIGS. 16A, 16C and 24B.

DETAILED DESCRIPTION OF THE PREFERRED EMBODIMENT

Figure 11A:
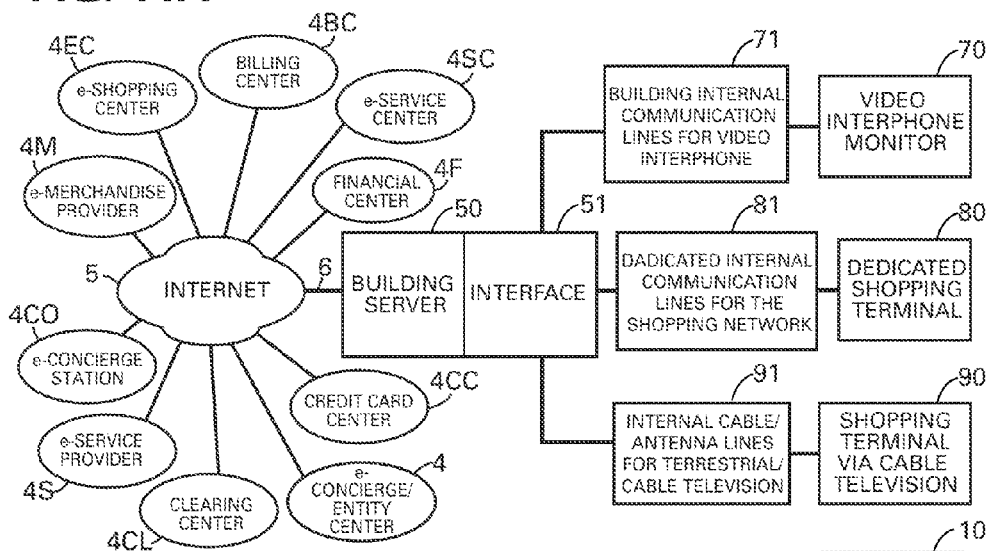
FIG. 11A is a block diagram showing the internal communication lines or networks of a building for the closed circuit e-commerce of the preferred embodiment including the connections via an interface and a server to a network or the internet and to the e-shopping and e-services providers.
Figure 11B:
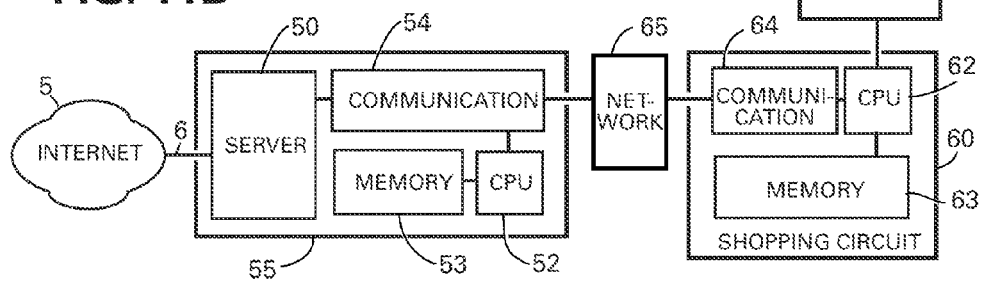
FIGS. 11B and 11C are block diagrams showing the elements and memory files of the shopping circuits and of the building interface/server of the preferred embodiment of the present invention.
Figure 11C:
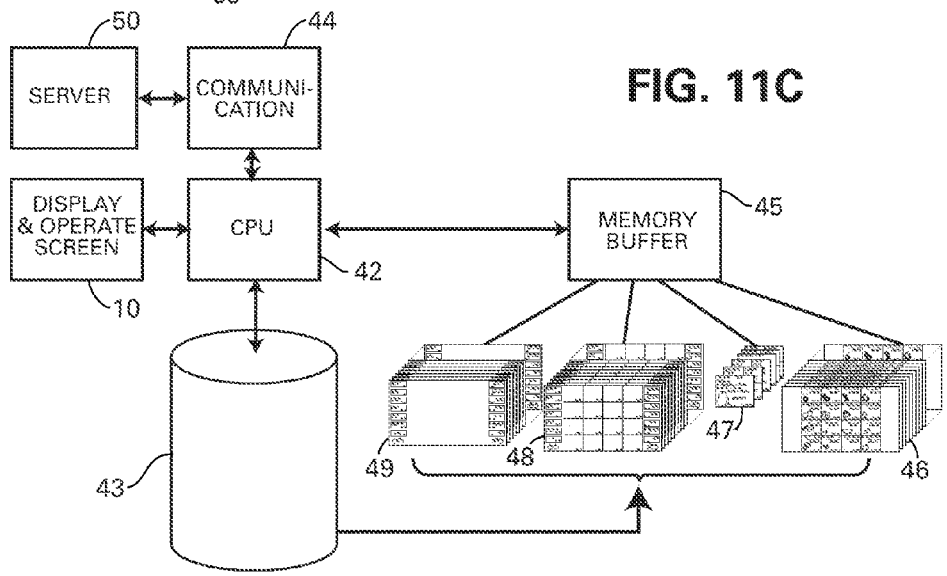
Figure 12:
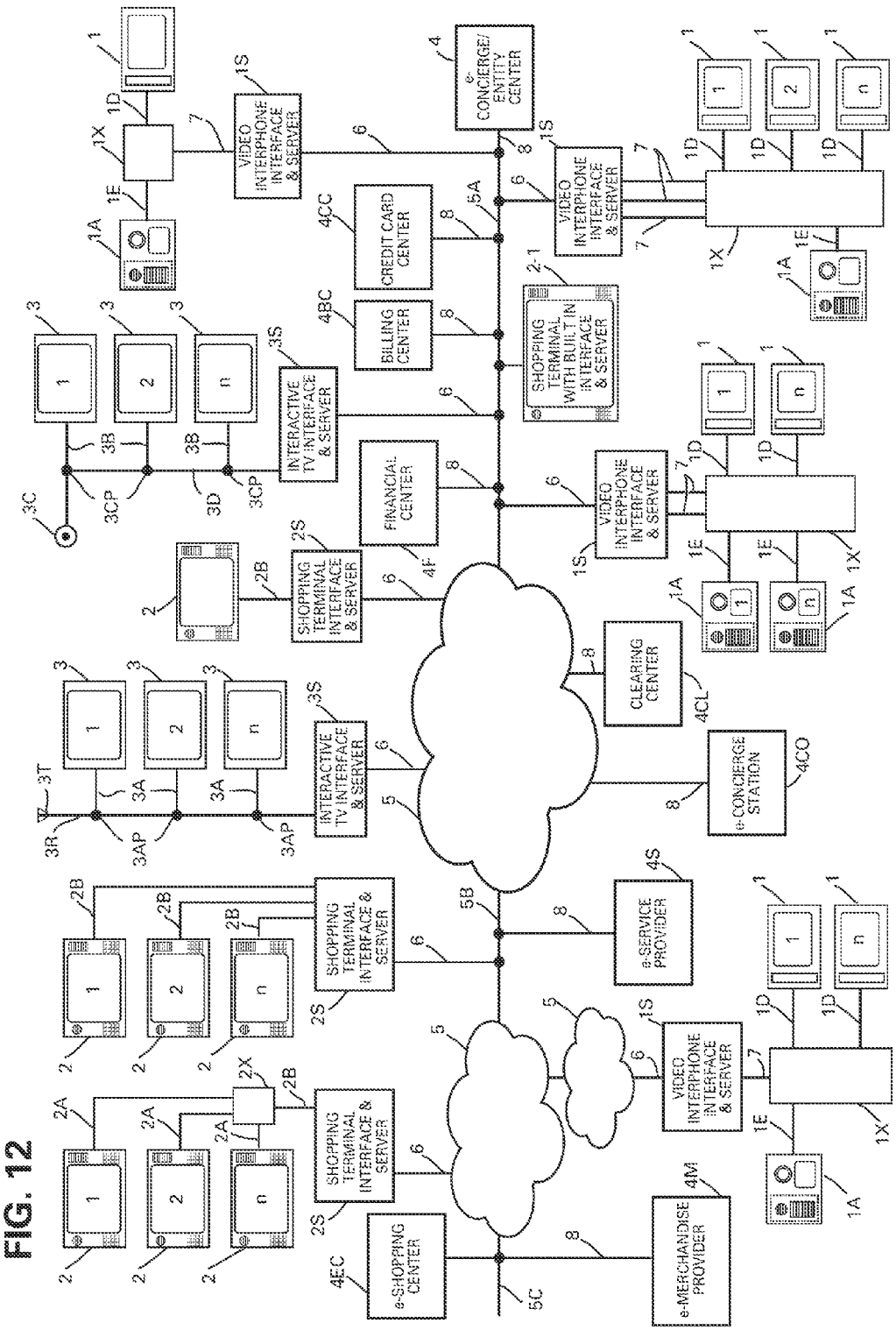
FIG. 12 is a block diagram showing the structural global networks, the shopping terminals and the providers for the close circuit e-commerce of the preferred embodiment of the present invention.
Figure 13:
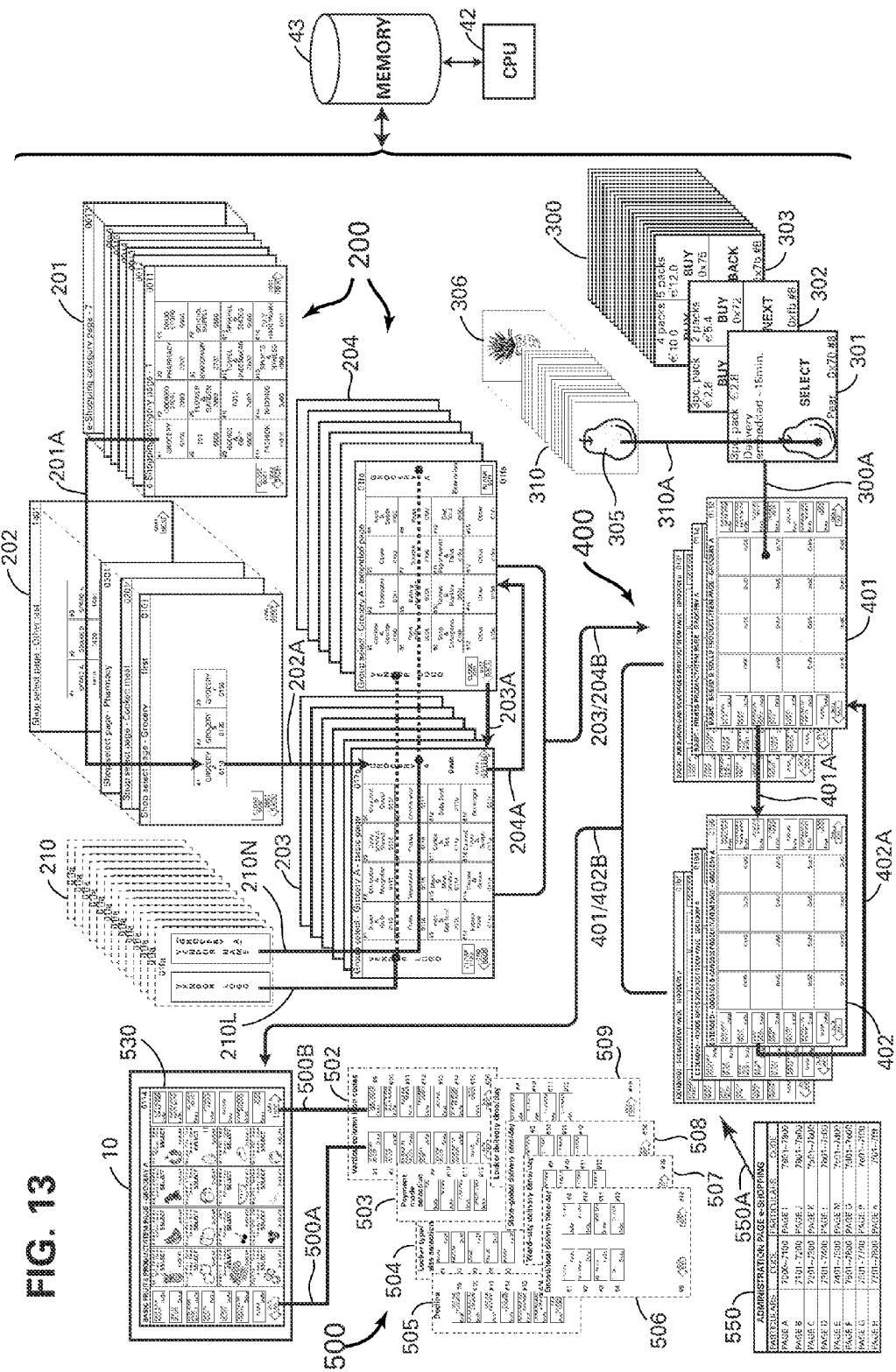
FIG. 13 is a block diagram showing the files of shopping data stored in the memory of the shopping circuit and the movements of data for the assembling of shopping display pages.

FIG. 1A shows a display touch screen 10 of the shopping terminal, comprising a monitor display of a video interphone, a television, an interactive television, a cable television and a dedicated shopping terminal, disclosed in the referenced US patents and are detailed in FIG. 11, FIG. 12 and FIG. 13 of the U.S. Pat. No. 8,117,076 including the descriptions in col. 2, line 47 to col. 3, line 3. The operation and circuits of which are described at length throughout the description and are shown in FIGS. 2~10.

The use of touch screen 10 shown in FIG. 1A and in FIG. 13 of the U.S. Pat. No. 8,117,076 is disclosed in col. 14, line 63 to col. 15, line 14, including the voice communication with an operator and the selection via an hand held remote control unit.

Because the circuits and the operating methods are detailed in the above referenced patents and particularly in the U.S. Pat. Nos. 7,461,012 and 8,117,076, the descriptions are not repeated in the present application.

The touch screen of FIG. 1A is shown to be activated by the finger touch or by the remote control unit 12. The remote control unit 12 can be RF or IR or a directive pointer remote control using laser dot to target and trigger an icon. The icons or the display blocks can also be operated by movement of a finger without touching the screen and other movement sensing circuits be it eye contact and similar means for the selection of an icon or a picture, or other display of a select screen. The shown activated screen 10A is a basic program select page for enabling the user to select a program or an application icon of his choice.

The shown icons are an entry icon for recalling the communication with a visitor at the building entrance and for releasing the door lock for the visitor to enter the building. The alarm icon for recalling the alarm program that may include the arming or disarming of the alarm system and/or for connecting and/or communication with an alarm monitoring station operator, or the police to report an alarm and the like. The concierge icon is used to call a local stationed concierge or it may be programmed to call or engage an e-concierge station shown in FIG. 11 of the U.S. Pat. No. 8,117,076.

The emergency and medical help icons are included in the e-services described in details later, but are introduced into the basic program select page to enable the user instant access to a doctor for help, or ambulance and other urgent emergencies with no delay or confusion, particularly under stress or pain etc. The shown automation icon operation and coding is disclosed in the U.S. Pat. No. 8,170,722 incorporated herein by reference. The e-shop and the e-service icons and their programs are discussed at length below.

The finger 11 is shown touching the e-service icon of the program select page 10A recalls to the first page of the e-service category icons 10B as programmed. In the event of error the user can touch the back icon 15 or close the display via icon 14. If a given service is not listed in the first page the user can touch the next icon 13 to recall the next page or repeatedly recall pages until the service icon of his choice is displayed or until the last page 10C is displayed, even though the service of choice may not be found, because it was not stored into the memory.

As will be explained later, the simplicity of the apparatus, coding and methods of the present invention are elevated by not over providing services and shops via pages upon pages. The simplicity concept is to provide the user with choices, wherein the user can add suppliers, shops and services at random, as his need arises or eliminate providers and vendors when he finds a stored service or a shop offering of no interest to himself.

Loading and programming many unneeded shops and services into many pages does not make the system efficient. A wall mounted shopping terminal is not comfortable to operate long. Standing in front of a display monitor and search via many display pages does not reflect the intent of the present invention. However, no limitations are prescribed here, because it is similarly possible to load an extensive shopping programs for operation via a remote control unit 12 of FIG. 1A or 220 shown in FIG. 12 of the U.S. Pat. No. 8,117,076, including shopping while comfortably sitting in a chair or a sofa in the living room.

FIG. 2A shows the recall of the first e-shop category icons page 10D. Each icon is identified by a numeral #1 to #16 and by an assigned 16 bit code representing one category of a shop or a service. Grocery is an important category and therefore the grocery icon is shown listed first, however if the grocery category is not found in the first shop category page, the user can touch the next page icon as shown in FIG. 2B for further search.

The page of FIG. 2B is shown as the last category page, containing only four categories, furniture, electrical appliances, A/V, PC & phone and hardware. The rest of the display is blank and the icon NEXT 13 is not needed and is shown blank or removed from the last page to prevent further search attempts of non-existing pages.

FIG. 2C shows the finger 11 touching the grocery block of the e-shopping category page 10D to recall the shop select page-grocery 10F. The shop select page-grocery displays all the grocery shops stored in the memory of the shopping terminal of the present invention. Shown in the display page 10F are n grocery shops, grocery A, B and n, each shop follows a template program for providing similar or identical products, yet each shop is free to price the product as they find fit. Such practice ensures that the user will be given competitive advantages and the ability to shop freely at a lower cost. As will be explained later the user can mix and shop individual product from different shops in one order.

As will be further explained, the product selection and presentation are templated into a common mandatory template design, giving the users the means to compare the price of a product versus the other because the other comparable products are all incorporated in an identical coded block of another shop and the program enables to review a given product of a given category of all the shops in the same category. This will be further explained later.

Figure 3A:
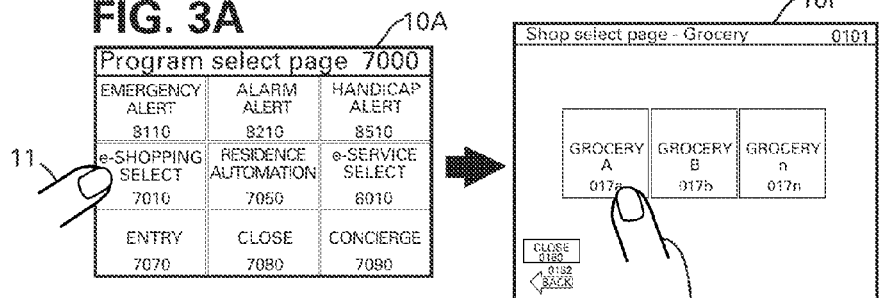
FIG. 3A shows a skip recall example of the shop select page-grocery via the program select page of FIG. 1A when the stored e-shopping program comprises only the grocery category.

FIG. 3A illustrates how the program cuts one step in the selection process. When the single stored e-shopping category is grocery and the selected icon of the program select page 10A is the e-shop icon it will no longer recall the e-shop category icon page 10D or 10E. No such selection is needed for a single stored category. Instead the program recalls the display 10F directly with its three groceries stored shops, bypassing the page 10D detailed above.

Touching one of the three shown grocery shop icons recalls the grocery product group icons page 10G of the selected shop.

Selecting one group from up to sixteen product groups shown in page 10G recalls the items/product page of the selected group. Each group may consist of up to 16 displayed products #1-#16. Shown in FIG. 5A is the basic fruits product group page 10P as selected via the fruits icon #5 of the group page 10G.

The basic grocery product groups shown in page 10G are bread and rolls, oil, butter and margarine, dairy products, breakfast and cereal, fruits, vegetables, pickles, condiments, fish and sea food, meat and meat products, coffee and tea, baby food, frozen food, sauces and spices, canned food and soups, and beverages. The icons are numbered from #1 to #16 and each is coded by the last 4 bit of a 16 bit code. The last 4 bit code is a common code for each and all the basic product group pages 10G, regardless of its shop category or service category. The 16 bit codes are also the default codes for the first listed group of the first shop of any category, shown as Grocery A in table 104 of FIG. 19.

Figure 3B:
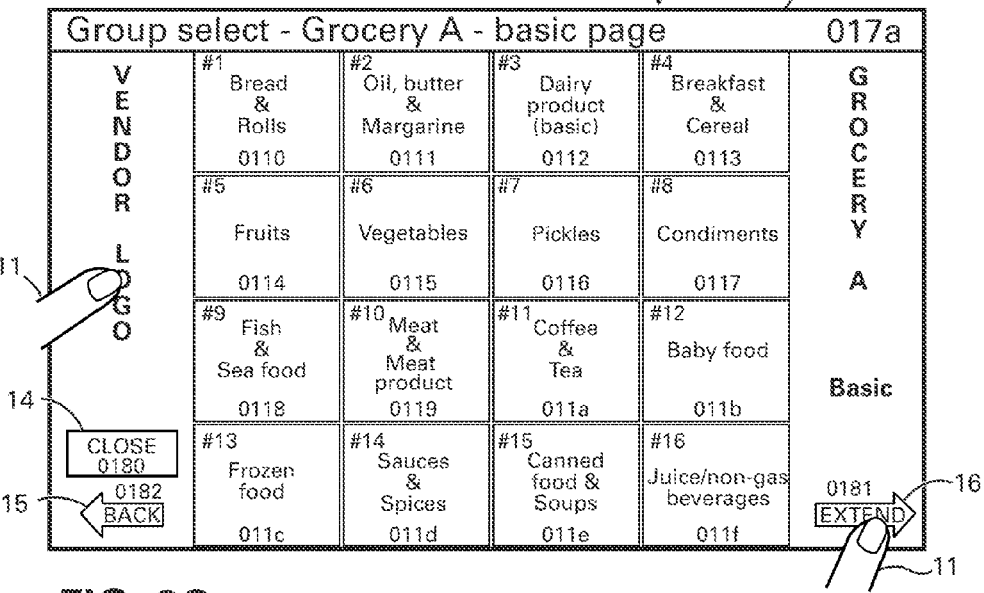
FIG. 3B shows the basic group select page of grocery A, recalled via the grocery A icon of the shop select page shown in FIG. 3A.
Figure 3C:
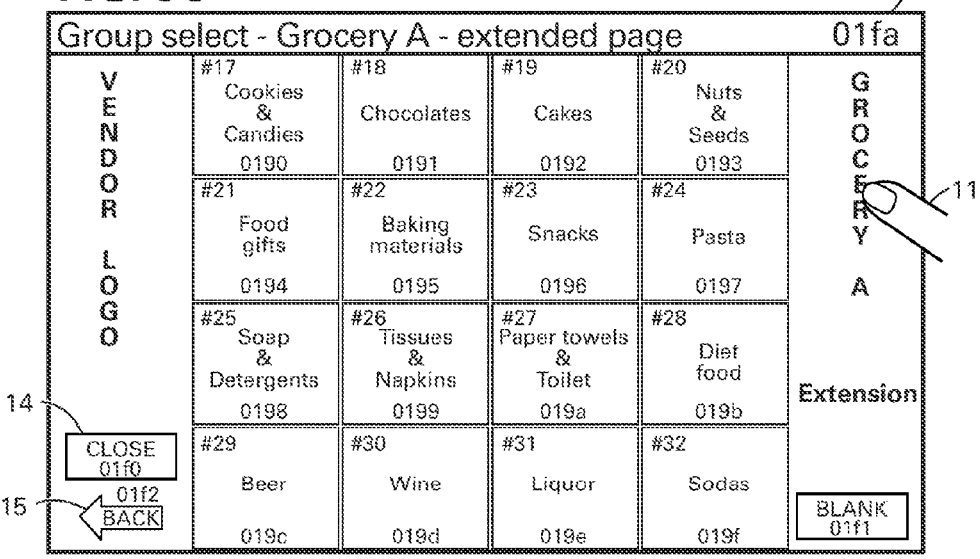
FIG. 3C shows the extended group select page recalled via the next icon of the basic group select page of FIG. 3B.

Touching the extend icon 16 recalls the extended group page 10H of FIG. 3C. The extended group page covers sixteen icons numbered #17~#32, extending the grocery product with further sixteen groups shown, enabling the user to select and shop via an extended product range. Each of the #17~#32 icons is coded by a 16 bit code, which code is a common code for covering all the extended product groups, similar to the basic group pages 10G. The shown group codes represent the extended group page of Grocery A shop.

The allotted codes to the categories, the shops and the product groups enabled to transform a 16 bit code into a combination code or protocol, each comprising a category, a shop and a product group. Annexing an 8 bit code comprising of the products #1~#16 (basic page) and the #1~#16 (extension page) including the product quantity variations to the 16 bit code completes a 3 byte protocol for identifying millions of products and services. The code or protocol will be further explained later.

As stated above the recall of category, group and a product should be made efficient and simple, for enabling the user to complete his selection and order via minimal searches and touches of icons and/or surfing through multiple pages. For this the selection process of the preferred embodiment of the present invention is programmed to skip pages from the select sequence, including a category and/or a group selection process, when a single category and/or a single group are stored in the memory of the shopping terminal. Similarly the select program minimizes the number of select pages or icons or both of all other recalled displays as further illustrated and explained below.

Figure 4A:
FIG. 4A shows another example of skipping the shop select page when only one grocery shop is provided and/or stored in the shopping terminal and a grocery is recalled via the group select page of FIG. 3B.

FIG. 4A shows the selection of a grocery category icon of page 10D that recalls the group select page 10G, bypassing the page 10F of FIG. 2C that its purpose is to select one out of the plurality of recorded shops of same category. The shop of the example of FIG. 4A is the grocery category shop, wherein one only grocery store is recorded and stored in the shopping terminal memory.

Figure 4B:
FIG. 4B shows a further skip example when the e-shopping is recalled via the program select page of FIG. 3A and the stored e-shopping program consist of a single grocery category and a single grocery shop.

FIG. 4B shows a direct recall of the group select page 10G via the e-shop icon of the basic program page 10A, skipping the category select page 10D and the shop select page 10F because only one shopping category and only one shop, such as a single grocery shop that is located for example inside the building of the residence, is stored in the memory. In such example the touching of the e-shop icon of the basic program page 10A recalls directly the group select page 10G by skipping both select pages 10D and 10F of FIG. 2C.

Figure 4C:
FIG. 4C shows a recalled page of e-service categories and only eight categories are stored to display a partial single page with eight select icons only.

FIG. 4C shows an e-service selection via the basic program page 10A, similar to the selection in FIGS. 1A and 1B. The difference here is that only eight e-services categories are stored in the memory of the shopping terminal and the recall of the category select page 10B displays the only eight icons of the stored service categories. The eight shown category icons are displayed on two top rows of the page 10B, the other blank icons including the next icon are removed. It is clear from FIGS. 4A, 4B and 4C that the limiting of categories and/or shops simplifies the selection process and the ordering for products and/or services by skipping pages and removing unused icons from the displayed pages.

Whenever a selection is made for a category or a shop and the select category and/or the shop page is or are bypassed, for example when touching a select icon for e-shopping select the program provides for recalling the first listed active shop in table 14, such as Grocery A. When the icon switch over shop is touched the next listed active shop of the same group, shown as fruits in FIG. 5A, will be recalled and displayed. Using next and back icons will shuttle between the basic and the extended group or product pages of the displayed shop. This will be further explained.

FIG. 5A illustrates the basic product/item page, showing a fruits selection page of the recalled grocery shop. The page is shown divided into sixteen display blocks, each is represented by a numeral #1 to #16. It should be pointed that though all product/item pages of the preferred embodiment are identically divided for all the different products/items offered by the different shops and categories, the number of blocks and their divisions or sizes or shape can be differently displayed.

The codes shown in each block are the common hexadecimal or hex based 8 bit codes, shown as 0x00 for #1 and 0x0f for #16. Each block is operated and addressed by the 8 bit code assign to it. The codes shown in FIG. 5A and in all the other pages illustrated in any of FIG. 1A to FIG. 10Q are shown for describing the methods, programs and structures of the present invention but are not displayed or otherwise revealed to the users of the system. The dwellers or the tenants of the residences that are shopping for products or services are not exposed to or distracted by the codes or otherwise.

Further, different coding can be applied to the pages and the blocks and/or different bit counts. The 8 bit or a single byte used, as further explained below, is for selecting a block each representing a product or products or variations of products. The codes used are the preferred embodiment for pervading short and simple e-shopping process for products and services throughout.

FIG. 5A shows a sixteen basic selection of fruits, each is shown as a picture or an illustration of the offered fruit type, in the examples of FIG. 5A block #1 shows a pineapple offered as a single piece or 1 piece for delivery within 15 minutes at a price of Euro 1.2. In the US it will be offered, for example, as a Dollar $1.80.

Block #2 offers a bunch of bananas for Euro 1.6 and the same delivery of within 15 minutes. Block #3 offers 200 grams of strawberries and block #8 offers 3 pears pack at Euro 2.8. All the offered fruits in the 16 shown blocks are available for delivery within 15 minutes. As will be explained later, such short time delivery is made possible if a grocery shop or a delivery terminal, depot or branch is located inside large residence or office building and a deliveryman walks to and reaches the residence through the elevator of the same building.

Each of the blocks includes an emphasized SELECT sign or token to indicate that the product can be purchased via a touch of the icon. FIGS. 5A and 5C show the finger 11 touching the block #8 and FIG. 5C is an enlarged view of the block #8 of FIG. 5A, with detailed references to the shortest delivery time, on the basis of the shop location. The location and delivery will be further explained.

FIG. 5B shows new descriptions and signs or tokens inside the block #8 immediately after it was touched by the finger 11 or when it was selected via a remote control unit 12 (not shown). When a small size screen such as 7" is used it is preferable to enlarge the block to cover, for example, four blocks such as #3, #4, #7 and #8, or cover the entire screen. It will be then possible to introduce more text information into the enlarge block.

FIG. 5D is an enlarged view of block #8 of FIG. 5B. The finger touch in the block #8 of FIG. 5B is not shown in the same position of FIG. 5D that shows more details of the otherwise same block.

The display in FIG. 5D is a BUY display for one or buy multi packs or pieces at reduced price per pack and the sign SELECT of FIG. 5A is changed to individual BUY signs or icons for a single pack, of the original display #8 at Euro 2.8, 2 packs at Euro 5.4 and 3 packs at Euro 7.8. Touching any of the three BUY icons will enter the purchase of the buy displaying one or multi packs order into a cart and will change the block display #8 into a purchased block with a Cancel token similar to the shown cancel token in block 9, for enabling the cancellation of the buy when the shopper changes is mind.

The processed block #8 is shown in FIG. 7A to be 3 packs as purchased at Euro 7.8 in-cart. The delivery is shown as 15 minutes and the signs or icons select or buy are now changed to CANCEL. Touching the block #8 with its cancel token will remove the purchased pears from the cart and return the block display to its original display of FIG. 5A or 5C. The purchased product, the two bunches of grapes of the basic block #9 of FIGS. 5B and 7A are shown to be in-cart can be cancelled prior to sending the order by touching the block or icon #9.

FIG. 5D shows four codes each for one quarter of the rectangular or square shown block. As will be explained later there are many variations possible for dividing each block and assigning each block into operational sign or icon, or into purchasing variations of quantities, prices, product color selections, size selections, and any other selection that is a variation to the products displayed in FIG. 5A. Such variations are very significant to the screen size, because with larger displays it is easier to introduce more details and more variations.

FIG. 6A shows the preferred embodiment code assignments to the basic product page shown in FIG. 5A including the codes for the vertically organized operational icons. The code assignment represents a given preferred embodiment for a mandatory template as applied to a small size video interphone display, ranging from 7" to 12" screens (measured diagonally).

The assigned codes are listed in the code tables 105A and 105B shown in FIGS. 20A and 20B that will be discussed later. The preferred embodiment mandates a basic 16 operational icons stacked in two vertical columns or bars, each comprising eight icons, tokens or signs to the left and right sides of the display. The shown 8 bit codes 0x0a to 0xfa however are one example and different numbers of icons, bits and different codes can apply to a given preferred embodiment of a template structure. The icons that are termed as the select/operate keys, or signs or tokens use common codes and icons for a whole group or groups or for all of the e-shopping product pages. The e-services are explained separately.

Up to six product variations codes are shown assigned to each of the blocks #1~#16. Each variation code covers a display area of one quarter of a block, however depending on the size and the horizontal/vertical ratio of the screen the number can be increased to six codes or reduced to two only as shown in FIGS. 6D~6E, or remains a single code for the whole block. It is possible to set diagonal areas or rounded or circles areas (not shown) if the screen size permit, and assign arbitrarily the product codes, limited by the codes shown in tables 105A and 105B of FIGS. 20A and 20B to six codes including the single basic base or select code, and six variation buy codes. If the number of bits is increased, for example to 16, the number of products and variations will be practically limitless.

Even though it could be possible to apply non used codes in FIGS. 20A and 20B for selecting other specific buy variations or quantity variations as well, it is preferred not to introduce unused or spare codes to the common template or into any mandatory template type assignment so it can remain spare codes when and if the need arise. The mandatory template for the preferred embodiment displays are shown in FIGS. 6A and 6B as four codes for each block #1~#16 of FIGS. 6A and 6G.

The four codes as set for the preferred embodiment in FIG. 6B may be viewed as a limit that is set to a given product, including the selection and purchasing of larger quantities. Yet for a situation were a shopper wants to buy larger quantity of a product, beyond the quantities available in the variation displays, which are believed to be above what a shop will plan during the design of the template for an anticipated quantity needs. For larger quantities the solution is to repeat the order.

The present invention makes it possible for the shopper to generate two or three or any number of orders in sequence to the same shop for the same product and its quantity variations. Since such repeat orders can be transmitted at short intervals, the repeated orders can be delivered together, because it is in the advantage of the shop to combine repeat orders into a single delivery and cut its costs. Most shopping web sites do not provide for unlimited quantities, a quantity has to have an upper limit.

If the shop is run out of products because of excessive buy orders, the solution is to buy similar products from two or more shops via a single combined order, this will be further explained later.

The 8 bit codes tables 105A and 105B of FIGS. 20A and 20B provides for selecting 16 basic products of a group including five variations per product such as quantity variations or as an example, variations such as a plain basic ice cream cone, with its variations covering ice cream with a single topping or multi toppings and/or a selected topping. A total of 96 BUY codes are provided for the 16 basic codes and 80 variation products codes (5 variations) and 48 CANCEL, NEXT and BACK codes. 64 codes (spare codes included) provide for the key columns, including the codes for selecting the delivery time and the payment method. The codes 0x0a to 0xfa are assigned to the basic operational vertical column icons and selected codes within the 0x0c to 0xfc and 0x0e to 0xff of the columns used for the selection of deliveries and payments (including spare).

The 8 bit product codes or the 96 codes shown in the tables 10P and 10P-1 of FIGS. 6A and 6G of the extended products referred to above, follow the other steps of the simplified shopping processes. Short processing is absolutely needed when a shopper is standing in front of a wall mounted display, installed for example on a corridor wall or in the kitchen. People shopping for groceries of the example shown in FIGS. 5A and 5B are reluctant to waste much of their time surfing and searching. Particularly not while standing against a wall. A shopper will lose its patience if the process gets complex and long.

The extended product of FIG. 6G codes are the same codes shown in FIG. 6A with the exception of the codes allotted to the operating icons #3 coded as 0x2a and 0x2b in FIGS. 20A and 20B shown connected by action line 18 for switching over between the products of the basic page and the extended page and back to the basic page. The difference between the two pages is in the codes shown in FIG. 16 and will be explained later.

Figure 16A:
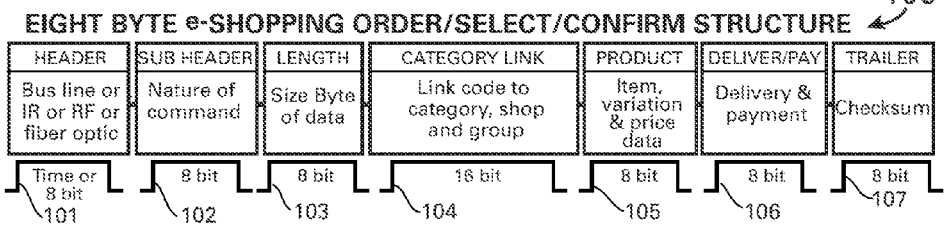
FIGS. 16A and 16B illustrate the 8 Byte blocks of the e-shopping protocols and the three Byte link for identifying the product block for loading and updating the memory files of the preferred embodiment of the present invention.

The short 8 bit product codes and the entire 8 Bytes protocol shown in FIG. 16A is one of the elements that make the selection simple, even though the shopper is not aware of the code structure. The code makes the ordering of products simple to compile, store, modify, add or delete to and from the memory. Moreover, the shortening of the communication, the loading time and the pages assembly time including the processing time by the server that manages a large residential communication network and thereby must provide the fast instant services and responses that are expected by the shoppers and explained later.

On the other hand the U.S. Pat. Nos. 7,461,012 and 8,117,076 referred to above describe an extensive apparel and other complex shopping via a CAD program that measures the shopper image in 2D or 3D to fit a virtual display showing a shopper virtually dressed up with the apparel as selected. Such simplified shopping requires large number of revolving layered icons, including measurement, color selection, material selection and many other detailed items to provide for an accurate CAD style shopping. For such program the bit number for icons/blocks and variations can be extended to 64 bit or 4 bytes or more. Such programs require larger memory, higher speed CPU, but the conceptual selection via coded icons of a shopping terminal remains the same.

Returning to the first revolving or layered block of FIG. 5D that covers the original base block #8 coded 0x70 that is now shown covered by a layer with NEXT sign or icon, assigned to recall the next revolving or layered display represented by FIG. 5E. Touching the NEXT icon recalls the next block display, shown in FIG. 5E as a further expansion of the offered quantities and with the NEXT sign changed to BACK sign, both the NEXT and BACK codes are listed in tables 105A and 105F of FIGS. 20A and 20B. Touching the BUY six pack icon at a price of Euro 13.8 will enter the six pack selection into the cart. Yet if the user changes his mind and decides to buy the three packs after reviewing the offer of FIG. 5E he can touch the BACK sign to revert back to the display of FIG. 5D.

Touching the BUY 3 pack icon coded 0x73 of FIG. 5D enters the 3 pack into the cart and introduces a CANCEL icon for the 3 pack purchased and shown in FIG. 7A in-cart, the CANCEL codes are listed in tables 105A and 105F of FIGS. 20A and 20B. The CANCEL icon is an example of enabling a shopper that touched the BUY icon of the 3 packs pears shown in of FIG. 5D and the 2-bunch of grapes of block #9 to cancel his buy order or any of the selected item/product. Touching the cancel icon cancels and removes the purchased 3 pack from the cart.

FIGS. 6A and 6G illustrate the blocks and the operating icons setup of the preferred embodiment including the assigned codes as applied to the basic product page of FIG. 5A and the extended product page referred to above. The 16 blocks of FIG. 6A coded from 0x00~0xf0 are the basic blocks and codes of the preferred embodiment for all basic product/item pages of all groups of e-shopping such as dairy or vegetable or frozen food of the grocery group.

FIG. 6G illustrates the blocks and operating icons setup including the assigned codes as applied to the extended product pages. The 16 blocks of FIG. 6G are identically coded from 0x00~0xf0 are also the common extended blocks for all the extended product/item pages of all groups of the e-shopping categories, similar to the basic codes discussed above.

The 256 hexadecimal 8 bit codes are shown in tables 105A and 105B of FIGS. 20A and 20B cover the whole product/item codes of the basic page, the extension page and the variation products, in quantities or otherwise, for both the basic page and the extended page. The table lists the codes assigned to the operational icons and as explained above the codes of the tables 105A and 105B of FIGS. 20A and 20B identify and cover, in combination with the category/shop and the nature of command codes, the entire products/items offered for the e-shopping of the present invention.

FIG. 6B shows, as referred to above, the four variation codes that are displayed into a touched or otherwise selected blocks, be it by the remote control unit 12 or by movement detection of a finger or of a hand of the shopper.

The four quadrants of the block in FIG. 6B are each coded by an individual code. The base buy code 0x01 is shown in the upper left quadrant, but any other arrangement or positioning of the quadrant can be applied to the mandatory template. The other three codes are the buy product variation and the next, back and cancel codes, listed in tables 105A and 105F of FIGS. 20A and 20B. The e-shopping program of the present invention will recall the selected block shown in FIG. 5D with the assigned codes shown in FIG. 6B.

Similar arrangement and recall applies to the selection of any block of the extended product/item page of FIG. 6G. The applied codes to the extended page are the extended codes shown in table 105B of FIG. 20B.

FIGS. 6C, 6D, 6E and 6F show other setups of a touched, recalled or otherwise selected block that can apply or be introduced into a template, depending on the size of the screen display and/or as different display combinations may be devised for the different categories or groups. The combination of products select display can be designed on the basis of gained experience, to improve upon the selection process and based on the user's requests and conveniences.

Another method to buy plurality of products is by a repeat buy of the basic product as originally displayed via a repeated recall of the same display of a single offered product using the NEXT quadrant. However such repeat buying are prolonging the selection process, while the combined variation displays of FIGS. 6B~6F of the preferred embodiment are clearly more efficient and cut the processing steps of an order.

FIGS. 7A~7C show the completion process of a grocery order for the fruits shown selected in FIG. 5B. FIG. 7A shows the finger 11A touching the cart review icon for recalling the cart content shown in the display 10P4 for review. The total amount of the buy products in the cart is shown as € 10.3.

The finger 11B of FIG. 7B shown in page 10P5 touching the delivery select icon 0xaa enters a delivery token with no details into the display block under the displayed total sum of € 10.3 and simultaneously introduce the eight icons 0x0c~0x3c and 0x8c~0xbc shown in the display 10P6 of FIG. 7C to be eight time and day delivery select icons. The eight icons shown are the delivery time and day assigned by or to the given grocery shop and/or as mandated by the template.

The shown time of ~15 minutes identify the shop to be an embedded or local shop or to be a delivery depot within the building or the neighborhood. The term embedded identifies a shop or a delivery depot to be located within a same residence building or within a given building complex for delivery to residences of the complex. Such embedded shop or delivery depot can deliver within 15 minutes or 15~30 minutes, which is the preference of the common shoppers, particularly for groceries. The user or the shopper however is not limited to touch the fastest delivery icon shown as ~15 minutes, 15~30 minutes, 30~60 minutes or 1~2 hours.

For example if the dweller or tenant or the user is about to leave his residence and cannot wait, not even 15 min. and will not be back before two hours he can select a delivery time such as 2~6 hours, 6~12 hours, next day by 10:00, next day by 14:00, next day by 20:00, next-next day by 10:00, next-next day by 20:00 and 2~7 days. The delivery time selection codes are shown in the delivery/payment tables 106-1, 106-2, 106-3 and 106-4 of FIGS. 21A, 21B, 21C and 21D, each is showing the eight delivery time and day applicable to the shop location and to the delivery itself.

The delivery selecting process is initiated by touching the delivery select icon shown in FIG. 7B as a finger touch 11B of the delivery icon. The multi arrows 11B1 of FIG. 7C indicating eight touches possibilities with one arrow touching the 15-30 min. icon, and entering the delivery time of 15~30 minutes to the cart review display as shown in FIG. 7C.

The delivery times are set by the shop on the basis of a combination of products offered (by a given shop) and the shop location. This combination, location and product, calls for more delivery time options than the number of icons shown. Providing for the remaining delivery times to be viewed by shifting the delivery options through the icons. The shifting of delivery times call for attentive selection, wherein the user has to read the icon content before touching it to prevent errors. This is in contrast to the habitual touches of fixed icon positions by relying on one's memory.

Figure 8B:
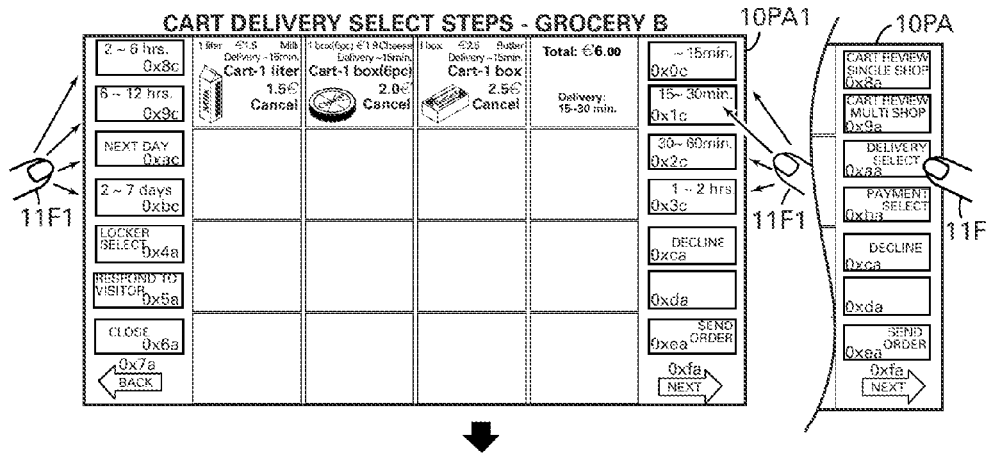

The shown icons for delivery time and day in FIGS. 7C and 8B for a 7" size display are limited to eight, and this same eight revolving icons need to cover the selection of delivery lockers and the delivery time to the lockers as well. For a 10" or 12" or bigger display sizes, more icons can be introduced, each assigned with a code selected from an operating icon codes not used or shown in FIGS. 20A and 20B of the basic and the extended product, for providing fixed icons covering the whole of the delivery time options, such as ten or twelve icons into fixed positions. Non applicable fixed delivery time and day icons, for example a delivery time of up to 15 min. for out of town shop, are dimmed and will not be responsive to a finger touch. Such setup enables the covering of all the delivery times and days without revolving or shifting any of the icon's content and providing for an improved user's habitual touch for selecting his intended delivery time icon.

The shown locker select icon in FIGS. 7A~8F is for selecting a locker for a delivery of the ordered products. Such lockers are installed in a delivery room or in a part of the building dedicated for lockers. The lockers and the entry into the delivery room are operated via the video interphones or the shopping terminals system. Such delivery room, area or zone and lockers are disclosed in U.S. Pat. No. 7,945,032 incorporated herein by reference.

Delivery into a locker of a delivery room disclosed in the US patent covers deliveries into refrigerated or freezer lockers for delivery of perishable foods or frozen food, such as ice cream, that must be stored in a freezer. This mandates a communication and coordination between the building server and the shop for an order identified as a frozen food for delivery to a freezer locker and that a free freezer locker is available and is reserved and will be available for the delivery at the delivery time as ordered.

If no such refrigerated or freezer locker is installed in the building or if such is installed but is occupied or is reserved to another dweller, the video interphone monitor and/or the shopping terminal are updated, when a selected locker is or become unavailable, and are programmed to refuse or reject an order for delivery for which a freezer locker is necessary and simultaneously display such refusal and/or sound a beep or other alarm sound to alert the tenant that his selection for delivery of a product requiring refrigerated or freezer locker cannot be processed. Similar refusals apply to other specific size or structured lockers that are occupied or reserved by others.

Figure 8C:
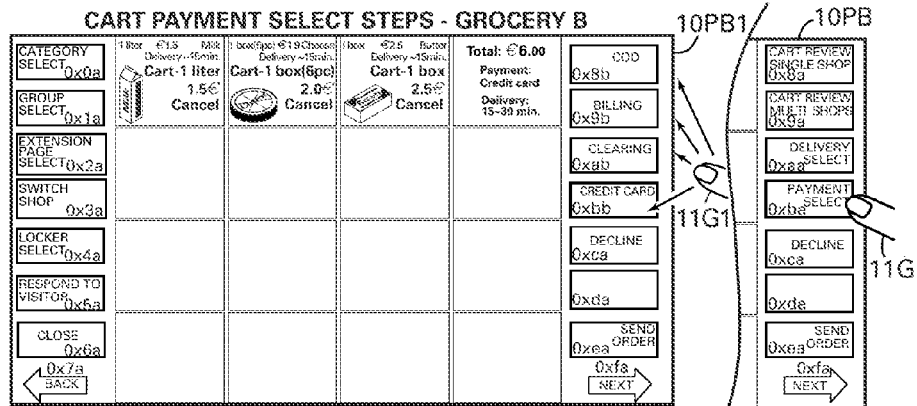
Figure 8D:
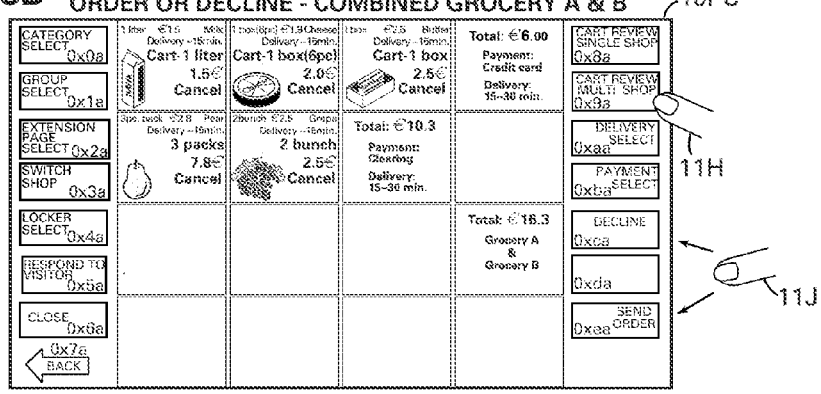
Figure 8E:
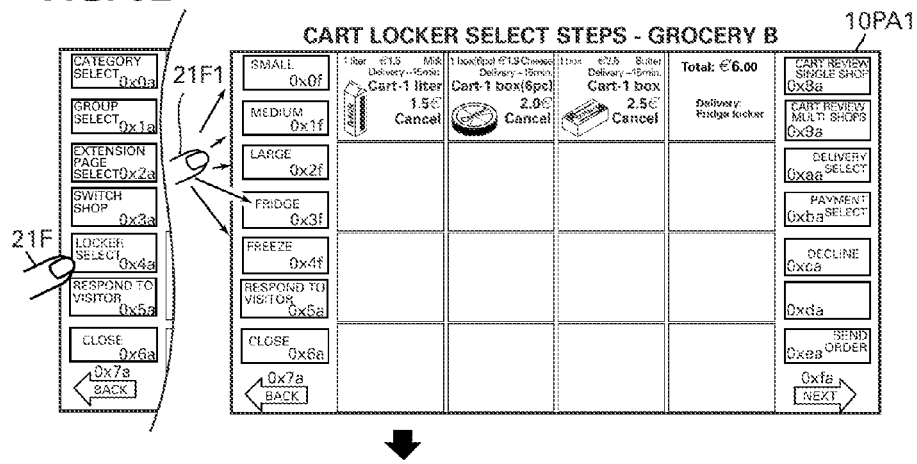
FIGS. 8E~8G show the selection pages and steps for payment, time, day and the size or the type of a locker for delivering the products of shop B shown in the cart review of FIG. 8A.

The finger 21F touch the locker select icon coded 0x4a (of a small size 7" display) shown in FIG. 8E recalls the lockers size, shape and type icons such as Small, Medium, Large, fridge and freeze and listed in tables 105E and 105K of FIGS. 20A and 20B. The touching of the locker select icon will also change the delivery times and days commensurate with the time and days shown in table 106-4 of FIG. 21D, which are the delivery times and days allocated for the deliveries into the lockers.

Figure 8F:
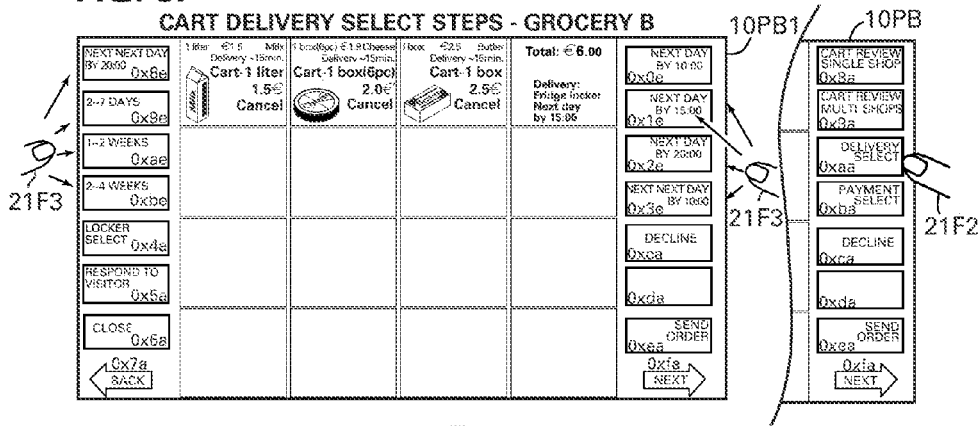
Figure 8G:
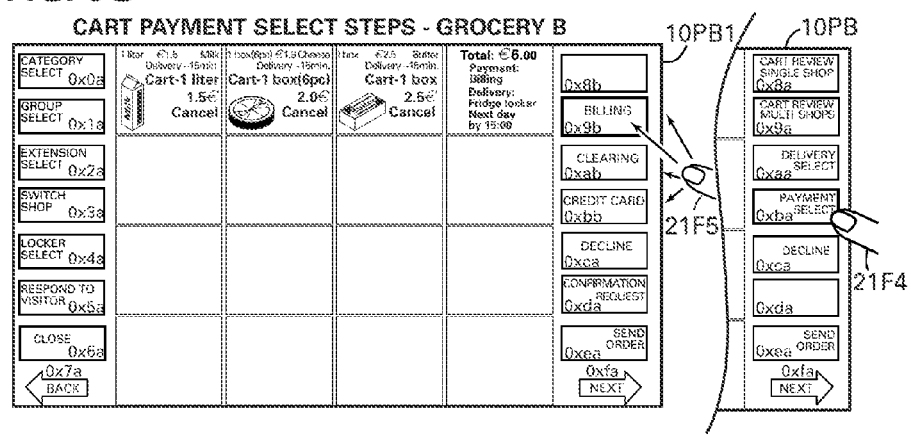

FIGS. 8E~8G show the selection processes for the delivery of products into lockers installed in a building. When different type or size lockers are installed they need to be selected. The touching 21F1 of a locker type icon directs the delivery into a small, medium, large, refrigerated or freezer. Other structured locker or sized for enabling the delivery of the ordered products into other fit lockers can be provided by the unused codes in tables 105F and 105K of FIGS. 20A and 20B.

The delivery time and day icons to lockers may differ from the allocated and shown in table 106-4 of FIG. 21D of the preferred embodiment, or to other designated delivery times as the case may be.

The payment of the preferred embodiment for delivery into lockers does not include COD or cash on delivery, because the recipient (the tenant) may not be in the residence or in the building at the time of the delivery, and COD payment cannot be completed. As will be explained further, the COD icon is removed from the selection of payment method, or is dimmed, whenever delivery to locker is designated in the order sent.

The next step is to select the payment method by touching the payment select icon by the finger 11C1 shown in FIG. 7D.

There are only four payment terms in the preferred embodiment of the present invention, COD or Cash On Delivery, Billing or providing a credit within a given value or time, such as one month worth of purchases at the end of which the shopper must pay, Clearing which is a term used to indicate that the payment is made via the payment clearing center 4CL shown in FIG. 12 of the e-shopping center 4EC and Credit card of the well known credit cards services. As explained below the preferred embodiment provides a new concept of credit card payment process that removes the shopper angst or fear to expose his card details and his identity to an e-merchandize provider over the internet.

The finger touch 11C1 of a selected payment icon be it Billing, Clearing, COD or Credit Card completes the processing of the order shown in FIG. 7D and the shopper can proceed with the touch of the send order icon to transmit the order as selected to the single e-shop as ordered. The shown ready order is for two products purchased from a single grocery shop and when the shopping is processed via one shop only, the shopping program will transmit the order to the single shop identified as Grocery A in the example of FIG. 7A, even if the user touches the multi shop cart review icon. The propagated completed order protocol will be 11 Byte long, the 8 Bytes of FIG. 16A covering the first product, plus the 3 Bytes of the I.D code of FIG. 16B covering the second product.

The request confirmation icon shown in FIG. 7A will be displayed only if the delivery is expected to be sent, for example at least 3 hours after the shop received the order, or as otherwise defined by the e-shopping center 4EC of FIG. 12. Touching the displayed confirmation request icon will change, as will be explained later, the nature of command code of the sub-header 102 of FIG. 16A. The listed codes in the nature of command table 102 of FIG. 23A include a command code for an order with a confirmation request.

At any random given time, including during the processing and/or the completion time of an order, a visitor, a local concierge or an e-concierge may generate a call signal. The video interphone or the shopping terminal are designed to be in a sleep-waiting mode and a call signal from a visitor at the building entrance and/or a call from a local or an e-concierge station will wake up the display and will sound a given call tone. When the shopping terminal or the video interphone is busy selecting product or service or communicating with outside station or visitors at another entrance the system operating program notifies the visitor to wait while the residence unit is busy.

The communication circuits of the shopping terminal or the video interphone being operated in a shopping mode, be it for services or for products are preferably set to a busy mode and do not respond to a call from the entry panels or from a concierge station. This will free the shopping circuits and the process, including the data handling through the memory from random interruption and provide for undisturbed shopping via the video interphone, which is obviously more efficient.

For enabling the shopper to suspend the shopping process and respond to a visitor call or to a concierge call the shown icon RESPOND TO VISITOR 0x5a is provided. Touching the respond to visitor icon will suspend the shopping process and will connect the system communication, as if the call was made during a sleep-waiting mode and not in busy mode.

The Decline icon shown in FIGS. 5A, 5B, 6A, 6G and 7A~8C is to enable the user to decline and stop the completion of an order if the deliveries or the payment limitations generated on the basis of an updated data, at the time of ordering, is not what the shopper had in mind while processing the order.

The decline data is very important to the service and supply chain and the e-shopping and/or e-service centers for analysis purposes because such data identifies the user's dissatisfaction with the product selection or a specific condition such as payment terms, the credit or limitations provided by the billing, credit card and/or the clearing, as well as the delivery timing availability.

For this reason the touching of the DECLINE icon recalls seven decline icons shown in FIG. 7E for selecting the reasons for the decline from a group comprising product selection, payment limitations, delivery availability, combinations of the above reasons and all of the three reasons combined. The codes are listed in tables 105F and 105M of FIGS. 20A and 20B. Touching any one of the seven declines select icon will generate the order as processed, but will change the nature of command code 102 to identify the declined order and the reason for the decline. The communicated decline order will be identified by the sub-header 102 or the nature of command code, listed in the table 102 of FIG. 23A.

For different shops having different delivery options such as Grocery A with a shortest delivery time of ~15 min. and Grocery B with a shortest delivery time of 15~30 min. the cart review need to be processed for each shop individually. Same applies to different payments, two different payments must be processed separately.

FIG. 8A illustrates the recall of the cart review page of a single shop covering the shown selected dairy products for supply by Grocery B. FIG. 8B illustrates the delivery select option for the dairy products selected for supply by Grocery B. The process to select delivery from the two shops is shown individually because the shops location is different and the shortest delivery time is different. The shortest delivery select time for Grocery A shown in FIG. 7A is ~15 minutes while the shortest delivery time from shop B of FIG. 8B is 15~30 minutes.

In both cart review instances of FIGS. 7A and 8A, the shown single shop icon is touched by the finger 11A and finger 11E respectively and in FIG. 8C the payment selected is shown to be credit card, which is not the same as in FIG. 7D, for which billing payment was selected.

If the entire selected items/products from the many shops cannot be shown when the cart review is processed for shopping through different shops, the delivery time selection and the payment selection must be reviewed independently for each shop. If the delivery options are different for the two shops, or if the intended selection for delivery is different, or if the intended payment selection is different for one shop and the other, the single shop cart review icon must be selected. This enables to select individual delivery and/or payment method, even though all can be ordered via a single send string of linked protocols.

When the tenant intend to select identical payments and deliveries for a diverse shopping made through multi shops it is preferable to select the multi shop cart review icon, in which case the multi shop cart review enables to process the delivery and payments only once for the whole shopping. For example when the delivery is within 2~7 day and the payment is the credit card shown in FIG. 8C, many e-shops from different categories can comply with such delivery and must accept the selected payment via the credit card center 4CL shown in FIG. 12.

Yet, a single order can be generated by the preferred embodiment of the present invention after reviewing and processing the individual carts of the different shops, having different delivery options or different selected delivery and/or payments. Shown in FIG. 8D the finger touch 11H recalls the cart review after the individual selections of Grocery A and Grocery B of FIGS. 7C and 8C are made, enabling the user to review all the items on orders, including the total sum to be paid for the combined order.

FIG. 8D shows as referred to above the finger touch 11H for recalling the multi shops cart review, covering the two Grocery orders. The selected payment is shown as credit card for Grocery B and clearing for Grocery A and a delivery of 15~30 minutes for both shops. The two orders linked by a string of protocols sent via the finger touch 11J completes the single order covering two e-Grocery shops. The two deliveries will be made at about the same time of 15~30 minutes and the two different payments will be made, one via the clearing center 4CL and the other via the credit card center 4CC of FIG. 12.

The payment via the credit card center of the preferred embodiment is passing through the credit card center 4CC shown in FIGS. 11A and 12. Such arrangement enables each and every dweller registered in the system who intend to use his credit card to have its credit card details, credit limits and other particulars recorded and set through the credit card center, such that each order the dweller generates through the system for payment via credit card is passing through the credit card center 4CC and is automatically credited to the shop and debited to the dweller when the delivery is made.

Such simple transaction of payments provide total security with no disclosure whatsoever of the credit card particulars and/or any references to the identity particulars of the dweller, outside the confirmation to the shop that the payment for the given order is executed by a given dweller's residence of a given building at a given address. Confirmations including references to the payment details in accordance with payment transactions made will be provided as established by and between the e-shopping center 4EC and the credit card center 4CC of FIG. 12. Same or identical security arrangements and total confidentiality is provided to the payments made by the clearing center 4CL of FIG. 12.

Shown in FIG. 8E is a different delivery select processes for introducing the delivery of the dairy products shown in FIG. 8B into a fridge locker. The touch finger 21F is shown touching the Locker select icon 0x4a that recall the locker sizes and type icons Small, Medium, Large, Fridge and Freezer listed in tables 105E and 105M of FIGS. 20A and 20B as 0x0f~0x4f respectively.

The finger 21F1 touch the fridge locker icon 0x3f will enter the fridge locker into the cart review under the term delivery.

Next is the touch 21F2 of the delivery select icon that recalls the eight delivery options into lockers listed in tables 105D and 105J of FIGS. 20A and 20B and shown in FIG. 8F. The finger 21F3 that touches one of the delivery time and day icons will enter the delivery time and day as selected into the cart review below the term fridge locker shown in FIG. 8F.

The continued process calls for touching 21F4 the payment select icon shown in FIG. 8G that recalls the payment select icons. As the delivery to lockers does not, as referred to above, provide for COD payment, only three icons are introduced, the Billing, the Clearing and the Credit Card. The touching 21F3 of one of the three payment icon such as the shown billing will enter the billing payment method into the cart review shown in FIG. 8G.

As explained above, it is possible to combine several different shops, different categories, different payments and different deliveries into one single order, after each of the shop's purchases are reviewed in the cart and completed individually. Once all the purchases from all the shops are complete, and even though each shop selected delivery, payment and content are different from other shops the present invention provides for combining all the individual orders into a multi shops cart review, to be sent as a single order by a single touch of the send order icon.

Each shop makes its own delivery by itself, be it via courier or using the shop own vans or motorbikes and the like to deliver the packages or products, regardless if the order was individually made, or a single combination order was made by the shopper to his convenience. The server is programmed to divert each order to each shop individually via the e-shopping center 4EC for billing, via the credit card center 4CC and/or via the clearing center 4CL. It should be obvious that a delivery to a locker cannot be shared by two shops. Each shop with order for delivery into a locker will deliver individually to a specified locker as ordered.

As can be understood from all the above, the prices and the sums be it total or otherwise calculated, are processed by the shopping circuits shown in FIGS. 11A~11C. The prices per unit and totals are ranged to accommodate each category, be it for e-shopping or e-services. For example, the upper total sum for grocery shopping is not expected and should not be planned to exceed $500.00 for an order.

Further, grocery products do sell at prices below $1.00 and therefore cents must be introduced into the grocery prices and totals. The shown prices in FIGS. 5A~8G show only a single decimal or 0.1~0.9 or ten cent units, but preferably should show two decimals covering 0.01~99 or a single cent units. Accordingly the preferred embodiment for grocery is set to five digits and cover a minimum price, including totals, to be limited for example to be $650.00 or € 650.00, and ranging from 1 cent or 000.01 to 650.00.

Such limitation simplifies the communication, including the loading and updating of data, covering a whole range of prices to each and every shopping circuit of the system. To best communicate five digit prices by using binary protocols, calls for bits based (65,536 codes) protocols. It is clearly advantageous to apply 16 bits or 2 Bytes, as many programmable IC circuits and memories are Byte base and are simple to adapt.

Maintaining the two Bytes as an overall embodiment for communicating and storing the prices data of the present invention is clearly the preference. The two Bytes limitations provide for e-shopping and e-services amounting to $1,000~$9,999 or €1,000~€9,999, with a single decimal which should be well acceptable for larger values. For e-shopping and/or e-services such as expensive airlines tickets for the whole family that may be in the range of $10,000~$65,000 or €10,000~€65,000, there will be no decimals and the last single dollar or Euro or any other currency will be rounded, which should be acceptable as well.

The same two Bytes codes or protocols can apply to currencies of countries that use a single digit value, for example the Korean currency, with ₩ 1,200 (Won) approximately equal US$1.00. Accordingly one simple process will be to program the shopping circuit to convert the price code by multiplying the hexadecimal protocol value at a given rate, such as 1,200 that reflects the prices or the currency value of the different country versus the applied code. Another option will be to use three Bytes protocol for the prices and sums to be communicated between the interface/server 55 and the shopping circuit 60 of FIG. 11B, propagating seven digit prices and sums.

The price codes or protocols can provide direct value equal to the hexadecimal code, or it can, for security consideration use bit shifting value, individually programmed for each shop and/or for each of the different payment centers, such as the billing center 4BC, clearing center 4CL and credit card center 4CC of FIGS. 11A and 12. This is to prevent attempts by users, or hackers operating from within the system, such as other tenants, to manipulate or otherwise tamper with the prices, totals, charges and credits.

Another security solution is to install a bit shifting or otherwise rotated encryption program to the interface/server that is randomly updated by the system security center for randomly updating the encryptions of the shopping circuits of the building or a complex. Moreover, the tenants or the users do not and cannot have a direct access to the product prices and codes, nor to the variations prices and the totals or other sums shown in the different displays and hackers cannot tamper with prices.

The prices in their coded values are stored in the memory of the shopping circuit and are loaded, updated and communicated one way only, from the server/interface to the shopping circuit. The stored prices and the calculated sums are converted into display data by the shopping circuit for displaying the prices to the shopper for processing their intended order, but the shopping circuit 60 is not program to transmit price data to the interface/server 55 of FIG. 11B.

The shopper program transmits the block code or the variation codes only. The server/interface stores all the data pertaining to each and every block and its variations and it needs only the identity of the selected buy block or blocks to calculate the total sum of an order. The sent order propagated from the shopping circuit to the interface/server does not contain prices and totals data. Even if such data is injected into the transmitted order it will be ignored by the interface/server and the payment-centers. Hackers from within the system, reside in a given address and thus they will be immediately identified.

Shown in FIGS. 11A~11C are the basic apparatuses of the close circuit e-shopping of the present invention. FIG. 11A shows a concise system of FIG. 12, in which the video interphone monitor 70 is connected via the building video interphone internal communication lines 71 to the interface 51. Similarly the dedicated shopping terminal 80 is shown connected to the interface 51 via the dedicated building's network 81 being another internal communication lines and a television or cable television with a shopping circuit 90 is connected to the interface 51 via the cable/antenna network, yet another internal communication lines 91 of the building. The interface is shown attached to the building server 50 that is connected to the internet 5 and to the e-commerce, e-shopping, e-services, e-concierge and other e-commerce facilities discussed above and are shown in FIG. 12.

The three different internal communication lines 71, 81, 91 and 65 of FIGS. 11A and 11B are shown as an option for all such lines to be connected to the interface, however any one of the shown lines, termed also as network, is sufficient for providing the propagation of protocols of the preferred embodiment of the present invention.

Moreover, the building server 50 can be integrated into a combined unit with the interface 51, similar to the shown combination unit 55 of FIG. 11B. When only one shopping terminal is connected and operated in the building, the dedicated shopping terminal 80, as an example, can be integrated with the interface 51 including the dedicated internal communication lines of the shopping network 81 to be internal connecting lines within the integrated circuits of the combined shopping terminal and the interface (not shown).

Furthermore, the integrated building server with the interface 55 can be further integrated with a single shopping terminal of a building including the internal lines. Alternatively the not shown integrated shopping terminal with the interface and the internal connection lines can be directly connected to, or integrated with the building server, to provide a single e-shopping terminal server combination (not shown).

FIG. 11B shows the basic circuits and the memories of the closed circuit shopping of the preferred embodiment of the present invention. The shopping circuit 60 connects to a display and operate screen 10 that is extensively discussed above and to a network 65 which corresponds to any internally structured network or communication lines for propagating any combinations of signals, such as video interphone signals, dedicated shopping signals, cable TV signals, antenna TV signals, each can propagate analog or digital signals and feed power to the shopping terminals.

The analog or the digital signal may comprise audio signals, video signal, data signals, binary signals, IP signals, VoIP signals, alarm signals, emergency signals, control signals, be it single ended or differentially propagated.

Further the propagated signals can be non-compressed or compressed, using any known compression method or standard or non-standard, encrypted or non-encrypted. In other words any individual or a combination of known electrical signal, or of any individual or a combination of optical signal via optical cable network and/or any combination of electrical and optical signals can be used for e-shopping in the closed circuit shopping system of the preferred embodiment of the present invention.

To ensure communication compatibility both the communication circuits 64 of the shopping circuit 60 and 54 of the interface/server 55 and the network 65 of FIG. 11B are structured to process and accommodate the two way signals propagated between the shopping circuit and the interface/server.

The CPUs 62 and 52 and the memories 63 and 53 of the shopping circuit 60 and the interface/server 55 are similar in concept, even though an individual shopping circuit 60 stores and processes only the individual uploaded programs as selected by the dweller, while the CPU 52 and the memory 53 of the interface circuit stores and processes the whole of the programs as selected by the plurality of dwellers or tenants, each for his individual shopping circuit 60 on the basis of each individual desire.

It is obvious that the storing, loading and updating the many individually selected programs of a large residential complex, such as 200~300 apartment building, wherein each dweller select his own choice of shopping programs, different from the other dwellers selection, requires large scale server/interface. Particularly if the entire programs and pages are to be updated regularly. This will keep the server busy and will cause long delays in loading, updating and the processing of individual orders. There is a need to reduce the stored data to a minimum and provide a program, using applications such as the known cascading style sheets or CSS, such that each shopping circuit assembles its display pages on the basis of a minimal stored data, which is assembled and loaded to cover and accommodate the individual dweller selections.

FIG. 11C shows the conceptual memory circuit for creating the shopping pages of the preferred embodiment of the present invention. The shown memories 53 or 63 of the interface 55 and the shopping circuit 60 are shown as memory 43 including a memory buffer 45 connected to the CPU 42 of FIG. 11C. The memory 43 is shown feeding the memory buffer 45 with pages that are also termed hereafter as memory files shown as numbered 46 to 49. Each numeral represents a stack of pages or files that are assembled into the display pages in the memory buffer 45, processed by the CPU 42 for display onto the screen 10 that is used for processing the order.

Stack 46 represents a partially assembled page such as shown in FIG. 5A, but without the operating left and right vertically aligned icons. Stack 47 represents assembled blocks shown in FIGS. 5C~5E. Stack 48 shows the pages shown in FIGS. 6A and 6G including the operating icons and stack 49 shows blank files or pages containing the commonly applied operating icons. Each of the shown pages, blocks or files is identified by its code as referred to above and/or listed in the tables of FIGS. 17, 19, 20A and 20B. It is therefore clear that it is possible to combine, for example pages 49 with pages 46 to display and operate the shopping referred to above and shown in FIGS. 5A~5E.

It will be similarly possible to combine pages 48 with pages 46 or with blocks 47, or to combine pages 49 with blocks 47 for providing the displaying pages 10P and 10P1 of FIGS. 5A and 5B for shopping the fruits described above. It should be clear that the many such storing stacks or files can be assembled into a basic common page structure, by using a common files fit for all, and specific files containing data for each category shop and group, and individual files covering the data and pictures or graphics for the individual products of a group.

FIG. 13 is an expanded showing of the data stored in the memory 43 shown in FIG. 11C that is fed through and by the memory buffer 45 to the CPU 42 and to the display 10. FIG. 13 does not show the buffer, nor the physical connection to the display 10, it shows however in more details how the data is stored and how the final display 530 is assembled into the display screen 10.

The file 201 of the stack file 200 of the preferred embodiment comprising of seven shopping category pages, each page links 16 shopping categories to 96 shops via 16 shop select pages of file 202. A total of 111 categories and 666 shops can be selected and linked via the 7 selection pages of file 201 and the 111 pages of file 202. Each of the categories can be supplied by up to 14 shops in file 202 and shown in table 104 of FIG. 17 to be up to n. However, the preferred embodiment limits the shops to six for example in the coded Grocery category 0100, with the basic group shops coded in FIG. 19 are in the range of 0110~0130. The extension group shops are shown coded 0190~01b0. Accordingly up to 6 shops of a shop select page of file 202 can each link to a total of 12 group select pages per each category shown in files 203 and 204 and in FIGS. 3B and 3C.

As will be explained below the 32 group blocks of the group select pages 203 and 204 form the base for the identifying the category, the shop and the group within the category. This mandates the maintaining of the files 203 and 204 in their template form with the basic group page is recalled through an icon block of the shop select page. The extended page is recalled via the extend icon 16 shown in FIG. 3B. Moreover, the extend 16 and back 15 icons provide an instant switch over from the basic group page to the extended group page and back as shown by actions lines 203A and 204A of FIG. 13.

The shopping category pages are shown in pages 10D and 10E of FIGS. 2A and 2B and the shop select page 10F is shown as grocery in FIG. 2C. Each shop, shown for example, as Grocery A in page 10G of FIG. 3B, provides 32 groups of products through the basic and the extension pages 10G and 10H of FIGS. 3B and 3C. The process discussed above, teaches the selection process through the display pages and is not repeated here, because the purpose of FIG. 13 being discussed is to show how simple is to assemble, display, shop, process, load, update and/or change the base data of the preferred embodiment of the present invention.

Each touch of a block or an icon of any of the displayed pages is instantly acted upon, such as the touch of the block Grocery in file 201 recalls the Grocery shops selection page instantly. The data stored in each block of the category pages and the shop select pages is minimal, it can be added with an illustration to make it pleasing and easy to view and select. This can be implemented by displaying simplified icons, similar to a PC or mobile icons that occupy 1 KB of data or less and the shop select icon can be installed with the shop logo or mark. The initial loading of the programs can be very fast, measured in a fraction of a second, or a second at most.

The seven category select pages of file 201 and the 111 shop select pages of file 202 are not included in the mandated template design or structured pages. They are assembled pages to comply with the dweller or user selection, priorities and desire. If the dweller selects only 16 categories there will be only one category select page active in file 201 for the given dweller. If the dweller selects less than 16 categories, some of the single category blocks of the select page will be blank. This enables to remove for example, the top row first, the bottom row next and/or the removal of blocks to the left and the right, such that the remaining active selection blocks are in the screen center.

If the dweller selects for example more than 32 categories the dweller will nominate its preference or priorities, which are the most important for him and which will be most active for him, and place those categories select icons or blocks in page one. Followed in page 2 and in the following page or pages, positioning the remaining blocks in accordance with the user preference.

It is similarly possible to provide a program calculated to identify the most used or activated categories by the dweller and shift the categories select icons from page to page after some interval, such as three months. It is of course advisable to introduce a message box announcing of the program study and conclusion for the user to agree and confirm by touching an icon, specially created for the message box, or deny the shifting of the categories blocks through the pages.

Similar layout and/or blocks or icons design apply to the shop select pages of file 202. Only one page is provided for the shop select and a maximum of six shop select icons or blocks are possible. The blocks can be designed and displayed in the same size and shapes as the template 16 blocks of all other pages, or they can be designed as vertically or horizontally long rectangular icons, equal to the number of shops provided.

The program for the shop selection icons, including the shop logos are only updated when the dweller or the e-shopping management eliminates or adds a shop or shops to the given category and are not subject to a repeated updating. For providing options, the program can be pre-designed with different shop select blocks or icons to enable the user to set and select one of the pre-designed icons to his desire and convenience.

As explained above, when only one shopping category is selected or provided, the category selected pages of file 201 are not used and when one only shop is pre-select for a given category, or one only shop is provided for a given category the shop select page of the given category is not used. If only one category and only one shop is provided for the entire e-shopping program, the basic group select page of file 203 will be recalled directly via the initial program select page as shown in FIG. 4B and if multi shops are provided and are the choice for one single shopping category selected, or is the only category provided, the initial program select page will recall the shop select page of file 201 as shown in FIG. 3A directly bypassing the category select page of file 202.

Shown in FIG. 11D are the select action 201A in which touching the select block of the category select page recalls the shop select page and action 202A in which the touching of a shop select block of the shop select page recalls a basic group select page of file 203.

The touching of the Grocery shop A in file 202 (finger is not shown), recalls instantly the basic group of product page of file 203 which is a template file page comprising 16 blocks, each representing a product group such as shown in page 10G of FIG. 3D. The extended group file shown in file 204 and in page 10H of FIG. 3C is recalled via the extend icon 16, coded 0181, and is shown by the action arrow line 203A. The touching of the Back icon 15, coded 01f2, is also shown by the arrowed action line 204A.

The recalling of pages via the operating icons shown in the vertical columns are the preferred embodiment for the present invention. The basic concept of which is not to distract the shopper from his shopping actions by exiting a product select page, be it a group select or individual product select, into a page that may be an interim page for selecting the next product page. Such change in page concept disrupts and distracts the shopping process.

The preferred embodiment enables the shopper to remain in a page that provides for the selection of products, quantities, delivery and payment without exiting, what appears to be the same product display-select page. This is achieved when the 16 blocks, be it for selecting a group or specific product and its variations are all selected via a fixed position blocks and the shuttling between the pages are processed via the operating icons of what appears to the user to be similar pages, namely the pages 203~204 of files 200 and the pages 401~402 of the files 400 discussed below.

The file 210 contains the names of the shops and each of the shop logo, for introduction into the group select pages of files 203 and 204, shown in FIGS. 3B and 3C as grocery A and vendor name. The name of the shop and its logo are listed in table 104 of FIG. 19 and are shown as codes 018a~018f in the basic group page codes. As the name and the logo of the extended group page are identical and the same logo code is provided for the extended page that is assembled for displaying with the same name and logo via action lines shown as 210L and 210N.

It is preferable to provide for shuttling between shops without exiting the category select pages. For example, cooked meals that may include in their categories foods of different origins such as Italian food or Chinese food and/or fast food such as hamburger and fries may induce the user to look for categories of a different shop prior to recalling the basic product page 401, which in practice will be the shop's menu for the selected meal category.

The group select pages include only extend, back and close icons, with the extend icon is blanked in the extended page. Therefore, the back icon of the extended page can only revert the display to the basic group select page 204 as shown by line 203A. This limits the shuttling between the group select pages back and forth only. The back icon 15 of the basic group page shown in FIG. 3A will recall back the shop select page of the cooked meal shops 202. If the newly selected cooked meal shop did not satisfy the user's desire for food, the shuttling via pages need to be repeated, which is complicating the process and counters the intent to minimize the searches, and/or deny or prevent any back and forth searches via "another" search menu.

For enabling the direct shuttling through the group display pages 203 and 204 the program of the preferred embodiment provides for the recalling in repeated succession the group pages of other shops in the same category by touching the shop name or logo of page 210 installed into the vertical column of the group display pages 203 and 204. The codes for recalling the shops are listed in table 104 of FIG. 19 as 017a~017f for the basic group pages 203 and 01fa~01ff for the extend group select pages 204.

The program for the selection of pages stores the selected shops for the given category in page 202 and will rotatably shuttle in steps between the group select pages by each touch of the shop name or logo shown in FIGS. 3B and 3C by the finger 11. This enable the user to review all the group select pages of all the shops in any one of a selected category, wherein touching the logo or shop name of the basic group page shuttles between the basic pages. Same applies to the touching of the logo or the shop name of the extended page will shuttle between the extended pages of the other shops. Shuttling between the two group pages of each shop remain via the action lines shown as 203A and 204A in FIG. 13.

The basic product page 401 and the extension product page 402 are the two selection pages for the individual product and its variations shown as a fruit page in FIGS. 5A~5E. FIGS. 6A~6G show the 8 bit Hexadecimal codes used for product selection. The codes for the basic and the extension product pages are literally same except for the code for the recall of the other page. Reciprocally assigned to the operate icons shown to be linked by a reciprocal action line 18 connecting the extension select 0x2a and the basic select 0x2b icons.

The entire 8 bit codes covering the 32 products including the variation product selection codes are shown in FIGS. 6A~6G and in tables 105A of FIGS. 20A and 105G of FIG. 20B. The base codes shown as select basic products and select extended product of tables 105A and 105G including the code for operate/select icons in both tables. The operate icon codes are fixedly assigned to all basic and extended product pages, regardless of the category and/or the shop and/or the selected group.

This is important because as will be explained later, it is necessary, for example, to combine categories, shops, groups and the products into one send mixed order to the different shops. But most importantly, the fixed codes covering the category, shop, group, product and its variations serve as a perfect simplified link code for the updating and upgrading each individual product and its variations into each individual memory 43 of each shopping circuit of each residence. Such updating, upgrading and/or any other changes of data pertaining to each individual product, with thousands upon thousands of products installed in each individual memory 43, it will be practically impossible to create never ending new linkages or addresses to a newly introduced product changes if they are not provided with fixed link, page and block code base.

If each individual product stored in each individual memory 43 is differently coded and requires an individual link code or address, it will be a practical impossible task to regularly update the many products even if the number of users will be few hundreds only. So much more if the number of users are in thousands, or tens of thousands or more. As the system grows it will be an unattainable task to find the very large number of programmers needed for coding each individual product for each individual dweller and link it.

As referred to above, the 16 bits or two Byte codes covering each group code, be it of the basic or of the extended group codes, identifies the category, the shop and the group. The 8 bit or one Byte codes provide full coverage to the product, for identifying the base product and the six buy variations. The combination of the two Byte and a single Byte makes it clear that the use of the three Bytes to identify and link each product and its variations is a novel preferred solution for a simplified e-shopping in a closed circuit, wherein a single order for 50 products and variations from n shops will be 155 Bytes long, comprising the 8 Bytes of FIG. 16A plus 49×3 Bytes of FIG. 16B.

As stated above, one major problem for implementing the present invention is the need to update, upgrade and otherwise install and change data to each and every shopping circuit of the video interphone, the shopping terminal or to the television sets and/or the set-top boxes, be it cable or antenna fed television, referred to above and disclosed in the referenced US patents and shown in FIG. 12. The number of such shopping circuits can be in millions and updating, upgrading or otherwise modifying, on a routine daily base or at random, the data pertaining to the products installed in each shopping circuit is a complex undertaking that must be simplified.

The data pertaining each product includes its descriptions, the quantity in number of pieces, volume in cc or liters or gallons, weight in units of grams, kg, ounce, or lbs., size in mm, m, inch or feet, its package or container description, its price and its picture or illustration. It is necessary to display such data onto the display block of each product. The size of the display screen is very important as small size screen can provide for small letters that are not easy to read and it calls for very short descriptions and details, such screen mandate the enlargement of the selected icon as referred to above.

The need for the data that cover description, unit, volume, weight, size, package, quantity, price and picture or illustration for each product clarifies the importance of a simplified data handling, storing and displaying, with the aim of simplifying the data loading, removing, updating and otherwise modifying including the very important issue of security.

As explained above the price data is used by the shopping circuit to display the price or prices into the product blocks and the cart but not to communicate the price with the order sent to the server/interface 55 shown in FIG. 11B. The price data is needed for the shopping circuit to display the product's and its variation prices and for calculating the totals shown during the cart reviews prior to the send order. The prices data, loaded, updated, modified, removed and/or any other price changes are propagated from the interface 51 or the interface/server 55, using 16 bit or two Bytes codes, referred to above, to a product block page of the file 300 of FIG. 13 that is identified by the three Byte code, linking the category, the shop, the group and the product, or to a price file (not shown) for assembling the price data into the product blocks and/or into the cart review price display.

Each of the product pages of file 300 shown as 301, 302 and 303 store the product and its variation data, but can store only a portion of the entire pages display data. The shown page 305 stores the picture or the illustrative display for all the three pages, including their alternating display in the product select pages 401 or 402 and in the cart review and order send shown in FIGS. 7A~8G. The assembling of a picture or an illustration of a product stored in a picture file such as the pages 305 or 306 shown in FIG. 13 for all the needed displays offer substantial and meaningful reduction in the needed data, that otherwise is stored in the e-shopping servers used by web shops into any and all of the pages and files displaying the product.

The data pertaining to the operating/selecting icons for enabling the processing and completion of an order, the delivery select icons, based on the shop location versus the dwellers building location, termed above as embedded, local, ward, town, city, state, country or global. The shortest delivery times by the embedded and local shops and the shortest delivery time by other shops. The icon and the data pertaining to the availability and the type of lockers. The data pertaining to the payment method and the data pertaining to the icons of a declined order are all templated, defined, coded and stored in the icon pages 502~509 of file 500. The pages 502~509 are programmed for a recall into their respective icon numeral position in accordance with the selection progress as referred to above in FIGS. 5A~8G, all coded by 8 bit codes shown in tables 105B-105F of FIGS. 20A and 105H-105M of FIG. 20B.

The other operating icons, covering the next 0081, back 0082 or 01f2, close 0080 or 01f0 and extend 0181 icons are stored fixedly in the category and group select pages of FIGS. 2A, 2B, 3B and 3C respectively and referred to above.

The product description and the overall stored data pertaining to the display pages of each product and each variation product including the buy price of the base product and the buy prices of the variation products that are shown displayed in the product pages such as 301, 302 and 303 can be stored in different memory files.

One preferred embodiment storage method provides for each of the product pages 300 of all the shops selected by a dweller to be installed along with the shown picture or illustration 305 and 306, the overall product information, the prices and the variations. The install or the loading of each product page is templated with a strict limit to the bit count of the stored data.

Another preferred embodiment for storing the product data however is to store the product information into an indexed data file for processing and assembling the data into a display pages 300 as they are recalled into the product select pages. The data can be installed in a form of a display file covering a size of a single block area.

Such processed display block or page, using any of the many well known display programs, for formatting the display into a template size with a fixed pixel count and data size, such that the data for each product page can be assigned with a limited mandated bit count. Same applies to the picture or illustration files 310, each picture or illustration such as shown in pages 305 and 306 is processed into a display format with a fixed pixel count and a mandated limited bit count.

Such limited mandated bit count simplifies the loading and the updating of the product pages at fast speed. The loading can be limited to one only page, or one only picture and/or the variation of the page, with the picture size is automatically adjusted into a smaller size for introduction into one quadrant of the block or any other programmed size such as for enlarged variation page of FIG. 5C.

Figure 16B:
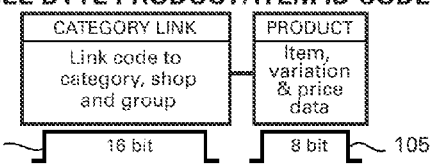

The product information data is stored in files (not shown) that are indexed on the basis of the category, the shop, the group and the product, using the category link code 104 and the product code 105 shown in FIG. 16B.

The two hexadecimal Byte codes pertaining the product prices referred to above, for calculating the totals in the cart for an order or for decline are preferably not included in the other data pertaining each product and its variation data, and are stored in a separate indexed file (not shown) for introducing the calculated totals in the cart.

If the product description and the overall data pertaining to each of the product is also stored in an indexed file referred to above, and are not introduced into pages 300 as a display file, the price codes along with the overall data and the pictures or illustration, need to be processed for display into the pages 300 or directly into the appropriate blocks of the product select pages 401 and 402.

The shortest delivery times by the shops on the basis of the shop location versus the dwellers location are also introduced into the display file of the product pages 300 or directly into the product select pages 401 and 402.

A total of 32 product pages are assembled into the template product select pages, sixteen into the basic page 401 and the other sixteen into the extension product page 402. Here to, the assembly of the pages 401 and 402 can be processed such that the product pages 300 are regularly stored into the product/item select pages 401 and 402 of each group, or instantly when the page is recalled by the dweller or the user.

The data pertaining to the credit limit authorized by the billing center, the credit card center and the clearing center as well the data pertaining the availability of needed locker for delivery, referred above to an example of freezer locker for delivery of ice cream, and other data that need to be displayed in a form of response to the shopper action, such as the well known dialog boxes, advising the dweller that his current order cannot be processed through the clearing payment, as his credit limit is reached, or advising the user that no freezer locker is free for his choice of delivery time/day.

The dweller can acknowledge, remove the dialog box and change his payment method and/or cancel the ice cream order by decline, touching the decline icon coded 0xdf shown in FIG. 7E as the reason to be payment and delivery for his declined order.

The payment selection, the payment programs and the payment centers and other financial centers such as 4F including the credit cart center 4CC, the billing center 4BC and the clearing center 4CL shown in FIGS. 11A and 12 are not necessarily a center in its literal name. They can be a local branch, or a city center for serving a city or a town, and can be a region center or branch or the country or a global center.

The Financial centers can include insurance services for providing the dwellers insurances of any type, tailored for the dweller in their locations, such that the dweller are interested in the offered insurances and will choose a selected insurance companies with the offered program. Such programs may insure the dweller's liability toward is purchases. This is a commercial issue, but the explanation is made only to make the function of the payment select clearer.

The credit card center 4CC or be it local branch server, or a town server or a city server, needs to cover a whole range of credit card companies, be it American Express, Visa, Master card and the many other well known Credit Card companies, that are bundled and shown simply as credit card payment, are in fact a single credit card provider as chosen via a choice select page (not shown) in which the dweller has the option to select one of the many. Once selected, the credit card payment limit and payment condition must be set between the dweller and the credit card provider.

If the limit is reached, and the dweller made an agreement with more than one credit card provider he can recall the credit card choice select page and re-select the payment to the other credit card provider of his choice, without breaching the limit of the first selected credit card provider. It is however necessary to store in the management files limits and the record of purchases for each of the shown payment icons, such to enable the screen the introduction of a dialog box when the selected payment limit is reached, or close to be reached, and to provide an instant recall for the choice select page (not shown) of the credit card, providing of course that dweller made a credit agreement with another credit card provider.

The clearing center 4CL, be it local clearing, or city clearing, or country clearing or global clearing provider, participating in the close circuit e-shopping is referred to an institution such as a Bank, or credit association or other organization that maintains regular deposits, payments and money transactions, in which a dweller maintains personal or individual account, and the dweller made an agreement with a clearing provider to pay his purchases from his personal account.

Such clearing organizations including banks that participate in the closed circuit shopping of the present invention will provide the terms and condition and require each individual dweller to agree and sign an agreement, which is another commercial issue for each clearing center or branch and a dweller to undertake. The conditions and details of such undertaking is not included in the shown preferred embodiment, but explained above for providing an illustrative structure of the clearing provider center 4CL shown in FIGS. 11A and 12. Payments for shopping can be processed similar to credit card transactions, wherein the clearing center credits the provider and debits the dweller for his purchase.

It is possible for the e-concierge/entity center 4 to provide such credit card, or clearing facilities through the entities own financial organizations, or for example to offer a billing facility through a shown billing center 4BC, which can be a billing local branch or server, or a town, branch and server or city, country or global center. It can also be a local server established for handling the billing in a defined local neighborhood, zone, or the like authorized by the e-concierge/entity center.

Many of the grocery shopping for example may involve small purchases below, for example $10.- or € 10.- and many transaction of payments in small values, will be far more efficient and less costly, if the payments are consolidated and transacted once a day, a week, or monthly. Here too, it is necessary to create an agreement between the billing provider, the dwellers and the entity center, as to the terms and conditions for such billing services.

As stated above, the billing or any other payment facilities can be established by the entity center, or by any other financial organizations capable of financially manage and handle such undertaking, including the agreements with the dwellers.

Whatever the organization is, it must provide to the dwellers a clear and transparent status of the dweller's account, when the dweller is shopping and selecting the payment by the given financial services, and such status displays need to be programmed and updated into the management memory

Figure 14:
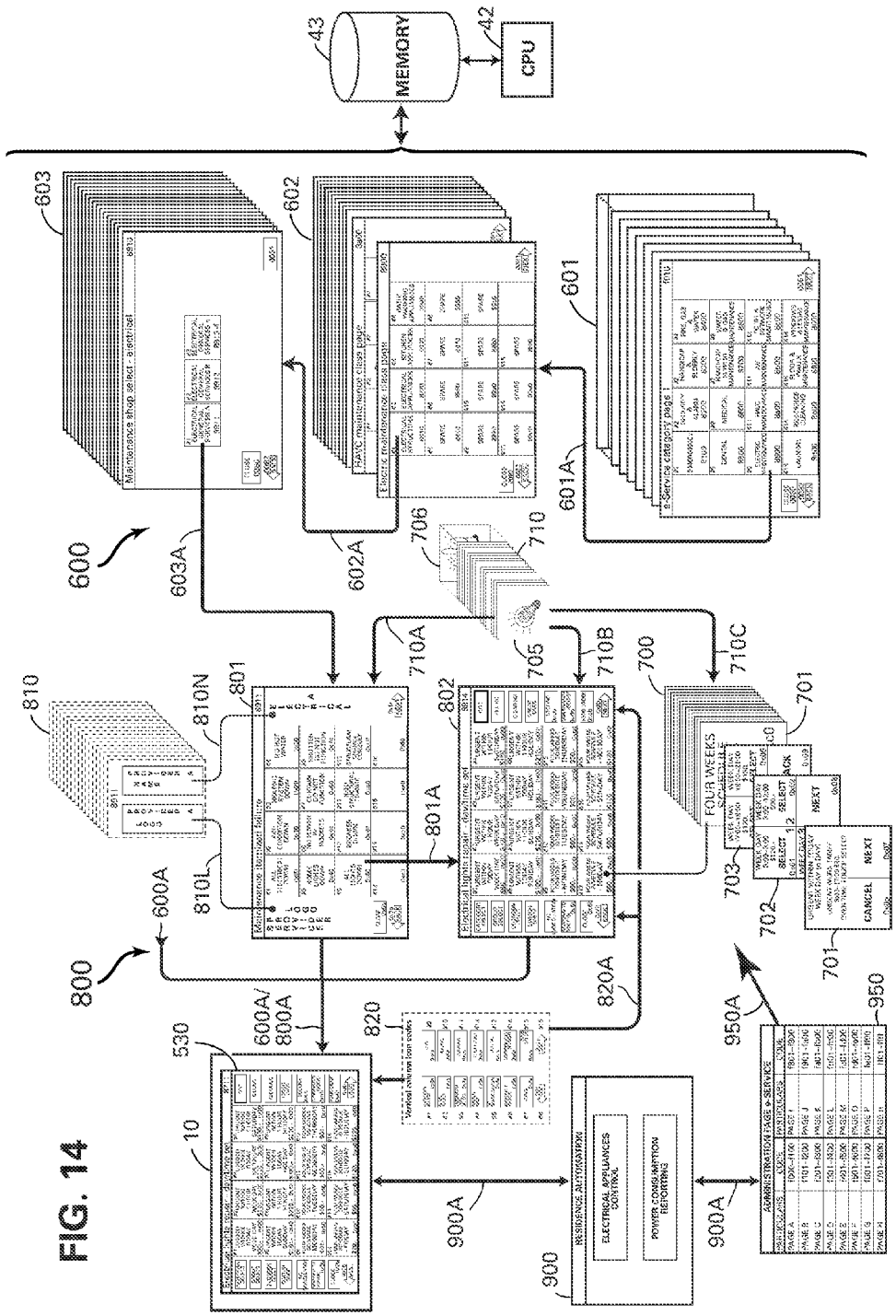
FIG. 14 is a block diagram showing the files of service data stored in the memory of the shopping circuit and the movements of data for the assembling of service display pages.

550 of FIGS. 13 and 950 of FIG. 14, such that the dweller will know before selecting the payment transaction for his cart selection, for example, your billing limit is $123.-, your credit card limit is $627.- and your clearing limit is $323.-.

Moreover, whenever the limit is reached the shopping/service programs will blank, or for example, will recolor the payment select icon to identify that the payment limit being reached. If all credit, billing and clearing limits are reached the only payment that remains will be COD. Any other selection will not be operative and the order will not be transacted without the touching of the COD icon.

It is similarly possible to have a given e-shopping or e-service provider to offer credit and billing to the dweller, this is for covering the shopping orders to the given provider. Such credit and billing facilities are included in the management program of the shopping terminal, but this requires prior agreement between a provider and the dweller.

Figure 15A:
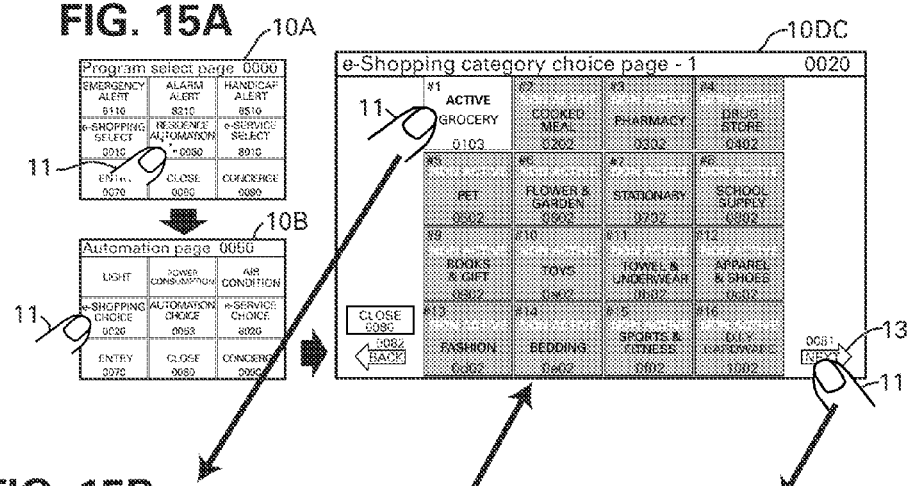
FIGS. 15A~15B show the recall of the shopping category and shops choice select pages of the preferred embodiment.

Another administrative program included in the shopping method and apparatus of the present invention enables the dweller the choosing of categories, shops and groups in a simplified process to activate or deactivate his choices. Shown in FIG. 15A is the recall of the Residence Automation page through the program select page 10A. The automation select page 10B coded 0050 provides two choice blocks one for e-shopping and one for e-service.

Figure 15B:
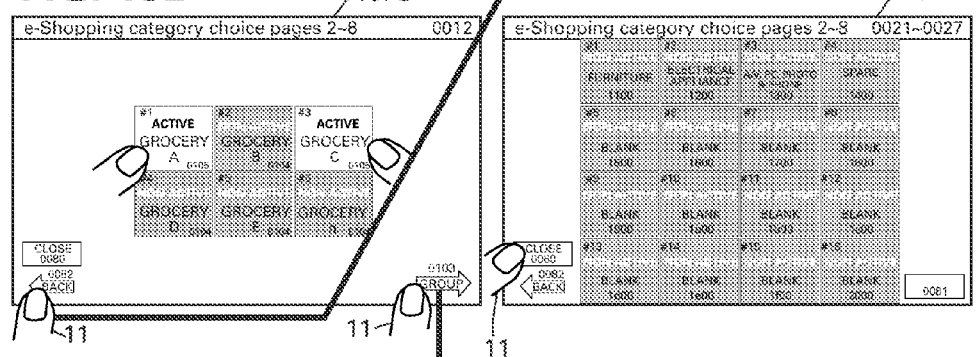

The initial touching of the e-shopping choice block recalls the e-shopping category choice page 1 similar to the page 10D of FIG. 2A but with all the provided categories for the dweller's building and with all the category blocks dimmed and embedded with a non-active token, shown as page 10DC of FIG. 15A. Touching the category icon of choice, brighten the block, change the token to active and recall the page shop of choices with up to six provided shops shown in FIG. 15B.

The choosing of a shop via the shop choice page is processed the same way as the choosing of the category, with each shop block is brightened and the token changes to active. At least one shop must be chosen. Touching the back icon after the selection is made will revert the display back to the category choice page and will end the first category select process.

Figure 15C:
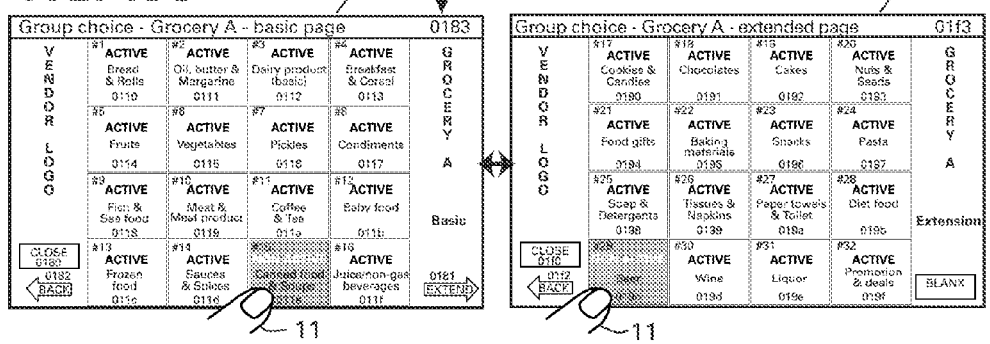
FIG. 15C shows the recall and choice of group select pages shown as grocery of the preferred embodiment.

The user can eliminate any number of groups of products, such for example as shown in FIG. 15C. With the shop page being displayed for choice selection the touching of the group icon shown as coded 0103 recalls the basic group choice page 106C with all the groups shown active and bright. Touching any of the groups block such as shown block 15 canned foods, will dim the block and introduce the embedded non active token. Same applies to the extended page recalled via the extend icon and shown with a finger touch to remove the block 13 beer from the grocery groups.

The shown basic and extended group choice selection in FIG. 15C are for grocery A, it is possible to program however for applying the choice selection for all of the grocery category groups, or to provide for individual selection of group choice to each individual shop by shuttling through each shop pages via the touching of the shop's logo or name, referred to above. Touching the close icon terminates the group choice select.

The processes continuous until all the categories of choice are selected. Touching the back or close icon of the first category page terminates the choices selection. If the dweller could not identify a shop of choice for a choice of a given category and he touches the back icon without choosing a shop, the given category of choice will be canceled, its block will be dimmed and the non-active token will be re-embedded.

However, each multi residences building has a basic or embedded program mandated for the building security and emergencies, and such embedded mandated programs designed for the whole building are not subject to an individual dweller choice and preferably be prevented from being set to non-active status.

It is commercially essential and advantageous for the dwellers to receive and view deals on pricing including promotions for selected products and/or services offered by the providers. Shown in the extended Group choice 10HC of FIG. 15C is the block #32 that is assigned to promotions and deals and is active. If the dweller is not interested in deals and promotions he can touch the block #32 and the Grocery A of FIG. 15A will be prevented from displaying onto the shopping terminal of the given residence from offering promotions and deals, which could also be an advertising display.

If the dweller wishes to further view such "specials" deals, or advertising he can selected the block #32 of a given group page and recall the product page such as shown in FIG. 5A, but instead of product the selected page and its extension will display a total of up to 32 blocks with "specials" "price bargains" "quantity discounts" and any other type of promotion or advertising by a shop be it Grocery or any other category. Advertising may include the offering of a test sample at free and other sales promotions.

The administration and control programs of the shopping terminal activity and performances are not the subject of the present invention. Some programs and data handling referred to above are for providing a better understanding of the conceptual structure of the present coding, memory files and processes to enable the updating of a vast large number of shopping circuits with a vast number of shops in every locality, zone, town, city, country and globally. Wherein the close circuit operated e-shopping system of each such local, town, city or country and/or globally with its management center and all the satellite centers link different vendors, different providers, different categories, different groups of products and different prices to different locations.

Operating a global e-shopping and services covering millions of residences, offices and other buildings will be a very large undertaking for the management, but for the individual dweller shopping for products and services via his shopping terminal it will be the most simple shopping processes, updated daily, hourly and instantly be it at low traffic hours (00:00~04:00) or during active traffic at very short intervals, particularly for shopping daily necessities such as grocery, pharmacy, office supply and similar.

The limiting of the categories and/or the shops to a practical shopping needs will transform the close circuit e-shopping to a successful undertaking, particularly for daily necessities, such as grocery that are unsuccessful with the prevailing e-shopping methods. Providing of course that the products, prices and services will meet the shoppers' expectations.

Figure 9A:
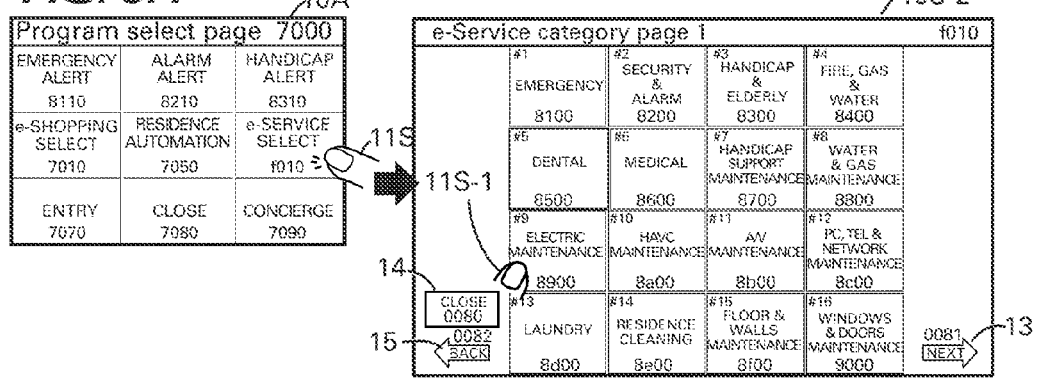
FIGS. 9A~9C show the recall of e-service categories and class select pages including the service provider select page shown to be a general electrical service shop.
Figure 9B:
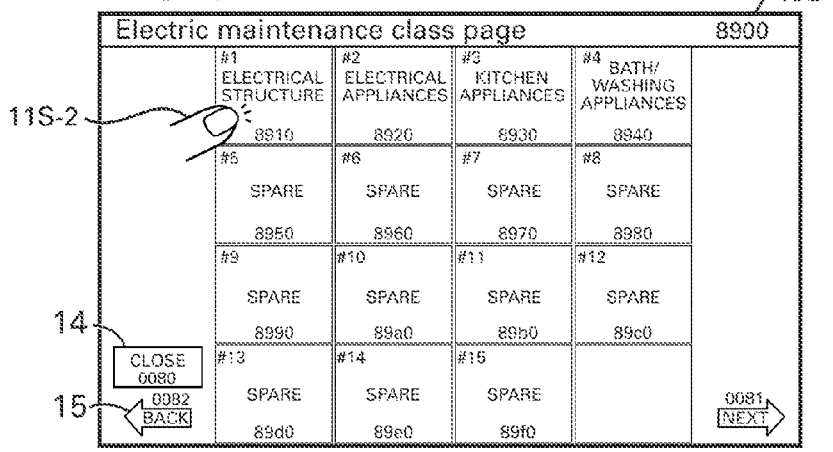
Figure 9C:
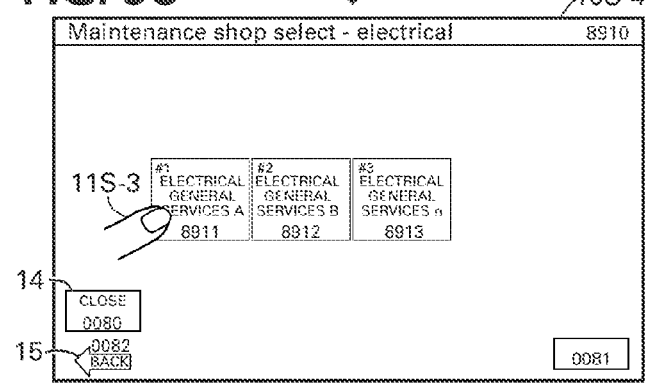

FIGS. 9A to 9C show the recall steps for e-service categories and groups that are similar to the steps shown in FIGS. 2A-2C and explained above.

FIG. 9A shows a touch 11S of the e-service icon of the program select page 10A for recalling the e-service category page 1 10S-2 followed by the finger touch 11S-1 for recalling the maintenance category/group page 10S-3 of FIG. 9B. The finger 11S-2 in FIG. 9B touches the electrical structure icon to recall the maintenance shop select-electrical 10S-4 of FIG. 9C. The numeral 8910 shown on the upper bar corner is the hexadecimal recall code for the service page of the category/group Maintenance shop select-electrical.

The e-service categories and groups, termed hereafter as class, shown in the table 104S-1 and 104S-2 of FIGS. 18A and 18B are differently structured from the e-shopping category and shops shown in table 104 of FIG. 17. Table 104 provide for 111 e-shopping categories, six different e-shops per category and 36 groups of products/items. In contrast, services are differently categorized and classed. Further, maintenance and repair services, for example, that are carried inside residences can be for commercial and cost reasons provided by local and not too distant service providers, this limits the selection of service providers per class.

The number of e-service providers is limited to hexadecimal 1~f or 15 providers per group. Accordingly, the 16 bit codes 8911, 8912 and 8913~f shown in the shop select page 10S-4 of FIG. 9C conclude the codes of tables 104S-1 and 104S-2 of FIGS. 15A and 15B that are the services combination link codes covering service categories, the service classes and the service providers or shops. From the above explanation it should be obvious that the selection step of the e-service shop or provider through the display 10S-4 of FIG. 9C completes the link code 104S shown in the eight Byte e-service command protocol 100S of FIG. 16C.

A total of n electrical service shops or providers are shown in FIG. 9C in blocks #1~#3, shop A, shop B and shop n for electrical structure services. The codes for the electrical maintenance shops or providers range from 8911~891f. The finger touch 11S-3 recalls the general electrical service A or an electrical structure service provider or the shop A in page 10S-5 shown in FIG. 10A. The details of the codes pertaining the electrical services and other services are shown in table 104S-E of FIG. 18E.

Page 10S-5 of FIG. 10A shows the itemized failure report for electrical structure to be communicated to the general electrical service provider A. The shown touch 11S4 of the all lights down block recalls the page 10S-6 coded 8914 for setting the day and the time for a repairman of shop A to come and repair all the lights in the residence.

In clear difference with the process for e-shopping product, the search, request or report for maintenance and repair services need to be communicated two way in order to set up an appointment and availability of both a repairman and a dweller. One way to create such semi-automated exchange, involving times and days when both, the user and the provider are available, is by providing the e-services processing steps a preprogrammed day and time schedule variations for selections.

Similar to other selections shown for the shopping for products it is preferable to have fixed positioned icons enabling the user to make his day/time selection choice for delivery in an habitual process. Same apply here for the scheduling of the serviceman visit time even though the scheduling of a visit require steps that are not needed for the selection and delivery of products. The time and day setting mandates a confirmation and/or a confirmation with a cancelation option or limits for a confirmed repair visit. This may blank an icon display and/or may call for a change in the icon content that require attentive observation of the displayed icons.

Similar reciprocal programming must be installed into the provider server to enable a programmed process, select and set the time and day for the serviceman visit without resorting to voice communication, thereby reducing the costs for handling service calls.

The 16 icons or blocks and the keys columns on the left and right sides of the 16 blocks of FIG. 10B are set to sizes and spaces identical with the displays of FIG. 6A and principally employ the same 8 bit codes for each block and the variations, but the program provides a modified setup and codes for the two key columns on the left and right of the display used for the e-services selection.

As explained above the number of key icons in the vertical columns depend also upon the size of the display screen, and the operate/select icons are pre-programmed for automatically adjusting the number of icons of the vertical columns on the basis of the display screen used for the video interphone monitor and/or the shopping terminal. This covers both the icon provided for the e-shopping, the e-service and the communication with visitors at the entry or in the elevator and/or with the guard or the e-concierge and similar.

There are limitations involving service request confirmations and cost calculation, wherein there is a need to setup a minimum time delay for confirmation, and time limits for cancelations of a confirmed visit, or after a service call order was sent and awaits a confirmation, particularly for urgent visit by a serviceman to the residence.

Touching any of the icons of FIG. 10A, such as the shown touch 11S4 of icon #9, recalls the display page 10S-6 of FIG. 10B, displaying the services for a given days and the minimum cost per hour for a regular working hours in blocks #9~#18 and the minimum urgent visit of blocks #1~#8, covering regular working hours 8:00~12:00 and 13:00~17:00 on Monday-Friday. The rate per hour is higher for within one hour, in comparison with the within today rate. Different rates are shown for Saturday, Sunday and holiday. Blocks #1~#8 are urgent for repair within today or within one hour because the lights, for example, are down and will not work.

The times, be it regular working hours or overtime or during weekends and holidays, for the repairman visit, involve cost and tariffs issues and are not discussed below as a preferred solution of the preferred embodiment of the present invention. The display page 10S-6 is an example of the need to provide time and day and/or a given date in a pre-assigned protocols set into a template for the use of such pre-assigned codes including variations and other codes of the preferred embodiment for organizing the time and a day of a visit, be it a repairman, a nurse or a cleaning maid.

The time setting or the scheduling via a programmed closed circuit e-services of the present invention is preferable. Many other designs or codes can be applied for timing the repairman or other serviceman visit, and the shown select pages and codes for such time and day are to enhance the simplicity of the e-service scheduling of the present invention.

The lowest prices per hour for the electrical service or repair work shown in blocks #1~#8 of FIG. 10B for urgent visits within one hour or within today's, for the selected day, are for example two times or 1.5 times multiple of the standard rate respectively. As an example, if the regular hours price per hour is $60.- the price per hour shown in block #1 for urgent electrical repair work within today's regular working hours, from 8:00 to 17:00, is a 1.5 multiple or $90.-. Block #1 is a request for an urgent repair for example, in the morning of a regular working day, Monday to Friday, and the repair can be carried at the afternoon.

Block #2 of page 10S-6 in FIG. 10B is for urgent repair within one hour, which is requested for repair of lights for example, early in the morning of a working day when the dweller has to go to work and he needs the repair early in the morning. The price per hour for urgent repair work within one hour is two times the regular scheduled weekday work price of $60.- and it is shown as $120.-/hr.

Block #3 shows a price of $120.- for urgent repair request within Saturday for which the price per regular hours (8:00~12:00 and 13:00~17:00) is two times the regular price of a regular working day or 2×$60.-.

Blocks #5 shows a price of $180.- per hour, which is three times the regular schedule price, for repair within the regular working hours of Sundays and holidays.

The prices shown in blocks #6 and #8 are similar with the base for the price calculation for repair within one hour at three and a half times the regular working hours within Sundays and holidays. The example of prices shown above is based on regular price during regular working hours. For extended work or overtime, prior to and after the regular working hours there is an overtime charge, also shown in the variation blocks and the table 22A~22E as O.T/hr.

Touching any of the blocks #1~#8 of FIG. 10B recalls the first variation page of three or more variations shown in FIGS. 10C~10L, which are similar to the variation pages in FIGS. 5C~5E explained above. The first enlarged page of FIG. 10C provides more details that cannot be shown in a small block of a small size display, such as 7", however if the display size is 10" or larger the enlarge block step is not necessary and is not activated and the touching of an urgent request for a repair in blocks #1~#8 will directly recall the block page shown in FIG. 10D. The block or page shown in FIG. 10C is the enlarged block #1 for urgent service or repair within today's regular working hours.

The variation page in FIG. 10D introduces the example of urgent service within today's working hours, however early morning hours price is charged as overtime and the price shown in quadrant 3 for early morning 6:00~8:00 to be $120.- or two times the regular hourly charge of $60.-. Quadrants 1 and 2 are provided for a preferred time selection, from 8:00~12:00 and from 13:00~17:00 for which the price is $90.- as referred to above.

The next token of FIG. 10D and the back touch token of FIG. 10E function as disclosed above for the shopping variations process shown in FIGS. 5D and 5E. Touching the next token recalls the block page of FIG. 10E with its three overtime variations 17:00~19:00 at $120.-, 19:00~21:00 at $150.- and 21:00~23:00 at $180.- per hour. As the request for repair in blocks #1~#8 is for today, be it within one hour or within today, there is no need to address a day for the service request and the variations are only for providing a time, the hourly charges involved based on the time of the day of request.

Blocks #9~#16 address the days and variations thereof for a scheduled maintenance or repair visit within the regular working hours 8:00~12:00 and 13:00~17:00 including overtime hours. Block #9 covers a non-specified day, but refers to a holiday within week 1, or the coming 7 days. The cost per hour during holiday and Sunday is two time the standard rate of $60.- or $120.- per hr. The overtime rate is $150.-/hr., to be charged if the repair was extended to O.T hours, such as between 17:00~19:00 or between 6:00~8:00.

If the time it takes to repair is over one hour the final charges will be calculated, charged and reported by the serviceman. When the payment is COD the serviceman will collect the fees as calculated. Otherwise the fees will be charged by the service provider and be paid via the selected payment method such as the credit card, billing or clearing.

The overtime prices shown in blocks #1~#16 of FIG. 10B and in the blocks of FIGS. 10C~10L are examples of the hourly overtime charges that are differently charged for late evening service per hour and higher for Saturday, and far higher for Sunday hour versus the standard rate. No given formulas or other basis are applied to the shown hourly charges in the present application, shown for explanation purpose only in €, $ or other values.

The codes and prices used for timing the services and the variations are listed in tables 105S, 105S1A, 105S1B, 105S2A and 105S2B of FIGS. 22A~22E. The codes are structured similar to the product select codes and their variations. However there are differences between the selection of products and the scheduling of services or for urgent services within today and service within a day of this week or the following weeks, mandating the use of different nature of command codes for each group of timing request and response/confirmation in return, shown in table 102B2 of FIG. 25B.

FIGS. 10E~10L are variation blocks showing the selecting process for the time of the selected day for services, with a time span of up to four weeks or 28 days, with the next day being the first day of the 28 days. The selection process is initiated by touching the day block of page 10S-6 of FIG. 10B, selected from #9 Monday, #10 is Tuesday, #11 is Wednesday, #12 is Thursday, #13 is Friday, #14 is Saturday and #15 is Sunday and #16 is Holiday. The selected day can be any day from the next day, or from tomorrow, or post 00:00 or 24:00 of today and termed to be a day of week 1. Touching a block of today's day can be further processed from the selected day of next week and up to week 4 via the variation blocks of FIGS. 10E~10L.

The first variation block 10F for week 1 shows the four quadrants for selecting three variants, the first for timing the repairman visit from 6:00~8:00, which is charged at an overtime rate of $90.- because the regular work starts at 8:00. The second variant is for 8:00~12:00 at a standard rate of $60.- per hr. and the third variant is for 13:00~17:00 at the same standard rate of $60.- per hr. The fourth quadrant is assigned with a token "extend week 1" for recalling the extended block of week 1 for an extended time selection, such as an overtime work after 17:00 shown in FIG. 10G.

The fourth quadrant of the variation block of FIG. 10G shows a token "next week 2" for the recall of the next extended variation shown in FIG. 10H, which is the same as FIG. 10F with the exception of the block being a variation block for week 2 and FIG. 10F is for week 1.

To set the repairman visit into a time zone of week 3, for the same selected day the dweller touches the extend token of the variation page 10J and the next week 3 token of week 2 extension (not shown) that is identical with block 10H except for the week number. If the intended visit is for the following week or week 4 the dweller simply touch the next icon of FIG. 10K, which is the extend week 3 variation block. For scheduling a visit in a time zone for the same selected day in week 4 the dweller touches a select token of a variation page of week 4 (not shown) similar to the variations of FIGS. 10F and 10H or via the extend variation page for week 4 of FIG. 10L. This completes the selection for a repairman visit, be it for repair or for a maintenance work in any of the service categories.

It is obvious that other service categories will have different time-day selections for services in the residence or for the resident to visit the service provider location, such as medical treatment and other personal services. Such timing or scheduling can be designed to fit every type of services, programmed into coded protocols to cover any such services timing, location, type and costs. If the 8 bit codes could not cover such scheduling, a 16 bit or 24 bit can be used instead.

As stated above, a shorter code is preferable, but if some services require an extensive scheduling the protocol for services and/or for shopping provides for as many bits and Bytes needed for a fixed preprogrammed protocols for all anticipated application within a close circuit e-shopping and e-services, that is the conceptual advantage of the present invention, be it increase protocol length or decreased.

For example, large building complexes all linked in a close circuit e-shopping and e-service limited to four or five shopping categories, 10 stores and some 10 service categories with some 20 service providers all embedded or local. For such closed circuit shopping services setup, it will be possible to reduce the shown protocols of FIGS. 16A and 16C to six or seven Bytes and provide a very efficient and effective e-commerce facility of the preferred embodiments.

The shown services select programs in FIGS. 9A~9C and 10A to 10L represent type of services for which the price is calculated on the basis of labor per hour and are supplemented by the cost of material and parts replacement as provided by the repairman. The above descriptions cover prices and settlement process for repair and maintenance services. For other type of services, for which tariffs are applied, for example an hair cut at a barber shop or the dry cleaning of two piece suit, three piece suit, the laundering of a shirt with or without a starch and similar services with variations of fixed prices and/or tariffs.

Such fixed tariff prices for services with variations select blocks, similar to the shopping variation blocks and codes shown in FIGS. 6A~6G including the scheduling blocks for service shown in FIGS. 10A~10H and 10J~10L, can be combined into solutions such as shown in FIGS. 10M~10N and 10P~10Q. The shown page 10S-7 of FIG. 10M is a select page for laundry services, offering standard services at fixed tariffs, for pickup and delivery shown as example, a pickup by 9:00 and a return in the next day by 17:00, or a pickup by 9:00 for a return on the same day by 17:00.

Many variations of pickup and delivery services and different tariffs for urgent and same day service can be programmed for selection. The variation blocks shown in FIGS. 10N and 10P-10Q are an example of wash and dry laundry for three sizes and a variation select for 3 kg, 4.5 kg and 6 kg to be delivered folded in box, non-folded in a bag and hanged on hangers (supplied by the laundry).

The page 10S-7 and its variation blocks are templated to provide the user with comparison shopping for services via a single or several touches of icons for switching over through several laundry providers, similar to the groceries explained above. However, the shown page 10S-7 is not an introduction of a preferred shopping embodiment, it is shown to illustrate the preferred shopping for products and services concept, in which template and pre-configured products, items and services, presented with short descriptions and a budgeted pixel/size images, Bytes or bits, to provide many variations, tailored by retail and service professionals of many given categories, to the need and the desire of the dwellers in their different localities.

The example of the laundry in FIG. 10M could be a laundry delivery depot in a large residential building or a residential complex or a franchise for a large scale laundry operating from his apartment to pick-up and deliver laundry most efficiently and cheaply. The laundry can operate large trucks to pick-up and deliver from and to the delivery depot and/or the franchise, located in the many large buildings and neighborhoods most effectively and at low cost.

Such services and variations of many types to fit the needs of dwellers will be programmed for the many countries, cities, towns and localities, by professional service providers and shops for products, each trying to excel and compete, such that the ever changing environments, prices, taste, desire liking and other needs and wants can be fulfilled to excel and transform the close circuit e-shopping and e-services to way of life.

FIG. 14 similar to FIG. 13 shows the services data stored in the memory 43 that is fed through and by the memory buffer 45 to the CPU 42 and to the display 10. FIG. 14 provides in more details how the service data is stored and how the different service pages are assembled into the display screen 10.

The pages 601 of file 600 of the preferred embodiment comprising of seven service category pages linking each page with up to 16 service categories, each for up to 14 service classes shown in class select pages of pages 602 or for a total of 1,568 classes. The preferred embodiment limits the number of service providers per class to six for a total of 9,408 service providers or service shops, to be selected and linked via a maximum of 1,568 selection pages or files 603. Each of the classes is serviced by a maximum of six providers or shops in each page of file 603. The shop codes are listed in tables 104S of FIGS. 18A, 18B and 18C, however such large number of service providers is non-practical for what are essentially local services. For this reason, the preferred embodiment of FIG. 9C further limits the shops to a practical limit of three, as shown in the example of the general services for electrical maintenance category.

The shop select page for each class, for example electrical structure, listed in FIG. 18A coded 8910 covers two ranges of three codes 8911~3 and 8919~b. Therefore, it make it possible to assign 6 shops or service providers for each listed class via a shop select page in file 603. Even though as referred to above, the preferred embodiment provides for up to six service providers per class, the practical limit of the preferred embodiment is three providers only, coded 8911~3 as shown in FIG. 9C.

Each shop in file 603 is assigned with a failure report page or an itemized service request shown as page 801 of file 800 per each listed class in a page of the file page 602 and is shown as the coded 8911 page 10S-5 of FIG. 10A. The selecting of an identifying failure block recalls via the action line 801A the repair day/time set page, shown as the coded 8914 page 10S-6 of FIG. 10B. The preferred embodiment assigns the day/time set pages also termed as schedule pages 10S-6 with codes 8914~6 and 891c~e to correspond with the shops and pages 10S-5 codes 8911~3 and 8919-b respectively as shown in FIG. 18E.

As explained above the three or six shop select blocks of the shop select page 10S-4 of file 603 shown in FIG. 9C form the base for identifying the shop and the class within the category. This relaxes the need to maintaining of the file pages 601~603 in a strict template form. The number of pages and the blocks of the pages can be randomly assembled into the pages of 600~603 files.

The service category pages are shown in pages 10S and 10S-1 of FIGS. 1B and 1C and the shop select page 10S-4 is shown as electrical general service in FIG. 9C. Each shop, shown for example, such as a general electrical A in page 10S-4 of FIG. 9C, provides up to 16 selection blocks of electrical failures through the itemized maintenance item also termed and shown as structural failure report page 10S-5 of FIG. 10A. The process discussed above, teaches the selection process through the display pages and is not repeated here, because the purpose of FIG. 14 being explained is to show how simple is to assemble, display, select, process, load, update and/or change data pertaining to services of the preferred embodiment of the present invention.

Similarly to the shopping memory files, each touch of a service block or an icon of any of the displayed pages is instantly acted upon, such as the touch of the block all lights down in file 801 recalls the light repair-day/time set page or the schedule page of file 802 instantly. The minimal data stored in each block of the category, the class and the shop select pages can be added with an illustration to make it pleasing and easy to view and select. This can be implemented by displaying simplified icons, similar to a PC or mobile icons that occupy 1 KB of data or less and the shop select icon can be installed with the shop logo or mark. The initial loading of the programs can be very fast, measured in a fraction of a second, or a second at most when the loading is complex.

The seven category select pages of file 601, the class select file 602 and the up to 1,568 shop select pages of file 603 are not included in the mandated template design or structured pages. They are assembled into pages to comply with the dweller or the user selection, priorities and desire. If the dweller selects only 16 categories there will be only one category select page active in file 601 for the given dweller. If the dweller selects less than 16 categories, some of the category blocks of the single select page will be blank. This enables to remove for example, the top row first, the bottom row next and/or the removal of blocks to the left and the right, such that the remaining active selection blocks are in the screen center.

If the dweller selects for example more than 32 categories the dweller will make his preference or priorities, which are the most important for him and which will be most active for him, and place those categories select icons or blocks in page one. Followed in page 2 and in the following page or pages, positioning the remaining blocks in accordance with his preference.

It is similarly possible to provide a program calculated to identify the most used or activated categories by the dweller and shift the categories select icons from page to page after some interval, such as three months. It is of course necessary to introduce a message box or a dialog box reporting the program study and conclusion for the user to agree and confirm the shifting of blocks, such as by touching an icon in the box, or deny the shifting of the categories blocks.

Similar layout and/or blocks or icons design apply to the class and shop select pages of files 602 and 603. A maximum of three or six shops or service providers select icons or blocks are the preferred embodiment and the blocks can be designed and displayed in the same size and shapes as the template 16 blocks of all other pages, or they can be designed as vertically or horizontally long rectangular icons, equal to the number of shops provided.

The program for the shop selection icons, including the shop logos are only updated when the dweller or the e-service management eliminates or adds service shops or providers to the given class and are not subject to the repeated updating cycles of products. For providing options, the program can be pre-designed with different shop select blocks or icons to enable the user to set and select one of the pre-designed icons to his desire and convenience.

When only one service category is selected or provided, the category select pages of file 601 are not used and when one only shop is pre-select for a given category, or one only shop is provided for a given category the shop select page of the given category is not used. If only one category, only one class and only one shop is provided for the entire e-service program, the itemized service select page of file 801 will be recalled directly via the initial program select page 10A shown in FIG. 1A and if multi shops are provided and are the choice for one single service category and class selected, or is the only service category and class provided, the initial program select page will recall the shop select page of file 603 directly bypassing the category and the class selects page of files 601~602.

Shown in FIG. 14 are an action line 601A initiated by a touch of a block in the category select page that recalls the class select page and action line 602A that follows by a touch of a block in the class select page recalls the shop select page of file 603.

A touch of the general services-electric shop A icon in file 603 instantly recalls via the action line 603A the itemized maintenance or the failure report page of file 801 which is a template file page comprising up to 16 blocks, each representing a failure such as shown in page 10S-5 of FIG. 10A. The repair-day/time set page 10S-6 shown in file 802 and in page 10S-6 of FIG. 10B is recalled via the next icon coded 0xfa, or via a touch of a failure reporting icon shown by the action line 801A. The touching of the Back icon of file 802, coded 0x7b is not shown by an arrowed action line but will revert to the itemized page of file 801.

The recalling of pages via the operating icons shown in the vertical columns are the preferred embodiment for the present invention. The basic concept of which is not to distract the dweller from his select actions by exiting a service select page, be it a class select or an itemized failure select, into a page that may be an interim page for the purpose of surfing between files or for selecting other page. Such change in page content disrupts and distracts the service select process.

The preferred embodiment enables the user to remain in a page that provides for the selection of services, the time of the service and the payment without disrupting the intended process. The final itemized failure and time/date selections achieved when the blocks, be it for reporting a specific failure and the scheduling including the timing variation select for the repair are all processed via a fixed position blocks and the shuttling between the pages are processed via the operating icons that are identically positioned in the pages, namely the pages of files 801~802.

The file 610 contains the names (Electrical A) of the service providers or shops and each of the shop's logo, for introduction into the itemized failure select page of files 801, shown in FIGS. 10A and 10B as Electrical A and service provider. The name of the shop and its logo are linked to the codes 8911~8913 or 891c~891e in table 104S-E of FIG. 18C that are shown to be the codes assigned to the failure reporting page codes, which is assembled for display with its same name and logo via action lines shown as 810N and 810L respectively.

It is preferable to provide for shuttling between shops without exiting the schedule pages with the shown service prices per hour of file 802, which is essential for prices comparison, as an example.

The itemized failure pages include next, back and close icons only and the back icon of the itemized page can only revert the display to the shop select page of file 603, in reverse to the shown action line 603A. This disrupts the intent to shuttle between the shops, disrupting the process and counters the intent to minimize searches, and/or prevent any back and forth searches via "another" search menu.

For enabling the direct shuttling through other shops pages for comparing prices the program provides the "switch shop" icon in the vertical column referred to above, for the recalling in repeated succession the schedule pages 10S-6 of other shops in the same class by repeat touching of the switch shop icon, shown in FIG. 10B.

This enable the user to review all the other shop pages, through the same scheduling or day/time set pages that provide prices and scheduling for the same services.

The time/day set or the scheduling page 802 and the selection page for setting and ordering a service and its variations are shown in FIGS. 10A~10H, 10J~10L and FIGS.

10M~10N and 10P~10Q. FIGS. 22A~22E show the tables listing the 8 bit Hexadecimal codes for day/time selection. The codes for the time and day and the variation blocks are similar to the codes for products and variation blocks used for e-shopping referred to above.

The entire 8 bit codes covering the 16 time and date blocks including the variations codes are shown in FIGS. 10B~10E and in tables 105S, 105S1A-B and 105S2A-B of FIG. 22A~22E, including the codes for the operate/select icons of the two vertical columns. The icon codes are shown in file 820 of FIG. 14 and are installed into the scheduling or the time/date set pages 802 via the action line 820A of FIG. 14.

The images stored in the file 710 of FIG. 14 are for introduction of images into select pages, blocks and into block variations, for illustrating services such as the light bulb shown in file 705 or the chandelier in file 706 into the electrical repair service for lights, are in effect stored in a file identical with the file 310 of FIG. 13 referred to above for shopping and shown as fruit images 305 and 306. The product file 310 is expected to include many pictures of products and the file will be larger in size and capacity from the file 710 that is expected to store illustrative drawing and rendering of services that occupy limited capacity, even though by way of example, barber services may use a haircut pictures for appealing to the users.

For such reasons, it is preferred to provide service images in file 710 that is similar or identical or in common with the file 310 of the e-shopping, and differentiated by the images codes and the files codes, that are within the service categories, classes and shops.

The shown service administration files and pages 950 and the shopping administration files and pages 550 of FIGS. 13, 14, 18C and 18D are the files assigned with codes for direct linking to pages, blocks, icons, images and other stored data, to enable the use of a unified string of coded commands to download, upgrade, add or remove item, products and programs stored in the memory files for operate, display and communications. Many other free codes are applied for given links between files, text, images and pages are provided, such as link pages 8901~890f and 8917~8918, 8927~8928 that are repeated in every class and shown in table 104S-E, for providing ample setups of data transactions within the shopping circuit, its memory and the display.

The coded administration files in FIGS. 18C and 18D are all 16 bit or two Bytes code that can replace the codes 104 and 104S for creating a direct link to items, products, images, logos and pages of the 8 bit coded files that are identified via the preceding two Byte code 104 or 104S. By introducing a direct link pages and table for the download, updates, add or remove, the 8 bit codes need not to be addressed via the multi steps, namely the category, group or class and a shop, and particularly not when an extended pages such as shown page 10H of FIG. 3C are linked via 8 bit basic page. They can be directly link via a programmed administration pages. Offering instant and efficient access through the administration and control of the close circuit shopping terminal.

The administration codes are also used for addressing displays such as the program select page 10A of FIG. 1A coded 7000, which is the opening code in table 18C. The codes for the next 0081, back 0082 and close 0080 icons of the vertical column codes are set by the administration coded file 0000~00ff that is not shown in FIGS. 18C and 18D.

The detailed administration coded files, and assignments are not shown in FIGS. 13 and 14 as they are programmed into the operating system and setup of the shopping terminal and its CPU. However even though not shown, the administration pages 7000~7fff and f000~ffff and other assigned coded pages can be updated and modified through the same route via the CPU 42 and the memory 43.

The file 900 shown in FIG. 14 is the home automation file, included here for its reporting function of electrical power consumption and the ensuing communication for controlling the residence electrical appliances and the power they consume. The home automation coding and control including the power consumption reporting is disclosed in the U.S. Pat. No. 8,170,722 and is incorporated herein by reference.

The file 900 is controlled by the administration file and the home automation program. The functions for the file 900 are to display the power consumption and provide the icons or the links to control the electrical appliances via the display 10 touch screen. The other function is to store power consumption data in the memory 43 for statistical purposes, reporting to a smart grid, an itemized power consumption at real time and statistical reporting such as hourly, daily, weekly, monthly, yearly and other random reporting, pertaining the overall and/or itemized consumed power through to the combined interface and server 55 of FIG. 11B.

The needed basic data for identifying the products, their variations, the delivery time and method, the payment, the reporting of power consumption, the services including their variations, the service timing, the payment and combinations thereof as explained above, need to be created, loaded into the memories 43, 53 and 63 of FIGS. 11B and 11C and upgraded-updated at all times, regularly and at random.

The shopping terminals of the present invention operate via remote control unit 12 of FIG. 1A referred to above, also disclosed in U.S. Pat. Nos. 8,117,076 and 8,170,722 incorporated herein by reference. Optical signals for remote control such as IR in air and/or visual light signals via lightguide, known as POF or plastic optical fiber, are propagated at a low speed or rate.

There are differences between the optical IR signal in air and the visual light signals via lightguide, wherein the IR remote control signal is a modulated carrier of a 30 KHz to 100 KHz clock, with the majority of remote control units operate on 38 KHz carrier frequency. The visual light transceiver can be operated and respond to a modulated IR signal or to a modulated visual light signals, but the lightguide enables the simplifying of the light signaling by a simple on-off (timed) light pulses, with no carrier. RF and wired electrical remote control signals are fast.

Regardless of the different signals structure, speed, bandwidth and other differences, the present invention provides a simplified coding to process and propagate the control signals for shopping via the shopping terminals be it IR, RF, bus line signals, visual light signals via lightguides and finger or hand activated icons and blocks, be it by hand or finger movement or by direct touch of the display screen.

The preferred embodiment of the present invention further simplifies the codes by limiting the operating and reply codes to the minimum bit count and by providing single touch commands and/or limiting of the remote control to a single non-repeat keying. This is achieved by providing the remote control unit with 32 select keys, 16 block keys and 16 vertical column keys, and operates the display as if it is touched by finger.

The use of a remote control unit in front of a large screen television incorporating shopping circuit for shopping is simple. Because the shopping is summed up into templates to cover summed up products and services in a clear confinement within the closed circuit mandated structure, for which the limiting of the commands to a given pre-defined protocols is the answer.

Figure 16C:
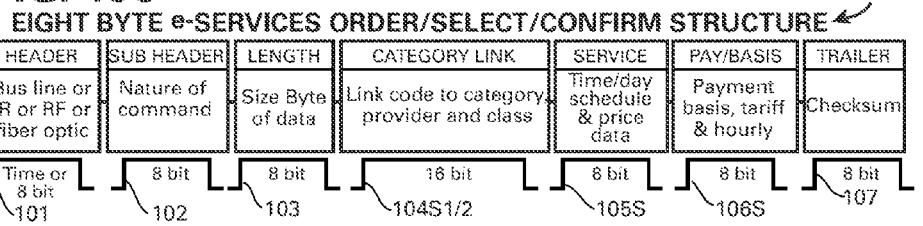
FIGS. 16C and 16D illustrate the 8 Byte blocks of the e-services protocols and the three Byte link for identifying the service itemized block for loading and updating the memory files of the preferred embodiment of the present invention.
Figure 16D:
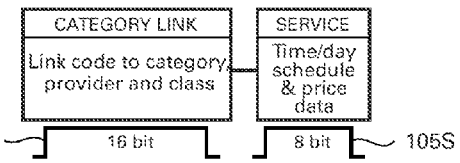
Figure 16E:
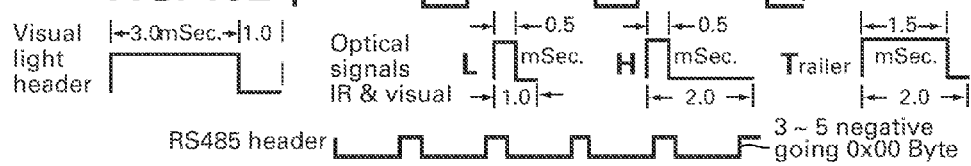
FIG. 16E is signal patterns, polarities, timing, ratios, and count as applied to the header block signal 101 and 101S of FIGS. 16A and 16C.
Figure 16F:
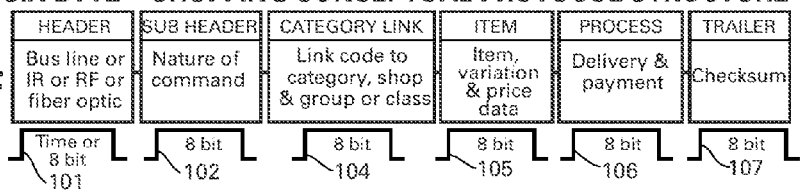
FIG. 16F illustrates the conceptual basic six Byte blocks of protocol structure of the preferred embodiment of the present invention.

The concept of the preferred embodiment protocol structure 100F illustrated in FIG. 16F is composed of six code blocks or Bytes, namely the header 101, the sub-header 102, the category link 104, the item 105, the process 106 and the trailer 107 that concludes the protocol. The details of each Byte or Bytes and their code functions are explained below.

Shown in FIG. 16A is the basic 8 Bytes 101~107 of the command/reply structure 100 or protocol of the preferred embodiment of the present invention. As explained above, even though the shown structure is based on limiting the number of bits and Bytes, the preferred embodiment program provides for any number of bits and Bytes to cover any and all circumstances including large scale loading of programs, the use of CAD program with substantially increased number of icons, such as shown in FIG. 12 of the U.S. Pat. No. 8,117,076 for apparel measuring, selections, fitting and more.

Regardless, the I-D codes shown in FIGS. 16B~16D that identify each individual product and service can be expanded for example to 32 bits or four Bytes for identifying billions of products and services, which could be used for covering globally distributed product and services. Further, the present command structure, including the 8 bit code 102 termed sub-header or the nature of command and the 8 bit code 103 termed length, specifying the number of Bytes of the whole command shown in FIG. 16A or 16C, to provide as explained below, for using different Byte count, including randomly assembled or rotating/revolving Byte and bit count.

The advantages of the short command structures, based on a limited practical need as explained above, are many, and the expanding of the code or the protocol structure is not the preferred solution, yet for certain applications the use of the sub-header or the nature of command 8 bit codes 102 to expand the I-D code, that is shown as a combined code, by combining the link code 103 with the product or service code 104 to four Bytes.

Shown in table 102 of FIG. 23C is the use of a sub-header code 102 to increase or expand the I.D code by one Byte. Even though the basic intent for the use of length code 103 is for propagating multi products orders and for the downloading, loading, updating, upgrading and other large data propagation to and from the memories 43, 53 and 63 of FIGS. 11B and 11C. The length code can be eliminated for reducing or used for enlarging any of the eight Bytes of the protocol itself, for example to 7 Byte or 9 Byte respectively. For basic single product or single service order, in a small closed circuit environment the category link code can be the shown single Byte 104 in FIG. 16F and the entire protocol to six Byte protocol only.

It is important to identify the category and the location of any product provider because the location directly relates to the delivery time. The locations of service providers however are assumed to be local or within a city boundary. The simplified code structure will become clearer from the explanation in the following pages, including the use of a link code.

Termed link code hereafter, the link code was disclosed in U.S. Pat. No. 8,170,722 as a pre-defined code for linking home automation controllers with appliances and electrical wiring devices. The present invention uses the term link code for a pre-defined code for linking the dweller's shopping circuit with the defined provider, be it e-shopping provider or e-service provider, via the building's internal communication lines 65, an interface 51 or 53 and a server 50 shown in FIGS. 11A and 11B.

Further, the link code of the preferred embodiment is propagated two ways, applying identical link code to the reply response, including the linking for the loading of programs, products and services and updating. The link code is one of a basic element to ensure an accurate, error free linked updated services and products and an accurately linked response to a given shopping command, such as a return confirmation using the same link code that is explained below.

FIG. 16A shows the two Byte or 16 bits link codes 104 of the preferred embodiment, combining the category, the shop and the group listed in tables 104 of FIG. 17 and of FIG. 19. The link code includes the product group listed in the table 104 of FIG. 19 that completes the category and shop 16 bit link code of FIG. 17 for each of the two way propagations. The preferred embodiment of the present invention uses no destination address, such as addressing each shop with an IP address. The transmitting and the receiving circuits of the shopping terminal are not programmed to exchange addresses for verification, such as mandated for IP network communications.

The propagated two way command including the link code in a onetime command to the interface 51 and from the interface to the server 50 of FIGS. 11A~11C, in which the IR signals, the visual light signals via POF or lightguide, the electrical signals via the bus line and the RF wireless signals are propagated to the interface 51 for interfacing the signals for communicating with the server one way, and provide a response, using the same link code to confirm the execution of the command in return.

The header 101 of the preferred embodiment provide for detecting the start of the command 100 and the identification of the propagated RS422 or RS485 signals via the bus line, the IR signals in air, the visual light signals via the lightguides and the RF signals, with all, or any combinations of, can be transmitted simultaneously.

The RF signal need an address code, this is to block stray RF commands from reaching and operating the shopping terminal of neighboring apartments or houses by error and to prevent the receiving and acting upon stray RF signal propagated in other apartments or units. The wired bus line, the IR (in line of sight) and the visual light signals via the POF or lightguide propagations are confined to the apartment or the house and cannot be extended beyond the premises of the individual enclosed shopping terminal.

The header 101 of the preferred embodiment shown in FIG. 16A generates a single 3 mSec. long visual light pulse (via the lightguide), or three sequential IR pulses, each with 3.0 mSec. time duration and with 1.0 mSec. interval, or five negative going RS485 pulses, each having a length equivalent to one byte time duration, using 9,600 Baud or faster. The modulated RF signal using ASK or other modulation is provided with a start pulse and a n digit code assigned to each apartment, a house, a hotel room, an office, a shop or simply a single shopping terminal in a building.

Shown in FIG. 16E are the header signals of the preferred embodiment, three of which, the IR, the visual light and the bus line wired electrical contain no code, only repeated pulses or a single pulse for enabling varying time delays for the receiving of the command, for providing a precise start time at the end of the header 101 to process the sub-header code 102 followed by the length code 103, the link code 104/104S, the product or service code 105/105S and the deliver/pay or the pay basis code 106/106S and closing the command with the checksum trailer 107 of FIGS. 16A and 16C.

The sub-header or the nature of command code 102 introduces into the protocols 100 and 100S a character that defines the function of the protocol, enabling the protocol to command different functions, while using an identical I.D code, comprising identical link code 104 and product or service codes 105/105S. The differences are in the functions, or in the nature of the command that are expressed in the tables 102A~102C of FIGS. 25A~25C. The first sub-header code of the nature or command code shown in table 102A of in FIG. 25A is 0x01 for ordering a single product from a single shop, the sub-header of the returned response 0x51 is sent after the delivery is made, closing the pending order status.

The next two sub-header codes shown are 0x02 for order covering multi products from a single shop and 0x03 for order covering multi products from multi shops. The shown responses in this example are 0x52~0x53 and in the example of the 0x52 response it is shown as "delivered 0x02". The 0x02 shown in the response line 0x52 in table 102A1 is to indicate that the response protocol, excluding the sub-header code, is identical with the protocol of the order sent with sub-header 0x02, excluding the sub-header 0x52 being the only change in the response protocol, and that the nature of the response is to inform that the ordered items were delivered as ordered. The delivered product(s) can be identified by the I.D code(s) in both protocols, the order generated with the sub-header 0x02 and the response with the sub-header 0x05.

The following groups of sub-header codes 0x04~0x06 are for orders with confirmation requests. As referred to in FIGS. 7A~7C above, to send an order with confirmation request is possible only if the order is to be delivered, for example in 2~6 hours, but for shorter delivery times, such as 15~30 minutes, the confirmation request icon will be dimmed or blank and will not respond to a touch. Accordingly the sub-header codes 0x04~0x06 are for orders with deliveries ranging, for example, from 2 hours and longer.

The responding sub-header codes 0x54~0x56 are shown in table 102A1 as confirming 0x04~0x06, identifying that the received order protocols send with sub-header codes 0x04~0x06 (order with confirmation request) are hereby confirmed by returning the identical protocol, with only one change, the acknowledging codes of the sub-header or the nature of command 0x54~0x56. The confirmation is an interim protocol sent from the shop prior to the delivery and to complete the transaction the shop will follow with an identical protocol, with a revised sub-header shown in table 102A2 as 0xa4~0xa6 codes, that their nature of command is, a delivery complete or executed in compliance with a confirmed order shown as 0x04~0x06.

As explained above in reference to the remote control 12 of FIG. 1A, the shopping terminal of the preferred embodiment includes a wireless remote control receiver be it IR or RF. The shopping terminal can also be connected to a remote touch screen controller via well known low voltage bus line and/or optical cable for the scheduling of services and for ordering services or products remotely, in similar processes described above.

The remote control receiver such as RF receiver, known also as Wi-Fi is important to complete a delivery or execution of an order. This is by providing the delivery man a hand held unit (not shown) that includes a display, displaying the order being delivered and the dweller simply collect the delivered merchandize, enter a password provided by, or setup through, the e-shopping center or entity, followed by a touch of a key such as "confirm receipt" or "properly executed" and the hand held unit will transmit an RF wireless confirmation directly to the shopping terminal inside the residence. This will generate an order executed protocol, with the nature of command code being the codes, such as 0xa3, 0xa4 and 0xa5 in FIG. 25A and described above, to be the only change in the protocol of the original completed order, being just now delivered.

For locker deliveries of completed orders the execution confirmation will be generated automatically as delivery is made into the locker. Such deliveries will be reconfirmed by the dweller when he picks the delivery from the locker. The delivery to lockers is extensively described in the U.S. Pat. No. 7,945,032 referred to above and incorporated herein by reference.

The shown declined order sub-header code 0x07~0x0d are detailed in FIG. 7E above, reporting a declined order for enabling the shop and the close-circuit e-shopping management to better understand the dweller dissatisfaction. Since no order is send the response shown is a simple acknowledgement, preferably with thanks, for the intent to order and the report sent.

The shown sub-header codes 0xa7~0xad replace the sub-header of the order decline protocols (0x57~0x5d) for acknowledging of the otherwise identical protocol with the declined order.

Even though not disclosed or shown above, a cancelation of a send order, with a confirmation request or without confirmation request, must be provided. Such processing is very simple, for example touching the in-cart icon after the order was sent to recall the pending order display. The touching of the decline icon to cancel may be acknowledged, but such cancelation involves commercial and practical issues. For example, was the order made to a single shop or to multi shops. Another issue is the status of the delivery.

If the order is, for example, to be delivered the next day or in the following days or weeks and the e-shopping center 4EC provide for the cancelation of orders prior to, for example, at least 2 hours before delivery is due, decline icon will respond and the cancelation will be executed and the canceled order protocol will be send.

If the order is send to multi shops with varying delivery dates, the cancelation will be send only if, as per the e-shopping center 4EC rules, for example, the first delivery is due prior to or at least 2 hours. In situations where the order cannot be cancelled, a message or dialog box will direct the shopper to a return procedure of a delivered order, in accordance with the return management policy, which is not the subject of the preferred embodiment. It is recited here for explanation of another use of the nature of command or the sub-header code 102.

As there are different centers or managements for different activities or field of management such as services or shopping or financing or banking or communication and/or security the present application refers to the e-concierge/entity center 4 shown in FIGS. 11A and 12 to be the center and management of the entire closed circuit e-commerce described herein. Therefore whenever the term management is recited the e-concierge/entity center 4 is referred to.

The term entity is referred to hereafter and in the claims to be the entire closed circuit e-shopping conglomerate or domain or holding company, or trust or syndicate and other similar large or small or any other group size undertaking.

The term entity management or entity center hereafter and in the claims refers to the upper management and control of the entity.

The nature of command or the sub-header code is used also for the protocols shown in FIGS. 16C and 16D applied to a scheduling of a maintenance service for a repairman visit to the residence. The same protocols structure are used to order services and time for medical services appointment, such as dental or medical in a clinic or scheduling a visit to the residence by a doctor or a nurse. Services involve many different nature of appointments and time set and cover a whole range of social needs, elder care, bed ridden old or sick people, mandating a long range of nature of commands for many such service scenarios and if the 8 bit allotted to the sub-header codes will not cover the whole range of the nature of commands, the 8 bit can be expanded to 16 bits or two Bytes.

The shown sub-header codes refer to the example of the embodiments shown in FIGS. 9A~10Q explained above to be the scheduling of an electrical repairman to visit a residence and for a pickup and return by a laundry shop or a depot. Shown in tables 102B~102B2 of FIG. 25B are three scheduling requests, using three sub-header codes. 0x21 is used for urgent maintenance or repair visit within 1 hour or within today, listed in table 1055 of FIG. 22A. The 8 bit codes of which must be differentiated from 8 bit codes of the 1 week~4 week schedule shown in tables 105S1A~105S2B of FIGS. 22B~22E.

Hence, the sub-header or the nature of command code provide the needed differentiation for identifying urgent repair request and the scheduling of a visit within one hour or within today from the scheduling within 1~2 weeks or 3~4 weeks. Further, as the 8 bit codes of the week 1~2 in tables 105S1A/1B of FIGS. 22B/C are identical with the 8 bit codes of the week 3-4 in tables 105S2A/2B of FIGS. 22D/E, the two different scheduling using identical codes must be differentiated. Accordingly the three sub-headers or the three nature of command codes 0x21, 0x22 and 0x33 listed in table 102S, differentiate the scheduling for the urgent repair service within 1 hour, or within today, and for the maintenance/repair service within week 1 or week 2 and for the maintenance/repair service within week 3 or week 4.

The next sub-header codes for services are for scheduling the pickup of a dirty laundry items for a machine wash. Shown in FIG. 10M to be an urgent wash/dry by machine with the particular of which are selected via one of the variation blocks in FIGS. 10N and 10P~10Q. The shown costs are tariff based costs per weight, and includes the way the cleaned items are packaged, such as in a bag, boxed or on hanger. The select codes including the variations are listed in table 105S3, which is similar to the tables shown in FIGS. 22A~22E, but does not show prices per hour, or similar, because the prices or tariffs are included in the variations blocks of FIGS. 10N and 10P~10Q, similar to the shopping variation shown in FIGS. 5C~5E.

The table 106S of FIG. 23B however is different from the code 106 of the e-shopping. The code of FIG. 16A comprises a combination code for identifying the delivery time or method and the payment method. Laundry pickup and return services, the repairman visit to the residence, or setting up a schedule or appointment for other services are in a way similar to the delivery selection and setting. For the e-services of the preferred embodiment, the scheduling, the pickup and return and other appointments are already set via the variation blocks and there is no need to use the code 106S for deliveries.

Instead the code 106S applies to the payment method, which covers tariff based prices and hourly based prices and include material cost. Such charges that are tied to the length of work and materials used must show how the charges are made. For this reason the codes 106S listed in table of FIG. 23B identify how the charges were derived and the basis for the charges. Portion of the 106S codes are derived by the hourly prices the other tariff based are selected via the variation pages and by the selection of the payment method via the icons of the vertical column shown in FIGS. 10B and 10M and will be communicated within the service order protocol, with the sub-header defining the nature of the service.

It is clear that the use of the sub-header code for embodying the nature of the command into each protocol, be it for service or for shopping and that the I.D code covering the link code and the service or product, identifies and enables to access every item, its price, quantity, time of delivery or schedule, and each item or a portion thereof can be linked with no further addressing and that the same identical protocol can be used for the two way communications by modifying the nature of command also termed sub-header code.

This includes the routine and random updates, upgrade and changes in product, services, variations, shops, providers, categories, groups, classes, prices, deliveries, pictures and illustrations, or every single element or group of elements, including the whole pages and files of the e-hopping and the e-services stored in the memory of the shopping circuit of the shopping terminals of the present invention.

The table 25C shows the sub-header for the loading, upgrading, removing, adding and replacing items, pages and files in the memory 43 of the shopping circuit shown in FIGS. 11A~11C.

Shown in FIG. 24B is the structure of the command 100L that is similar to the commands 100 and 100S of FIGS. 16A and 16C. The command 100L is structured for loading, upgrading, amending and/or downloading the data stored in the memory 43 shown in FIGS. 13 and 14. The nature of command or the sub-header 102 codes are listed in table 102C of FIG. 25C. The category link 104L and the product services 105L codes cover the I.D codes of both the codes 104/104S and 105/105S of FIGS. 16A and 16C with the switch over between the shopping for products and services is directed by the sub-header 102 that differentiate shopping from services.

For the command 100L the sub-header switches over and links the data movement in progress to the shopping items and files 200~500, or to the service items and files 600~810 or to the management and link files 550, 900 and 950 of FIGS. 13 and 14 via sub-header codes 0x32 for the shopping files, 0x33 for the services files and 0x01 for the administration files shown in table 102C of FIG. 25C.

The delivery/pay 106 and the pay/basis 106S codes of the commands 100 and 100S of FIGS. 16A and 16C are respectively a select code for identifying deliveries and payment methods shown in tables 105 of FIGS. 21A~21D, FIGS. 22A~22E and FIGS. 23A~B and serve no purpose for the two way loading and downloading of memory data. On the other hand the Load/upgrade command 100L of FIG. 24B should preferably include a link codes to specific files in the memory, this will reduce the control and address Bytes from the propagated data stream to and from the memory 43, thereby improve the ratio of the actual data versus addressing/control Bytes within the data stream, propagated in both direction, uploading and downloading to and from the memory 43.

The block n Bytes 106LE shows an upload and download stream of the illustrated Bytes for adding, canceling, removing or changing items and pages of the files in the memory 43, including the downloading and changing the items and pages in the memory 53 of the interface shown in FIG. 11B. No n Bytes codes 106LE are allotted or shown, the 106LE is an illustration of a data stream location within the command 100L. As the number of Bytes or the length of the command 100L is provided by the code 103 there is no need to separately code the number of Bytes pertaining to the uploading/downloading data stream only. The trailer or the checksum code 107 is identical with the trailers of FIGS. 16A and 16C.

The memory link codes 106L are shown in table 106L of FIG. 24A. The memory link codes are the codes referred to above as directing the propagated stream to the specific files within the files 200~810 shown in FIGS. 13 and 14, wherein files 200~500 cover the category, the shop, the group and the products of the e-shopping and the files 600~810 cover the categories, the class, the provider and the itemized services of the e-services. The files 550 and 950 are the administration files and the file 900 is the residence automation file, all shown in FIGS. 13 and 14 and explained above.

The combined base programs for the e-shopping and e-services including the operating files that are not shown, the management files that are shown installed into the memory 43 of FIGS. 13 and 14 are the operating programs that are installed at the time of production and are not intended to be loaded via the internal communication lines 65 shown in FIG. 11B to be a network.

As explained above, the internal communication lines can be many internal communication lines, such as the video interphone infrastructure lines, the cable television line, the television antenna line and a dedicated network line. However, updating, upgrading, adding and deleting and/or any other changes to the base programs can be propagated to and from the memory 43 of FIGS. 13 and 14. The table 106L provides also for upgrading, updating and/or any data streams for other changes into and from the combinations of the files 200~950 and/or the base programs.

To better simplify the propagation of the data stream and to improve the ratio of the actual data versus the control data of the propagated Bytes stream, the link to memory code 106L also provides the "nature of the stream", similar to the sub-header codes, providing the embodiment or the intelligence needed to identify the targeted files in the memory. Combining the category link codes 104L and the product/service code 105L that provide the specific target within the nature of command 102 and the memory files, and the identified target or the nature of the loading by the link to memory code 106L, provide a perfect setup for efficient programming of the data uploading and downloading.

Shown in table 106L of FIG. 24A are the actions listed as load, update, upgrade, add, amend, delete, remove and temporary block in one direction and download, add categories, remove categories, block groups/classes, unblock groups/classes, delete products/services, restore products/services in the other direction from the memory 43 to the interface/server 55 of FIG. 11B. The table 106L provides one spare code line, shown as the 0x00~0xf0 codes line.

As repeated above, the shown table is the preferred embodiment for the propagation and actions codes for the loading, upgrading and downloading data two ways. However if the need arises for additional codes for propagating data between the memory 43 and the interface the table can be expanded into independent tables, each addressed by one of the sub-header codes, shown in table 25C as 13 codes. This will provide a far greater code range spanning over 13 individual tables and precise detailed loading and updating targets into each and every specific file or page. It is also possible to increase the bit count of the codes 106L to 16 or 2 Bytes.

The limiting of the codes 106L that cover all the loading, updating, upgrading, add, remove and other data changes to 8 bit provides the practical need for a shopping terminal operating in a closed circuit e-shopping and e-services environment. This mandates the simplifying of every aspect of the processing as otherwise it will be complex and not simple, nor practical, thereby defeating the intended, simplicity and efficiency needed for a close circuit e-shopping.

From the above descriptions it becomes clear that a pre-configured, preprogrammed and templated close circuit e-commerce comprising e-shopping, e-services and e-concierge can be most efficient, offering a simple and a convenient means to operate shopping terminals and provide the services and the shopping the dwellers need and want.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. An apparatus for operating a shopping terminal in a closed circuit e-commerce comprising:
   a memory and
   a processor:
   wherein the memory stores instructions for execution by the processor, the instructions including a bidirectional communication protocol structure composed of at least six individual Byte codes comprising a header, a sub-header, a category link, an item, a process and a trailer, said header identifies the received signal source selected from a group comprising an optical signal, an IR signal, an RF signal and electrical signal, the sub-header code identifies the nature of the command, the category link code identifies a category, a provider and one of a group and a class, the item code identifies one of a service and a product including variations pertaining to said item linked to the identified said category, said provider and to one of a group and a class, the process identifies one of a delivery details and service visit schedule including one of a payment method and a service cost, and the checksum trailer concludes said protocol.

2. The apparatus according to claim 1, wherein said category link comprising at least two Byte codes for expanding the number of at least one of categories, providers and groups or classes.

3. The apparatus according to claim 2, wherein said sub-header code identifies the protocol to be for single product shopping, said category link code is a shopping category link code, said item code is a product code and said process code is a delivery/pay code, and wherein said category link codes identify the shopping category, an e-shop provider and a product group, said product code identifies the product within said product group and said delivery/pay codes identify the delivery particulars and the payment method.

4. The apparatus according to claim 3, wherein said sub-header code identifies the protocol to be for multi product shopping by repeating a product I.D code comprising a product category link code and a product code for each product, and wherein a length code identifies the total Byte count of said protocol for multi products shopping.

5. The apparatus according to claim 4, wherein said sub-header identifies the protocol to be for uploading data to a memory of said shopping terminal, said process code is a link to memory code for linking to a given file of said memory and wherein said length code identifies one of the Byte count of said protocol including the uploading data stream being propagated and at least one Byte codes for identifying the n Bytes count of the uploading stream is added to said protocol.

6. The apparatus according to claim 4, wherein said sub-header identifies the protocol to be for updating data of a memory of said shopping terminal, said process code is a link to memory code for linking to a given file of said memory and wherein said length code identifies one of the Byte count of said protocol including the updating data stream being propagated and at least one Byte codes for identifying the n Bytes count of the updating stream is added to said protocol.

7. The apparatus according to claim 2, wherein said sub-header code identifies the protocol to be for services, said category link code is a service category link code, said item code is an itemized service code and said process code is a pay/basis for service, and wherein said category link codes identify a service category, a service provider and a service class, said service code identifies an itemized service and the service schedule, and said pay/basis code identifies the payment method and the service cost particulars.

8. The apparatus according to claim 7, wherein said sub-header code identifies the protocol to be for multi services shopping by repeating a service I.D code comprising a service category link code and an itemized service code for identifying the particulars of a service, and wherein a length code identifies the total Byte count of said protocol for multi products shopping.

9. The apparatus according to claim 8, wherein said sub-header identifies the protocol to be for downloading data from a given file of a memory of said shopping terminal, said process code is a link to memory code for identifying a given file of said memory being downloaded and wherein said length code identifies one of the Bytes count of said protocol including the downloading data stream being propagated and at least one Byte codes for identifying the n Bytes count of the downloading stream is added to said protocol.

* * * * *